United States Patent
Nakajima et al.

(10) Patent No.: US 8,246,458 B2
(45) Date of Patent: Aug. 21, 2012

(54) GAME APPARATUS AND RECORDING MEDIUM RECORDING GAME PROGRAM

(75) Inventors: Souichi Nakajima, Kyoto (JP); Kenichi Nishida, Kyoto (JP); Yoshikazu Yamashita, Kyoto (JP); Takayuki Shimamura, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 604 days.

(21) Appl. No.: 12/478,548

(22) Filed: Jun. 4, 2009

(65) Prior Publication Data

US 2010/0248844 A1 Sep. 30, 2010

(30) Foreign Application Priority Data

Mar. 25, 2009 (JP) ................................. 2009-074069
Mar. 27, 2009 (JP) ................................. 2009-079461

(51) Int. Cl.
*A63F 9/24* (2006.01)

(52) U.S. Cl. .......................................... 463/36; 463/43

(58) Field of Classification Search ............... 463/36, 463/37, 43
See application file for complete search history.

(56) References Cited

U.S. PATENT DOCUMENTS

| | | | | |
|---|---|---|---|---|
| 4,959,725 A | * | 9/1990 | Mandle | 348/208.6 |
| 6,001,014 A | * | 12/1999 | Ogata et al. | 463/37 |
| 6,162,123 A | * | 12/2000 | Woolston | 463/37 |

FOREIGN PATENT DOCUMENTS

JP 2000308756 A * 11/2000

OTHER PUBLICATIONS

English language Abstract of JP2000308756(A), "Input Controller of Game Device," Inventor Okamoto Koichiro, from esp@cenet database.*

* cited by examiner

*Primary Examiner* — Matthew W Such
*Assistant Examiner* — Robert Carpenter
(74) *Attorney, Agent, or Firm* — Nixon & Vanderhye P.C.

(57) ABSTRACT

As an example, a value obtained by adding the magnitudes of a plurality of angular velocities around respective axes indicated by angular velocity data obtained from an input device including gyroscopic sensors, is used to calculate a rotation parameter indicating a rotation amount. A predetermined object which is rotated, depending on the rotation amount corresponding to the rotation parameter, is displayed on a display device. As another example, when it is determined, based on the angular velocity data, that the attitude of the input device is stable, a stability flag which indicates that the attitude of the input device has been at least once stable is set and updated to ON. When there is an input device whose stability flag is OFF, the aforementioned determination is performed and a screen including a result of the determination is displayed on a display device.

34 Claims, 18 Drawing Sheets

GAME APPARATUS AND RECORDING MEDIUM RECORDING GAME PROGRAM

CROSS REFERENCE TO RELATED APPLICATIONS

The disclosure of Japanese Patent Application No. 2009-074069, filed Mar. 25, 2009 and Japanese Patent Application No. 2009-079461, filed Mar. 27, 2009, is incorporated herein by reference.

BACKGROUND

1. Field

Example embodiments of the present invention relate to a game apparatus and a recording medium recording a game program. More particularly, example embodiments of the present invention relate to a game apparatus and a recording medium recording a game program for performing a game process based on an angular velocity.

2. Description of the Background Art

Conventionally, there is a game apparatus which employs an input device equipped with a gyroscopic sensor and performs a game process using angular velocity data output from the gyroscopic sensor. For example, Japanese Patent Laid-Open Publication No. 2000-308756 (hereinafter referred to as Patent Document 1) discloses a game apparatus which employs a bar-shaped input control device including a gyroscopic sensor. The game apparatus disclosed in Patent Document 1 controls a sword held by a game character, depending on a motion of the input control device. Specifically, an attitude of the sword held by the game character is calculated based on angular velocity data from the gyroscopic sensor of the input control device.

Gyroscopic sensors output data indicating a rotational angular velocity. Therefore, the output of the gyroscopic sensor may fluctuate due to a so-called drift phenomenon or the like. The fluctuation may cause an error in the angular velocity data obtained from the gyroscopic sensor, i.e., the angular velocity data may become incorrect. However, when a game process is executed using the angular velocity data obtained from the gyroscopic sensor of the input device, it is difficult to determine such an error during the game process. It also is difficult for a player who is operating the input device to determine the level of the error occurring in the gyroscopic sensor. Moreover, in order to obtain the angular velocity data from the gyroscopic sensor of the input device, it is necessary to determine the presence or absence of a deviation of the output of the gyroscopic sensor in its still state.

SUMMARY

Therefore, example embodiments of the present invention provide a game apparatus and a recording medium recording a game program capable of easily recognizing an error in a gyroscopic sensor or efficiently confirming the error, in a game in which a game process is executed based on an angular velocity obtained from the gyroscopic sensor.

Example embodiments of the present invention may have the following features. Note that reference numerals, step numbers and the like inside parentheses in this section indicate correspondence to embodiments described below for the sake of easy understanding, and do not limit the present invention.

A first aspect of example embodiments of the present invention is directed to a game apparatus (5) for performing a game process by obtaining operation data including at least angular velocity data (Da) indicating a plurality of angular velocities around respective axes (X-, Y- and Z-axes) from an input device (6) including gyroscopic sensors (95, 96) for detecting the respective angular velocities. The game apparatus includes an angular velocity data obtaining means (CPU 10 executing steps 102 and 132; hereinafter only step numbers are described), a rotation parameter calculating means (S123, S153), and an object display control means (S48, S69, S84). The angular velocity data obtaining means obtains the angular velocity data. The rotation parameter calculating means calculates a rotation parameter (V) indicating a rotation amount using a value obtained by adding magnitudes of the plurality of angular velocities (v1, v2, v3) around the axes indicated by the angular velocity data. The object display control means causes a display device (2) to display a predetermined object (Dobj) which is rotated, depending on the rotation amount corresponding to the rotation parameter.

In a second aspect based on the first aspect, the game apparatus further includes a game processing means (S60) and a temporarily stopping means (S80). The game processing means executes the game process based on the angular velocity data. The temporarily stopping means temporarily stops the game process processed by the game processing means when the operation data indicates that a predetermined operation has been performed. While the game process is temporarily stopped, the object display control means causes the display device to display the object which is rotated, depending on the rotation parameter calculated while the game process is temporarily stopped (S84).

A third aspect based on the first aspect, the game apparatus further includes a determination means (S104 to 5108, S112, 5134 to 5138, S142). The determination means determines whether or not an attitude of the input device is stable based on the angular velocity data. The object display control means causes the display device to display the object which is rotated, depending on the rotation parameter, until the determination means determines that the attitude of the input device is stable (S48, S69, S84).

In a fourth aspect based on the third aspect, the game apparatus further includes a game processing means. The game processing means executes the game process based on the angular velocity data. The determination means starts the determination before the game processing means starts the game process (S43), and the game processing means starts the game process after the determination means determines that the attitude of the input device is stable.

In a fifth aspect based on the third aspect, when the determination means determines that the attitude of the input device is stable, the object display control means causes the display device to display the object which is still and oriented in a predetermined direction (Dobjb).

In a sixth aspect based on the fifth aspect, after causing the object to be still and oriented in the predetermined direction, the object display control means causes the display device to display the object which continues to be in the still state irrespective of the rotation parameter as long as predetermined conditions are not satisfied.

A seventh aspect based on the first aspect, when the value obtained by the addition is larger than a predetermined threshold, the rotation parameter calculating means calculates the rotation parameter using the value as the threshold.

In an eighth aspect based on the first aspect, the object display control means causes the display device to display the object which mimics the input device and is rotated.

In a ninth aspect based on the first aspect, the rotation parameter calculating means newly calculates the rotation parameter by causing the value obtained by the addition to approach a value of the rotation parameter calculated in the past (Vlast) at a predetermined rate.

In a tenth aspect based on the first aspect, the game apparatus further includes an offset value calculating means and an offset correcting means. The an offset value calculating means calculates zero-point offset values (ofs) converging to the respective angular velocities around the axes indicated by the angular velocity data. The offset correcting means corrects the plurality of angular velocities around the axes indicated by the angular velocity data using the respective zero-point offset values calculated corresponding to the axes. The rotation parameter calculating means calculates the rotation parameter using the magnitudes of the plurality of angular velocities around the axes corrected by the offset correcting means.

In an eleventh aspect based on the tenth aspect, the game apparatus further includes a number-of-successive-pieces calculating means. The number-of-successive-pieces calculating means calculates the number of angular velocities (ct) falling within a predetermined stability range successively backward in time from an angular velocity indicated by the latest angular velocity data. The offset value calculating means calculates the zero-point offset values which converge to the respective angular velocities indicated by the latest angular velocity data to a further extent as the number of the successive angular velocities increases.

A twelfth aspect of example embodiments of the present invention is directed to a computer-readable recording medium recording a game program executable by a computer (10) included in a game apparatus for performing a game process by obtaining operation data including at least angular velocity data indicating a plurality of angular velocities around respective axes from an input device including gyroscopic sensors for detecting the respective angular velocities. The game program causes the computer to function as an angular velocity data obtaining means, a rotation parameter calculating means, and an object display control means. The angular velocity data obtaining means obtains the angular velocity data. A rotation parameter calculating means calculates a rotation parameter indicating a rotation amount using a value obtained by adding magnitudes of the plurality of angular velocities around the axes indicated by the angular velocity data. The object display control means causes a display device to display a predetermined object which is rotated, depending on the rotation amount corresponding to the rotation parameter.

In a thirteenth aspect based on the twelfth aspect, the game program causes the computer to further function as a game processing means and a temporarily stopping means. The game processing means executes the game process based on the angular velocity data. The temporarily stopping means temporarily stops the game process processed by the game processing means when the operation data indicates that a predetermined operation has been performed. While the game process is temporarily stopped, the object display control means causes the display device to display the object which is rotated, depending on the rotation parameter calculated while the game process is temporarily stopped.

In a fourteenth aspect based on the twelfth aspect, the game program causes the computer to further function as a determination means. The determination means determines whether or not an attitude of the input device is stable based on the angular velocity data. The object display control means causes the display device to display the object which is rotated, depending on the rotation parameter, until the determination means determines that the attitude of the input device is stable.

In a fifteenth aspect based on the fourteenth aspect, the game program causes the computer to further function as a game processing means. The game processing means executes the game process based on the angular velocity data. The determination means starts the determination before the game processing means starts the game process, and the game processing means starts the game process after the determination means determines that the attitude of the input device is stable.

In a sixteenth aspect based on the fourteenth aspect, when the determination means determines that the attitude of the input device is stable, the object display control means causes the display device to display the object which is still and oriented in a predetermined direction.

In a seventeenth aspect based on the sixteenth aspect, after causing the object to be still and oriented in the predetermined direction, the object display control means causes the display device to display the object which continues to be in the still state irrespective of the rotation parameter as long as predetermined conditions are not satisfied.

In an eighteenth aspect based on the twelfth aspect, when the value obtained by the addition is larger than a predetermined threshold, the rotation parameter calculating means calculates the rotation parameter using the value as the threshold.

In a nineteenth aspect based on the twelfth aspect, the object display control means causes the display device to display the object which mimics the input device and is rotated.

In a twentieth aspect based on the twelfth aspect, the rotation parameter calculating means newly calculates the rotation parameter by causing the value obtained by the addition to approach a value of the rotation parameter calculated in the past at a predetermined rate.

In a twenty-first aspect based on the twelfth aspect, the game program causes the computer to further function as an offset value calculating means and an offset correcting means. The offset value calculating means calculates zero-point offset values converging to the respective angular velocities around the axes indicated by the angular velocity data. The offset correcting means corrects the plurality of angular velocities around the axes indicated by the angular velocity data using the respective zero-point offset values calculated corresponding to the axes. The rotation parameter calculating means calculates the rotation parameter using the magnitudes of the plurality of angular velocities around the axes corrected by the offset correcting means.

In a twenty-second aspect based on the twenty-first aspect, the game program causes the computer to further function as a number-of-successive-pieces calculating means. The number-of-successive-pieces calculating means calculates the number of angular velocities falling within a predetermined stability range successively backward in time from an angular velocity indicated by the latest angular velocity data. The offset value calculating means calculates the zero-point offset values which converge to the respective angular velocities indicated by the latest angular velocity data to a further extent as the number of the successive angular velocities increases.

A twenty-third aspect of example embodiments of the present invention is directed to a game apparatus (5) for performing a game process by obtaining operation data including at least angular velocity data (Da) indicating a plurality of angular velocities (v) around respective axes (X-, Y- and Z-axes) from an input device (6) including gyroscopic sensors (95, 96) for detecting the respective angular velocities. The game apparatus includes an angular velocity data obtaining means (CPU 10 executing steps 102 and 132; hereinafter only step numbers are described), a determination means (S104 to 5107, 5111 to 5113, S134 to 5137, 5141 to S143), a flag storing means (Dd), a first flag control means (S108, S138), and a stability confirming means (S48, S69, S84). The angular velocity data obtaining means obtains the angular velocity data. The determination means determines whether or not an attitude of the input device is stable, based on the angular velocity data. The flag storing means stores a stability flag (Sfrg) indicating that the attitude of the input device has been at least once stable. The first flag control means sets the stability flag of the input device to ON to update the stability flag stored in the flag storing means when the determination means determines that the attitude of the input device is stable. The stability confirming means causes the determination means to perform the determination and causing a display device (2) to display a screen (FIG. 8) including a result of the determination, when there is an input device whose stability flag is OFF.

In a twenty-fourth aspect based on the twenty-third aspect, the game apparatus obtains the operation data including the angular velocity data from each of a plurality of input devices. The game apparatus further includes a game processing means (S60) and an input device determining means (S42). The game processing means executes a game process for performing a predetermined game, based on the obtained angular velocity data. The input device determining means determines at least one of the input devices which is to be used in the game process before the game processing means starts the game process. After the input device determining means determines the at least one input device to be used, when there is an input device whose stability flag is OFF of the at least one input device to be used, the stability confirming means causes the determination means to perform the determination and causes the display device to display a screen including a result of the determination.

In a twenty-fifth aspect based on the twenty-fourth aspect, after the input device determining means determines the at least one input devices to be used, when the stability flag of the at least one input device to be used is all set to ON, the stability confirming means causes the game processing means to start the game process (No in S49). After the number of the at least one input devices to be used is determined by the input device determining means, when there is an input device whose stability flag is still OFF after a predetermined time elapses, the stability confirming means causes the display device to display a screen (FIG. 18) which allows a player to determine whether or not to start the game process, and when the player determines to start the game process (No in S51), the stability confirming means causes the game processing means to start the game process.

In a twenty-sixth aspect based on the twenty-third aspect, the game apparatus further includes a second flag control means (S110, S140). The second flag control means sets the stability flag of the input device to OFF to update the stability flag stored in the flag storing means, depending on a connection state of the input device and the game apparatus. When the stability flag stored in the flag storing means is changed from ON to OFF, the stability confirming means causes the determination means to perform the determination and causes the display device to display a screen including a result of the determination.

In a twenty-seventh aspect based on the twenty-sixth aspect, when connection between the input device and the game apparatus is disconnected, the second flag control means sets the stability flag of the input device to OFF to update the stability flag stored in the flag storing means.

In a twenty-eighth aspect based on the twenty-sixth aspect, the input device includes a first unit (7) and a second unit (9). The first unit includes a communication section (75) for transmitting the operation data. The second unit includes the gyroscopic sensor. The second unit is electrically connected to the first unit and outputs the angular velocity data to the communication section. When connection between the first and second units in the input device is disconnected, the second flag control means sets the stability flag of the input device to OFF to update the stability flag stored in the flag storing means.

In a twenty-ninth aspect based on the twenty-third aspect, the game apparatus further includes a game processing means, a game selecting means (S87, S88), and a second flag control means (S89). The game processing means performs the game process based on the obtained angular velocity data. The game selecting means selects a game to be executed by the game processing means, from a plurality of games. The second flag control means, when the game selecting means selects a specific one of the plurality of games, sets all the stability flag of the at least one input device used in the game to OFF to update the stability flag stored in the flag storing means. After the game selecting means selects the specific game, when there is an input device whose stability flag is OFF, the stability confirming means causes the determination means to perform the determination and causes the display device to display a screen including a result of the determination.

In a thirtieth aspect based on the twenty-ninth aspect, when the game selecting means selects a game requiring a relatively high accuracy level of necessary angular velocity data, the second flag control means sets all the stability flag of the at least one input device used in the game to OFF to update the stability flag stored in the flag storing means. After the game selecting means selects the game requiring the relatively high accuracy level, when there is an input device whose stability flag is OFF, the stability confirming means causes the determination means to perform the determination and causes the display device to display a screen including a result of the determination.

In a thirty-first aspect based on the thirtieth aspect, the game apparatus further includes an offset value calculating means and an offset correcting means. The offset value calculating means calculates zero-point offset values indicating values of the angular velocity data in the still state for the respective axes. The offset correcting means corrects the plurality of angular velocities around the axes indicated by the angular velocity data using the respective zero-point offset values calculated corresponding to the axes. The determination means determines whether or not the attitude of the input device is stable, based on the plurality of angular velocities around the axes corrected by the offset correcting means. The offset value calculating means calculates the zero-point offset values in a manner which allows the zero-point offset values to approach the respective values of the angular velocity data which are obtained when the input device is still, where, in the game requiring the relatively high accuracy level, an extent to which the zero-point offset values approach respective angular velocities indicated by the latest angular velocity data is reduced.

In a thirty-second aspect based on the twenty-third aspect, the game apparatus further includes a game processing means. The game processing means executes the game process based on the obtained angular velocity data, and repeatedly causing the determination means to perform the determination along with the game process.

In a thirty-third aspect based on the thirty-second aspect, the game apparatus further includes a connection state checking means (S103, 5133) and a second flag control means (S110, S140). The connection state checking means checks whether or not there is a problem with connection between the input device and the game apparatus. The second flag control means, when there is a problem with the connection state, sets the stability flag of the input device to OFF to update the stability flag stored in the flag storing means. When there is a problem with the connection state, the stability confirming means interrupts the game process of the game processing means, and causes the determination means to perform the determination and causes the display device to display a screen including a result of the determination.

In a thirty-fourth aspect based on the thirty-third aspect, the game apparatus obtains the operation data including the angular velocity data from each of a plurality of input devices. The connection state checking means checks the connection state of each of the plurality of input devices. When the game processing means executes the game process based on the operation data from an input device having a problem with the connection state, of the plurality of input devices (Yes in S67), the stability confirming means causes the determination means to execute the determination, causes the game processing means to stop the game process, and causes the display device to display a screen including a result of the determination.

In a thirty-fifth aspect based on the thirty-fourth aspect, when the game processing means executes the game process based on the operation data from one of the plurality of input devices other than the input device having a problem with the connection state (No in S64), the stability confirming means causes the determination means to execute the determination, and causes the game processing means to continue the game process without causing the display device to display a screen including a result of the determination.

In a thirty-sixth aspect based on the twenty-third aspect, when a period of time (C) that changes in attitude with respect to the respective axes of the input device indicated by the angular velocity data fall within respective predetermined ranges is longer than or equal to a predetermined period of time (Ct), the determination means determines that the attitude of the input device is stable.

In a thirty-seventh aspect based on the thirty-sixth aspect, the determination means includes a change amount calculating means (S104, S134), a change amount determining means (S105, S135), a counting means (S106, 5113, 5136, S143), a count determining means (S107, S137), and an angle-to-be-compared updating means (S112, S142). The change amount calculating means calculates angles (r1, r2, r3) around the respective axes indicated by the angular velocity data with respect to the attitude of the input device, and calculates differences between the angles and respective angles to be compared (r1old, r2old, r3old). The change amount determining means determines whether or not all the differences around the respective axes are smaller than or equal to respective thresholds. The counting means increases a count (C) when the change amount determining means determines that all the differences are smaller than or equal to the respective thresholds, and initializes the count (C=0) when the change amount determining means determines that at least one of the differences is larger than the corresponding threshold. The count determining means, when the count is larger than or equal to a predetermined value (Ct), determines that the period of time that the changes in attitude with respect to the respective axes of the input device fall within the respective predetermined ranges is longer than or equal to the predetermined period of time. The angle-to-be-compared updating means, when the change amount determining means determines that one of the differences is larger than the corresponding threshold, updates the angles to be compared using currently calculated angles around the respective axes of the input device.

In a thirty-eighth aspect based on the twenty-third aspect, the game apparatus further includes an offset value calculating means and an offset correcting means. The offset value calculating means calculates zero-point offset values indicating values of the angular velocity data in the still state for the respective axes. The offset correcting means corrects the plurality of angular velocities around the axes indicated by the angular velocity data using the respective zero-point offset values calculated corresponding to the axes. The offset value calculating means calculates the zero-point offset values in a manner which allows the zero-point offset values to approach the respective values of the angular velocity data which are obtained when the input device is still. The determination means determines whether or not the attitude of the input device is stable, based on the plurality of angular velocities around the axes corrected by the offset correcting means.

A thirty-ninth aspect of example embodiments of the present invention is directed to a computer-readable recording medium recording a game program executable by a computer (10) included in a game apparatus for performing a game process by obtaining operation data including at least angular velocity data indicating a plurality of angular velocities around respective axes from an input device including gyroscopic sensors for detecting the respective angular velocities. The game program causes the computer to function as an angular velocity data obtaining means, a determination means, a flag storing means, a first flag control means, and a stability confirming means. The angular velocity data obtaining means obtains the angular velocity data. The determination means determines whether or not an attitude of the input device is stable, based on the angular velocity data. The flag storing means stores a stability flag indicating that the attitude of the input device has been at least once stable. The first flag control means sets the stability flag of the input device to ON to update the stability flag stored in the flag storing means when the determination means determines that the attitude of the input device is stable. The stability confirming means causes the determination means to perform the determination and causing a display device to display a screen including a result of the determination, when there is an input device whose stability flag is OFF.

In a fortieth aspect based on the thirty-ninth aspect, the game apparatus obtains the operation data including the angular velocity data from each of a plurality of input devices. The game program causes the computer to further function as a game processing means and an input device determining means. The game processing means executes a game process for performing a predetermined game, based on the obtained angular velocity data. The input device determining means determines at least one of the input devices which is to be used in the game process before the game processing means starts the game process. After the input device determining means determines the at least one input device to be used, when there is an input device whose stability flag is OFF of the at least one input device to be used, the stability confirming means causes the determination means to perform the determination and causes the display device to display a screen including a result of the determination.

In a forty-first aspect based on the fortieth aspect, after the input device determining means determines the at least one input devices to be used, when the stability flag of the at least one input device to be used is all set to ON, the stability confirming means causes the game processing means to start the game process. After the number of the at least one input devices to be used is determined by the input device determining means, when there is an input device whose stability flag is still OFF after a predetermined time elapses, the stability confirming means causes the display device to display a screen which allows a player to determine whether or not to start the game process, and when the player determines to start the game process, the stability confirming means causes the game processing means to start the game process.

In a forty-second aspect based on the thirty-ninth aspect, the game program causes the computer to further function as a second flag control means. The second flag control means sets the stability flag of the input device to OFF to update the stability flag stored in the flag storing means, depending on a connection state of the input device and the game apparatus. When the stability flag stored in the flag storing means is changed from ON to OFF, the stability confirming means causes the determination means to perform the determination and causes the display device to display a screen including a result of the determination.

In a forty-third aspect based on the forty-second aspect, when connection between the input device and the game apparatus is disconnected, the second flag control means sets the stability flag of the input device to OFF to update the stability flag stored in the flag storing means.

In a forty-fourth aspect based on the forty-second aspect, the input device includes a first unit and a second unit. The first unit includes a communication section for transmitting the operation data. The second unit includes the gyroscopic sensor, wherein the second unit is electrically connected to the first unit and outputs the angular velocity data to the communication section. When connection between the first and second units in the input device is disconnected, the second flag control means sets the stability flag of the input device to OFF to update the stability flag stored in the flag storing means.

In a forty-fifth aspect based on the thirty-ninth aspect, the game program causes the computer to further function as a game processing means, a game selecting means, and a second flag control means. The game processing means performs the game process based on the obtained angular velocity data. The game selecting means selects a game to be executed by the game processing means, from a plurality of games. The second flag control means, when the game selecting means selects a specific one of the plurality of games, sets all the stability flag of the at least one input device used in the game to OFF to update the stability flag stored in the flag storing means. After the game selecting means selects the specific game, when there is an input device whose stability flag is OFF, the stability confirming means causes the determination means to perform the determination and causes the display device to display a screen including a result of the determination.

In a forty-sixth aspect based on the forty-fifth aspect, when the game selecting means selects a game requiring a relatively high accuracy level of necessary angular velocity data, the second flag control means sets all the stability flag of the at least one input device used in the game to OFF to update the stability flag stored in the flag storing means. After the game selecting means selects the game requiring the relatively high accuracy level, when there is an input device whose stability flag is OFF, the stability confirming means causes the determination means to perform the determination and causes the display device to display a screen including a result of the determination.

In a forty-seventh aspect based on the forty-sixth aspect, the game program causes the computer to further function as an offset value calculating means and an offset correcting means. The offset value calculating means calculates zero-point offset values indicating values of the angular velocity data in the still state for the respective axes. The offset correcting means corrects the plurality of angular velocities around the axes indicated by the angular velocity data using the respective zero-point offset values calculated corresponding to the axes. The determination means determines whether or not the attitude of the input device is stable, based on the plurality of angular velocities around the axes corrected by the offset correcting means. The offset value calculating means calculates the zero-point offset values in a manner which allows the zero-point offset values to approach the respective values of the angular velocity data which are obtained when the input device is still, where, in the game requiring the relatively high accuracy level, an extent to which the zero-point offset values approach respective angular velocities indicated by the latest angular velocity data is reduced.

In a forty-eighth aspect based on the thirty-ninth aspect, the game program causes the computer to further function as a game processing means. The game processing means executes the game process based on the obtained angular velocity data, and repeatedly causing the determination means to perform the determination along with the game process.

In a forty-ninth aspect based on the forty-eighth aspect, the game program causes the computer to further function as a connection state checking means and a second flag control means. The connection state checking means checks whether or not there is a problem with connection between the input device and the game apparatus. The second flag control means, when there is a problem with the connection state, sets the stability flag of the input device to OFF to update the stability flag stored in the flag storing means. When there is a problem with the connection state, the stability confirming means interrupts the game process of the game processing means, and causes the determination means to perform the determination and causes the display device to display a screen including a result of the determination.

In a fiftieth aspect based on the forty-ninth aspect, the game apparatus obtains the operation data including the angular velocity data from each of a plurality of input devices. The connection state checking means checks the connection state of each of the plurality of input devices. When the game processing means executes the game process based on the operation data from an input device having a problem with the connection state, of the plurality of input devices, the stability confirming means causes the determination means to execute the determination, causes the game processing means to stop the game process, and causes the display device to display a screen including a result of the determination.

In a fifty-first aspect based on the fiftieth aspect, when the game processing means executes the game process based on the operation data from one of the plurality of input devices other than the input device having a problem with the connection state, the stability confirming means causes the determination means to execute the determination, and causes the game processing means to continue the game process without causing the display device to display a screen including a result of the determination.

In a fifty-second aspect based on the thirty-ninth aspect, when a period of time that changes in attitude with respect to the respective axes of the input device indicated by the angular velocity data fall within respective predetermined ranges is longer than or equal to a predetermined period of time, the determination means determines that the attitude of the input device is stable.

In a fifty-third aspect based on the fifty-second aspect, the determination means includes a change amount calculating means, a change amount determining means, a counting means, and an angle-to-be-compared updating means. The change amount calculating means calculates angles around the respective axes indicated by the angular velocity data with respect to the attitude of the input device, and calculates differences between the angles and respective angles to be compared. The change amount determining means determines whether or not all the differences around the respective axes are smaller than or equal to respective thresholds. The counting means increases a count when the change amount determining means determines that all the differences are smaller than or equal to the respective thresholds, and initializes the count when the change amount determining means determines that at least one of the differences is larger than the corresponding threshold. The count determining means, when the count is larger than or equal to a predetermined value, determines that the period of time that the changes in attitude with respect to the respective axes of the input device fall within the respective predetermined ranges is longer than or equal to the predetermined period of time. The angle-to-be-compared updating means, when the change amount determining means determines that one of the differences is larger than the corresponding threshold, updates the angles to be compared using currently calculated angles around the respective axes of the input device.

In a fifty-fourth aspect based on the thirty-ninth aspect, the game program causes the computer to further function as an offset value calculating means and an offset value calculating means. The offset value calculating means calculates zero-point offset values indicating values of the angular velocity data in the still state for the respective axes. The offset correcting means corrects the plurality of angular velocities around the axes indicated by the angular velocity data using the respective zero-point offset values calculated corresponding to the axes. The offset value calculating means calculates the zero-point offset values in a manner which allows the zero-point offset values to approach the respective values of the angular velocity data which are obtained when the input device is still. The determination means determines whether or not the attitude of the input device is stable, based on the plurality of angular velocities around the axes corrected by the offset correcting means.

Thus, according to the first aspect, a player can recognize an output status of the gyroscopic sensors by visually recognizing a displayed object which is rotating or its rotational speed. For example, in a situation where the gyroscopic sensors need to be caused to be still, if the gyroscopic sensors are not stable, an object is displayed which is rotating, depending on angular velocity data obtained from the gyroscopic sensors. Therefore, the player can recognize that the gyroscopic sensors are moving or an error is included in the outputs. Moreover, the rotational speed of the object is determined based on the sum of all the magnitudes of the plurality of angular velocities around the axes. Therefore, for example, even if small angular velocities cause the gyroscopic sensors to be unstable, the angular velocities are emphasized and displayed on the screen. As a result, the player can easily understand that the gyroscopic sensors are not stable.

According to the second aspect, when the player performs an operation of temporarily stopping the game process during a game process, an object is displayed which is rotating, depending on angular velocity data obtained from the gyroscopic sensors after the gyroscopic sensors are temporarily stopped. Therefore, it is possible to temporarily stop the gyroscopic sensors even during a game process to check the output status of the gyroscopic sensors.

According to the third aspect, in a situation where the gyroscopic sensors need to be caused to be still, an object is displayed which is rotating, depending on angular velocity data obtained from the gyroscopic sensors until the gyroscopic sensors become stable, so that the player can recognize that the gyroscopic sensors are not stable.

According to the fourth aspect, for example, in a situation where the gyroscopic sensors need to be caused to be still before a game process so as to perform the game process, an object is displayed which is rotating, depending on angular velocity data obtained from the gyroscopic sensors until the gyroscopic sensors become stable, and the game process is started after the gyroscopic sensors once become stable. Therefore, the game process can be executed based on accurate data from the gyroscopic sensors.

According to the fifth aspect, when the gyroscopic sensors are stable, an object which is still and oriented in a predetermined direction is displayed. Therefore, the player can easily recognize that the gyroscopic sensors are stable.

According to the sixth aspect, after the gyroscopic sensors once become stable, the still object continues to be displayed even if the input device is moved. Therefore, the player can invariably recognize that the gyroscopic sensors have once become stable.

According to the seventh aspect, the rotational speed of the object is limited to a predetermined value or less. Therefore, it is possible to avoid a situation where the rotational speed of the object is too fast to clearly see the display.

According to the eighth aspect, it is possible to display an object which allows the player to intuitively recognize an output status of the input device.

According to the ninth aspect, it is possible to provide a smooth change in rotational speed of the object.

According to the tenth aspect, a process can be executed using a value which has been subjected to offset correction based on still-state outputs of the gyroscopic sensors.

According to the eleventh aspect, when the input device is in the still state, a rate at which the zero-point offset values converge to the obtained angular velocities is large. Therefore, the rotation of the object can be displayed in association with the convergence of the zero-point offset values.

According to the twenty-third aspect, when the gyroscopic sensors (input device) have never been still or stable, a result of determination indicating that the gyroscopic sensors are not stable is displayed. Therefore, the indication that the gyroscopic sensors are not stable allows a player to know that an error occurs in the gyroscopic sensors, and the gyroscopic sensors (input device) needs to be caused to be still and stable so as to eliminate the error.

According to the twenty-fourth aspect, after input device (s) which are to be used in a game are determined (typically, the number of players is determined), when there is an input device whose stability flag is OFF, a stability confirmation screen is displayed. Therefore, the stability confirmation screen is displayed in a situation where a gyroscopic sensor needs to be once caused to be still for the subsequent game processes, and is displayed as required in the course of a game process.

According to the twenty-fifth aspect, even when the gyroscopic sensors (input device) cannot be caused to be stable, the subsequent game processes can be started.

According to the twenty-sixth aspect, when accurate angular velocity data is not obtained due to the connection state between the input device and the game apparatus, it is possible to prompt the player to cause the gyroscopic sensors to be at least once still by setting the stability flag to OFF.

According to the twenty-seventh, when angular velocity data is not obtained due to disconnection between the input device and the game apparatus, it is possible to prompt the player to cause the gyroscopic sensors to be at least once still by setting the stability flag to OFF.

According to the twenty-eighth, when angular velocity data is not obtained due to disconnection between the first unit and the second unit, it is possible to prompt the player to cause the gyroscopic sensors to be at least once still by setting the stability flag to OFF.

According to the twenty-ninth aspect, when a game to be played is changed to a specific game, it is possible to prompt the player to sets the still-state outputs of the gyroscopic sensors again by setting the stability flag to OFF. For example, when a specific game in which the gyroscopic sensors need to be caused to be still again is played, it is possible to prompt the player to cause the gyroscopic sensors to be at least once still.

According to the thirtieth aspect, when a game which requires a relatively high accuracy level of angular velocity data is played, it is possible to prompt the player to cause the gyroscopic sensors to be at least once still, depending on the required accuracy level.

According to the thirty-first aspect, by adjusting an extent to which the zero-point offset values approach angular velocities indicated by angular velocity data, the zero-point offset values can be set, depending on the required accuracy level of a game.

According to the thirty-second aspect, the process of determining whether or not the attitude of the input device is stable is periodically repeated during a game process. Therefore, an appropriate process can be executed, depending on whether or not it is necessary to cause the input device to be still during a game process.

According to the thirty-third aspect, the process of determining whether or not the attitude of the input device is stable is periodically repeated during a game process. When it is necessary to cause the input device to be still and stable during the game process and therefore it is difficult to continue the game process, it is possible to prompt the player to cause the gyroscopic sensors to be at least once still.

According to the thirty-fourth aspect, the process of determining whether or not the attitude of the input device is stable is periodically repeated during a game process. When it is necessary to cause an input device which is being used to execute the game process of a plurality of input devices to be still and stable, depending on the operation data, it is possible to prompt the player to cause the gyroscopic sensors to be at least once still.

According to the thirty-fifth aspect, the process of determining whether or not the attitude of the input device is stable is periodically repeated during a game process. When it is necessary to cause an input device whose operation data is not currently used in the game process of a plurality of input devices to be still and stable, it is possible to continue the game process without interruption, and in addition, a process of determining whether or not the attitude of the input device is stable can be periodically repeated in the background of the game process.

According to the thirty-sixth and thirty-seventh aspects, it is possible to easily determine whether or not the attitude of the input device is stable using angular velocity data obtained from the gyroscopic sensors.

According to the thirty-eighth aspect, a process can be executed using values which have been subjected to offset correction using the still-state outputs of the gyroscopic sensors. Also, the zero-point offset values are also corrected to approach angular velocities indicated by angular velocity data output from the gyroscopic sensors in the still state. Therefore, even if the zero-point offset values are initially set to device-specific values when the gyroscopic sensors are powered ON, the zero-point offset values can be caused to gradually converge to actual zero-point offset values by maintaining the gyroscopic sensors in the still state. Therefore, as the zero-point offset values converge, the angular velocities subjected to offset correction also approach the zero-point offset values. Therefore, by maintaining the gyroscopic sensors (input device) in the still state, it is finally determined that the attitude of the input device is stable.

According to the recording medium recording the game program of example embodiments of the present invention, an effect similar to that of the aforementioned game apparatus can be obtained.

These and other features, aspects and advantages of example embodiments of the present invention will become more apparent from the following detailed description of example embodiments of the present invention when taken in conjunction with the accompanying drawings.

DESCRIPTION OF THE EXAMPLE EMBODIMENTS

Figure 1:
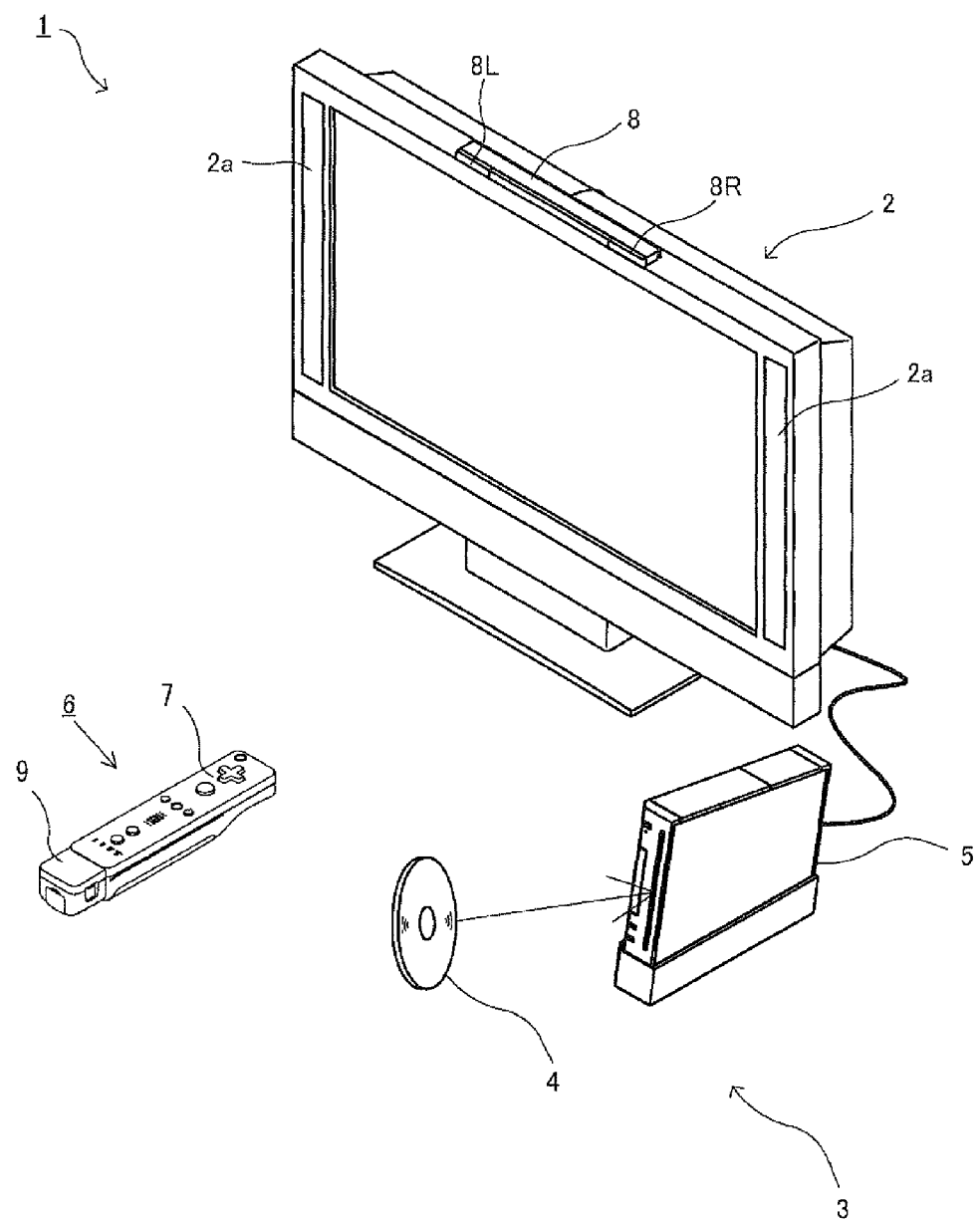
FIG. 1 is an external view for describing a game system 1 according to an example embodiment of the present invention.
Figure 2:
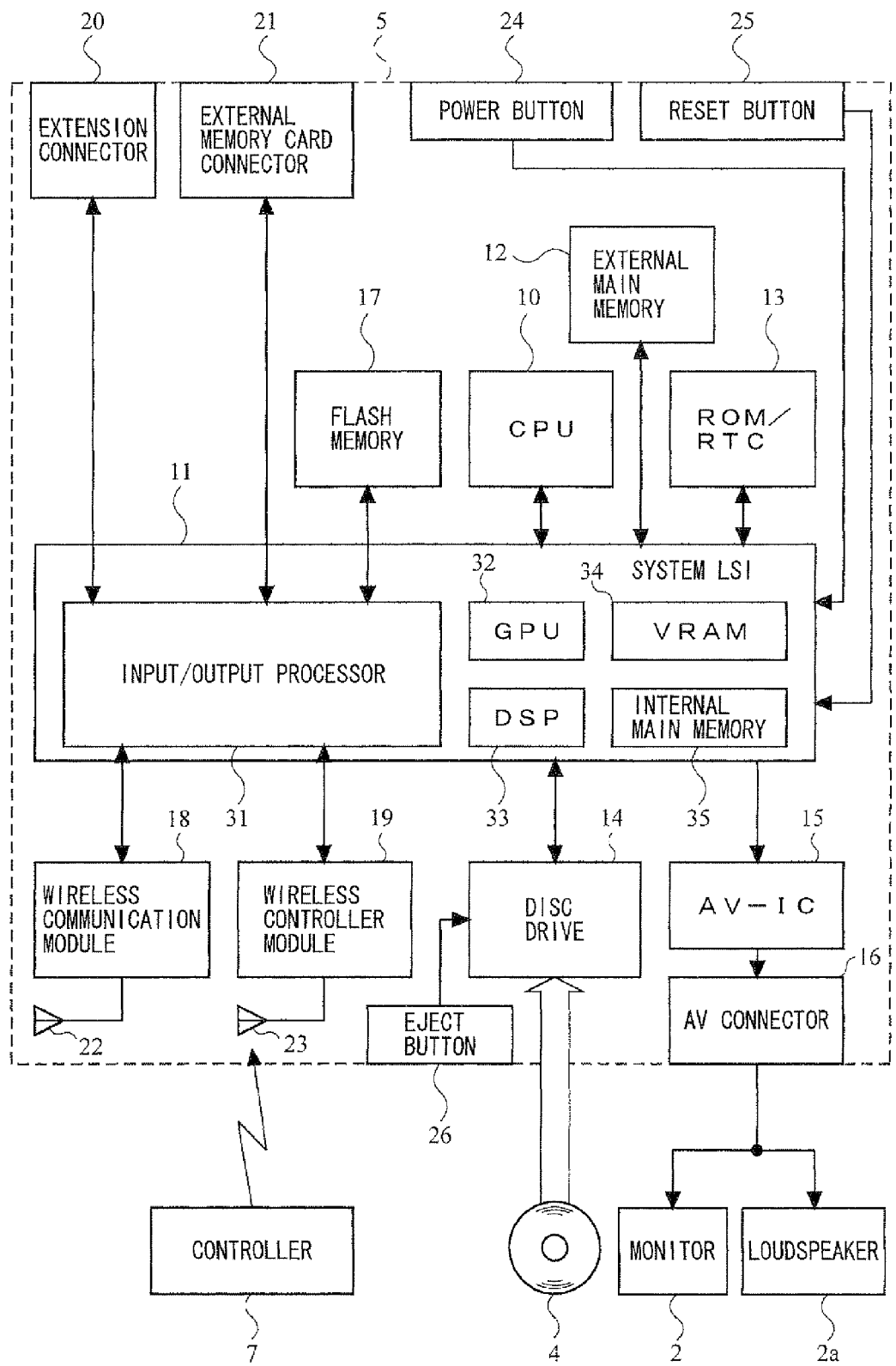
FIG. 2 is a functional block diagram of a game apparatus main body 5 of FIG. 1.

A game apparatus for executing a game program according to an example embodiment of the present invention will be described with reference to FIG. 1. Hereinafter, in order to specifically describe example embodiments of the present invention, a game system including a stationary game apparatus main body 5 as an example of the game apparatus will be described. Note that FIG. 1 is an external view of a game system 1 including a stationary game apparatus 3, and FIG. 2 is a block diagram of the game apparatus main body 5. Hereinafter, the game system 1 will be described.

In FIG. 1, the game system 1 includes a television set for home use (hereinafter referred to as a monitor) 2 as an exemplary display means, and the stationary game apparatus 3 connected to the monitor 2 via a connection cord. The monitor 2 includes a loudspeaker 2a for outputting sound based on an audio signal output from the game apparatus 3. The game apparatus 3 includes an optical disc 4 which stores a game program as an exemplary game program of example embodiments of the present invention, the game apparatus main body 5 including a computer for executing the game program of the optical disc 4 and outputting and displaying a game screen on the monitor 2, and an input device 6 for inputting, to the game apparatus main body 5, operational information required for a game in which a character or the like displayed on the game screen is operated.

The game apparatus main body 5 includes a wireless controller module 19 (see FIG. 2). The wireless controller module 19 receives data which is wirelessly transmitted from the input device 6, and transmits data from the game apparatus main body 5 to the input device 6, i.e., connects the input device 6 and the game apparatus main body 5 via wireless communication. The optical disc 4 which is an exemplary information storing medium changeable with respect to the game apparatus main body 5 is detachably attached to the game apparatus main body 5.

A flash memory 17 (see FIG. 2) which functions as a backup memory for fixedly storing saved data or the like is provided in the game apparatus main body 5. The game apparatus main body 5 executes a game program or the like stored on the optical disc 4, and displays a result of the execution as a game image on the monitor 2. In addition to the game program or the like stored on the optical disc 4, those previously stored in the flash memory 17 may be executed. The game apparatus main body 5 can also reproduce a game state which was executed in the past, using the saved data stored in the flash memory 17, and display a game image on the monitor 2. The player of the game apparatus 3 can enjoy events of the game by operating the input device 6 while watching the game image displayed on the monitor 2.

The input device 6 is used to input, to the game apparatus main body 5, operation data indicating an operation that is performed with respect to the input device 6. In this embodiment, the input device 6 includes a controller 7 and an angular velocity detecting unit 9. In the input device 6, the angular velocity detecting unit 9 is detachably connected to the controller 7, which will be described in detail below.

The controller 7 wirelessly transmits transmission data, such as operational information or the like, to the game apparatus main body 5 including the wireless controller module using, for example, the Bluetooth® technique. The controller 7 is provided with a housing having a size which allows the player to hold the controller 7 with one hand, and a plurality of operation buttons (including a cross key, a stick, and the like) provided and exposed on a surface of the housing. The controller 7 also includes an image capture information computing section for capturing an image viewed from the controller 7 as specifically described below. As exemplary objects whose images to be captured by the image capture information computing section 74, two LED modules (hereinafter referred to as markers) 8L and 8R are provided in the vicinity of the display screen of the monitor 2. The markers 8L and 8R each emit infrared light toward the front of the monitor 2. The controller 7 can also receive transmission data wirelessly transmitted from the wireless controller module 19 of the game apparatus main body 5 using a communication section 75, and generate sound or vibration depending on the transmission data.

Next, an internal configuration of the game apparatus main body 5 will be described with reference to FIG. 2. FIG. 2 is a block diagram showing the configuration of the game apparatus main body 5. The game apparatus main body 5 has a CPU (Central Processing Unit) 10, a system LSI (Large Scale Integration) 11, an external main memory 12, a ROM/RTC (Read Only Memory/Real Time Clock) 13, a disc drive 14, an AV-IC (Audio Video-Integrated Circuit) 15, and the like.

The CPU 10 executes a game process by executing a game program stored on the optical disc 4, and serves as a game processor. The CPU 10 is connected to the system LSI 11. In addition to the CPU 10, the external main memory 12, the ROM/RTC 13, the disc drive 14, and the AV-IC 15 are connected to the system LSI 11. The system LSI 11 controls data transfer between each part connected thereto, generation of an image to be displayed, acquisition of data from an external apparatus, and the like. Note that an internal configuration of the system LSI 11 will be described below. The volatile external main memory 12 stores a program, such as a game program read out from the optical disc 4, a game program read out from a flash memory 17, or the like, or stores various data, i.e., is used as a work area or a buffer area of the CPU 10. The ROM/RTC 13 has a ROM (so-called boot ROM) that stores a boot program for starting up the game apparatus 3, and a clock circuit (RTC: Real Time Clock) that counts time. The disc drive 14 reads out program data, texture data or the like from the optical disc 4, and writes the read data into an internal main memory 11e or the external main memory 12.

The system LSI 11 also includes an input/output processor 31, a GPU (Graphics Processor Unit) 32, a DSP (Digital Signal Processor) 33, a VRAM (Video RAM) 34, and an internal main memory 35. The parts 31 to 35 are interconnected via an internal bus (not shown).

The GPU 32, which is a part of a drawing means, generates an image in accordance with a graphics command (drawing instruction) from the CPU 10. The VRAM 34 stores data (polygon data, texture data, etc.) required for the GPU 32 to execute the graphics command. When an image is generated, the GPU 32 produces image data using data stored in the VRAM 34.

The DSP 33, which functions as an audio processor, generates audio data using sound data or sound waveform (tone color) data stored in the internal main memory 35 or the external main memory 12.

The image data and audio data thus generated are read out by the AV-IC 15. The AV-IC 15 outputs the read image data via an AV connector 16 to the monitor 2 and the read audio data to the loudspeaker 2a included in the monitor 2. Thereby, an image is displayed on the monitor 2 while sound is output from the loudspeaker 2a.

The input/output (I/O) processor 31 transmits and receives data to and from parts connected thereto, and also downloads data from an external apparatus. The input/output processor 31 is connected to the flash memory 17, a wireless communication module 18, the wireless controller module 19, an extension connector 20, and a memory card connector 21. An antenna 22 is connected to the wireless communication module 18, and an antenna 23 is connected to the wireless controller module 19.

The input/output processor 31 is connected via the wireless communications module 18 and the antenna 22 to a network, which allows the input/output processor 31 to communicate with other game apparatuses or servers connected to the network. The input/output processor 31 regularly accesses the flash memory 17 to detect the presence or absence of data that needs to be transmitted to the network, and when such data is present, outputs the data via the wireless communications module 18 and the antenna 22 to the network. The input/output processor 31 also receives data transmitted from other game apparatuses or data downloaded from download servers, via the network, the antenna 22 and the wireless communications module 18, and stores the received data into the flash memory 17. The CPU 10 executes a game program to read out data from the flash memory 17 and uses the data in the game program. In the flash memory 17, save data (result data or intermediate data of a game) of a game that a user plays using the game apparatus main body 5 may be stored in addition to data that the game apparatus main body 5 transmits and receives to and from other game apparatuses or servers.

The input/output processor 31 also receives operation data or the like transmitted from the controller 7, via the antenna 23 and the wireless controller module 19, and stores (temporarily stores) the data into a buffer area of the internal main memory 35 or the external main memory 12. Note that the internal main memory 35 may store a program, such as a game program read out from the optical disc 4, a game program read out from the flash memory 17, or the like, and a variety of data, and may be used as a work area or a buffer area for the CPU 10, as with the external main memory 12.

Further, the extension connector 20 and the memory card connector 21 are connected to the input/output processor 31. The extension connector 20 is a connector for interface, such as USB or SCSI, to which a medium (an external storage medium, etc.), a peripheral apparatus (another controller, etc.), or a wired communication connector may be connected. Communication with the network can be achieved via the wired communication connector instead of the wireless communication module 18. The memory card connector 21 is a connector for connecting an external storage medium, such as a memory card or the like. For example, the input/output processor 31 can access an external storage medium via the extension connector 20 or the memory card connector 21 to save data into or read data from the external storage medium.

The game apparatus main body 5 (e.g., a front main surface) includes a power button 24 for the game apparatus main body 5, a reset button 25 for a game process, a slot through which the optical disc 4 is loaded or unloaded, an eject button 26 for removing the optical disc 4 through the slot of the game apparatus main body 5, and the like. The power button 24 and the reset button 25 are connected to the system LSI 11. When the power button 24 is turned ON, power is supplied via an AC adaptor (not shown) to each part of the game apparatus main body 5. When the reset button 25 is pressed, the system LSI 11 restarts up the boot program of the game apparatus main body 5. The eject button 26 is connected to the disc drive 14. When the eject button 26 is pressed, the optical disc 4 is ejected from the disc drive 14.

Figure 3:
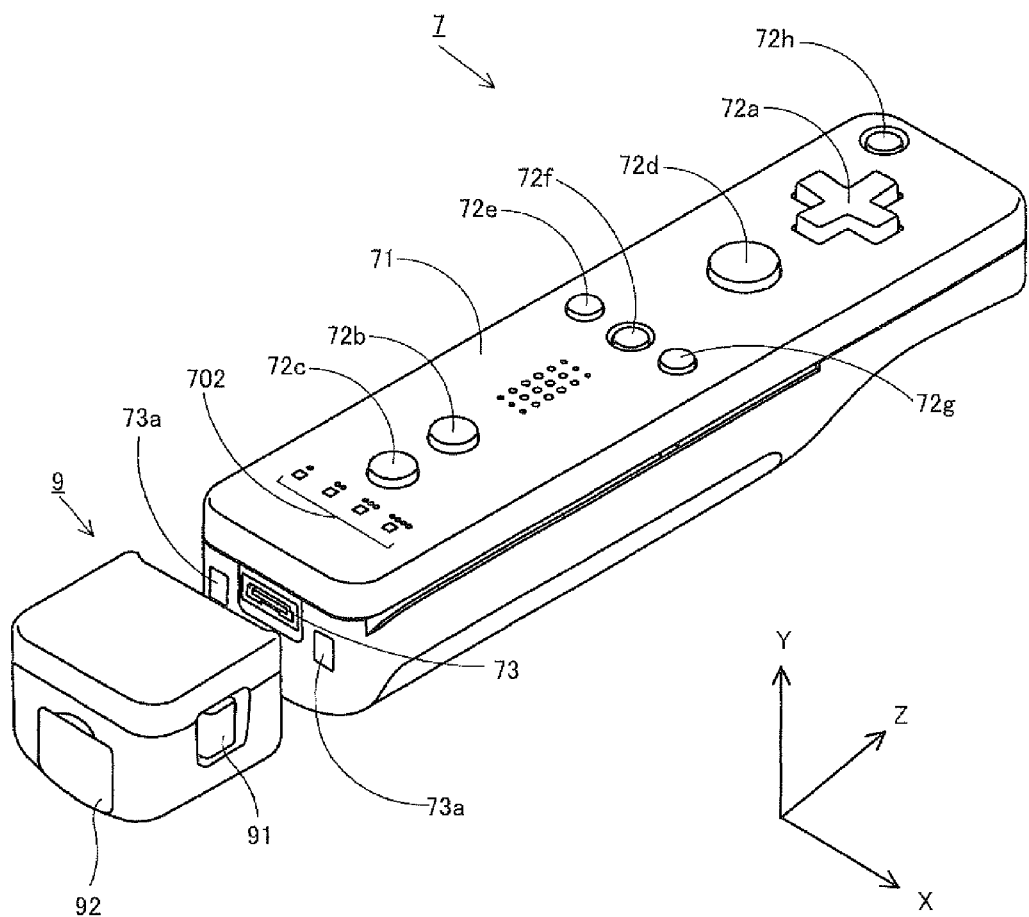
FIG. 3 is a perspective view of an input device 6 of FIG. 1 as viewed from the top and the rear.
Figure 4:
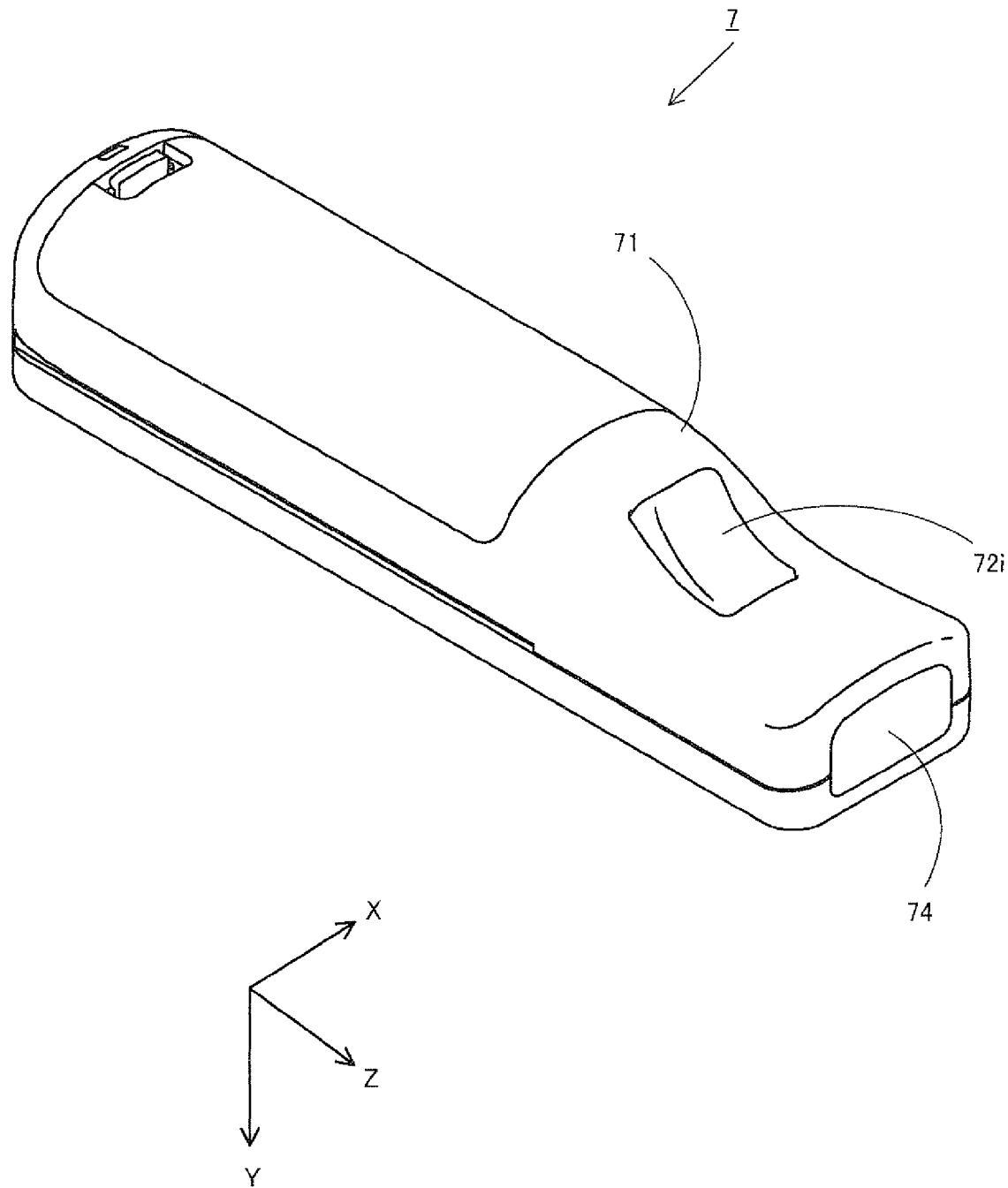
FIG. 4 is a perspective view of a controller 7 of FIG. 3 as viewed from the bottom and the front.

The input device 6 will be described with reference to FIGS. 3 and 4. FIG. 3 is a perspective view of the input device 6 as viewed from the top and the rear. FIG. 4 is a perspective view of the controller 7 as viewed from the bottom and the front.

In FIGS. 3 and 4, the controller 7 has a housing 71 which is formed by, for example, plastic molding. A plurality of operation portions 72 are provided on the housing 71. The housing 71 is in the shape of substantially a rectangular parallelepiped where a front-rear direction is a longitudinal direction. The whole housing 71 has a size that enables an adult and a child to hold the controller 7 with one hand.

A cross key 72a is provided on a central portion closer to a front surface of an upper surface of the housing 71. The cross key 72a is a four-direction push switch in the shape of a cross, and has operation portions corresponding to the respective four directions (frontward, rearward, leftward, and rightward), the operation portions being provided at the respective projecting pieces of the cross which are arranged at intervals of 90°. The frontward, rearward, leftward and rightward directions are selected by a player pushing down the respective corresponding operation portions of the cross key 72a. For example, by a player operating the cross key 72a, a movement direction of a player character or the like appearing in a virtual game world can be designated, or one can be selected and designated from a plurality of options.

Note that the cross key 72a is an operation section which outputs an operation signal, depending on the above-described direction input operation by a player, or may be an operation section of other embodiments. For example, an operation section may be provided in which four push switches are disposed in cross directions, and an operation signal is output, depending on a push switch pushed down by a player. In addition to the four push switches, a center switch may be provided at an intersection position of the cross directions, i.e., a complex operation section composed of the four push switches and the center switch may be provided. Also, instead of the cross key 72a, an operation section may be provided which outputs an operation signal, depending on a tilt direction of a tiltable stick (so-called joystick) which projects from the upper surface of the housing 71. Also, instead of the cross key 72a, an operation section may be provided which outputs an operation signal, depending on a slide direction of an disc-like member which can be moved in a horizontal direction. Also, a touch pad may be provided instead of the cross key 72a.

A plurality of operation buttons 72b to 72g are provided at the rear of the cross key 72a on the upper surface of the housing 71. The operation buttons 72b to 72g are operation sections which output operation signals assigned to the respective operation buttons 72b to 72g when a player pushes down the head portions of the respective buttons. For example, functions of a 1st button, a 2nd button, an A button, and the like are assigned to the operation buttons 72b to 72d. Functions of a minus switch, a home switch, a plus button, and the like are assigned to the operation buttons 72e to 72g. The operation buttons 72a to 72g are assigned the respective functions, depending on a game program executed by the game apparatus main body 5. Note that, in the exemplary arrangement of FIG. 3, the operation buttons 72b to 72d are aligned on a central portion in a front-to-rear direction of the upper surface of the housing 71. The operation buttons 72e to 72g are aligned in a lateral direction on the upper surface of the housing 71 and between the operation buttons 72*b* and 72*d*. The operation button 72*f* is a button of a type whose upper surface is buried below the upper surface of the housing 71 so that a player is prevented from unintentionally and erroneously pushing down the button.

Also, an operation button 72*h* is provided at the front of the cross key 72*a* on the upper surface of the housing 71. The operation button 72*h* is a power supply switch which remotely switches ON/OFF a power supply for the game apparatus main body 5. The operation button 72*h* is also a button of the type whose upper surface is buried below the upper surface of the housing so that a player is prevented from unintentionally and erroneously pushing down the button.

A plurality of LEDs 702 are provided at the rear of the operation button 72*c* of the upper surface of the housing 71. Here, the controller 7 is assigned controller identification (number) so as to distinguish it from other controllers 7. For example, the LEDs 702 are used so as to inform the player of controller identification currently set for the controller 7. Specifically, a signal for turning ON an LED corresponding to the controller type of the plurality of LEDs 702 is transmitted from the wireless controller module 19 to the controller 7.

Also, sound holes through which sound is emitted from a loudspeaker (a loudspeaker 706 of FIG. 5) described below to the outside are formed between the operation button 72*b* and the operation buttons 72*e* to 72*g* on the upper surface of the housing 71.

On the other hand, a hollow portion is formed on a lower surface of the housing 71. The hollow portion on the lower surface of the housing 71 is formed at a position where the index finger or the middle finger of a player is placed when the player holds the controller 7 with one hand while directing a front surface of the controller 7 toward the markers 8L and 8R. An operation button 72*i* is provided on a rear slope surface of the hollow portion. The operation button 72*i* is an operation section which functions as, for example, a B button.

An image capturing element 743 which is a part of the image capture information computing section 74 is provided on a front surface of the housing 71. Here, the image capture information computing section 74 is a system for analyzing image data captured by the controller 7 to determine a place having a high luminance in the image data and detecting a center-of-gravity position or a size of the place. The image capture information computing section 74 has, for example, a maximum sampling cycle of about 200 frames/sec, and therefore, can track and analyze relatively high-speed movement of the controller 7. A detailed structure of the image capture information computing section 74 will be described below. A connector 73 is provided on a rear surface of the housing 71. The connector 73 is, for example, an edge connector which is utilized so as to be engaged and connected with a connection cable. In the case of the input device 6 of FIGS. 1 and 3, the angular velocity detecting unit 9 is detachably connected to the rear surface of the controller 7 via the connector 73.

Here, in order to specifically describe example embodiments of the present invention, a coordinate system which is set with respect to the input device 6 (controller 7) is defined. As illustrated in FIGS. 3 and 4, X-, Y- and Z-axes, which are orthogonal to each other, are defined with respect to the input device 6 (controller 7). Specifically, a front-to-rear direction of the controller 7 (the longitudinal direction of the housing 71) is assumed to be the Z-axis, and a front surface (a surface on which the image capture information computing section 74 is provided) direction of the controller 7 is assumed to be the positive direction of the Z-axis. A vertical direction of the controller 7 is assumed to be the Y-axis, and an upper surface (a surface on which the operation button 72*a* is provided) direction of the housing 71 is assumed to be the positive direction of the Y-axis. A lateral direction of the controller 7 is assumed to be the X-axis, and a right side surface (a side surface illustrated in FIG. 3) direction of the housing 71 is assumed to be the positive direction of the X-axis.

Figure 7:
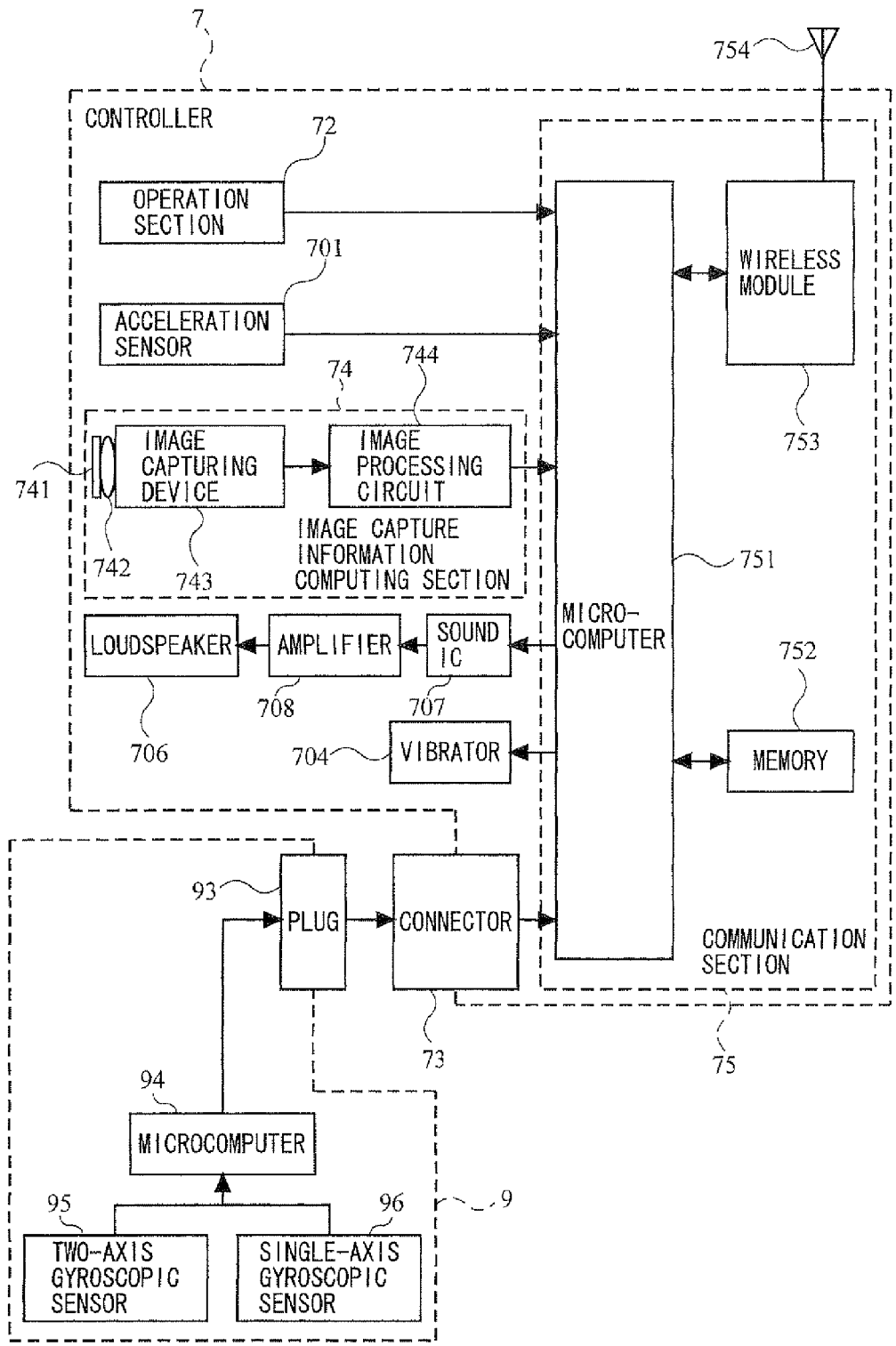
FIG. 7 is a block diagram showing a configuration of the input device 6 of FIG. 3.

The angular velocity detecting unit 9 has gyroscopic sensors for sensing angular velocities around three axes (a two-axis gyroscopic sensor 95 and a single-axis gyroscopic sensor 96 shown in FIG. 7). The angular velocity detecting unit 9 is provided with a plug (plug 93 shown in FIG. 7) connectable to the connector 73 at a front end thereof (an end portion in the positive direction of the Z-axis in FIG. 3). Moreover, hooks (not shown) are provided on both sides of the plug 93. When the angular velocity detecting unit 9 is attached to the controller 7, the plug 93 is connected to the connector 73 while the hooks engage with engaging holes 73*a* of the controller 7. Therefore, the controller 7 and the angular velocity detecting unit 9 are firmly joined with each other. The angular velocity detecting unit 9 also has buttons 91 on side surfaces (surfaces in the X-axis direction in FIG. 3). The buttons 91 are configured to release the engaging state of the hooks with the engaging holes 73*a* when they are pressed down. Therefore, by pulling the plug 93 out of the connector 73 while pressing down the buttons 91, the angular velocity detecting unit 9 can be removed from the controller 7.

The angular velocity detecting unit 9 is also provided with a connector having the same shape as that of the connector 73 at a rear end thereof. Therefore, other devices which can be attached to the controller 7 (the connector 73 thereof) can also be attached to the rear-end connector of the angular velocity detecting unit 9. Note that, in FIG. 3, a cover 92 is detachably attached to the rear-end connector.

Figure 5:
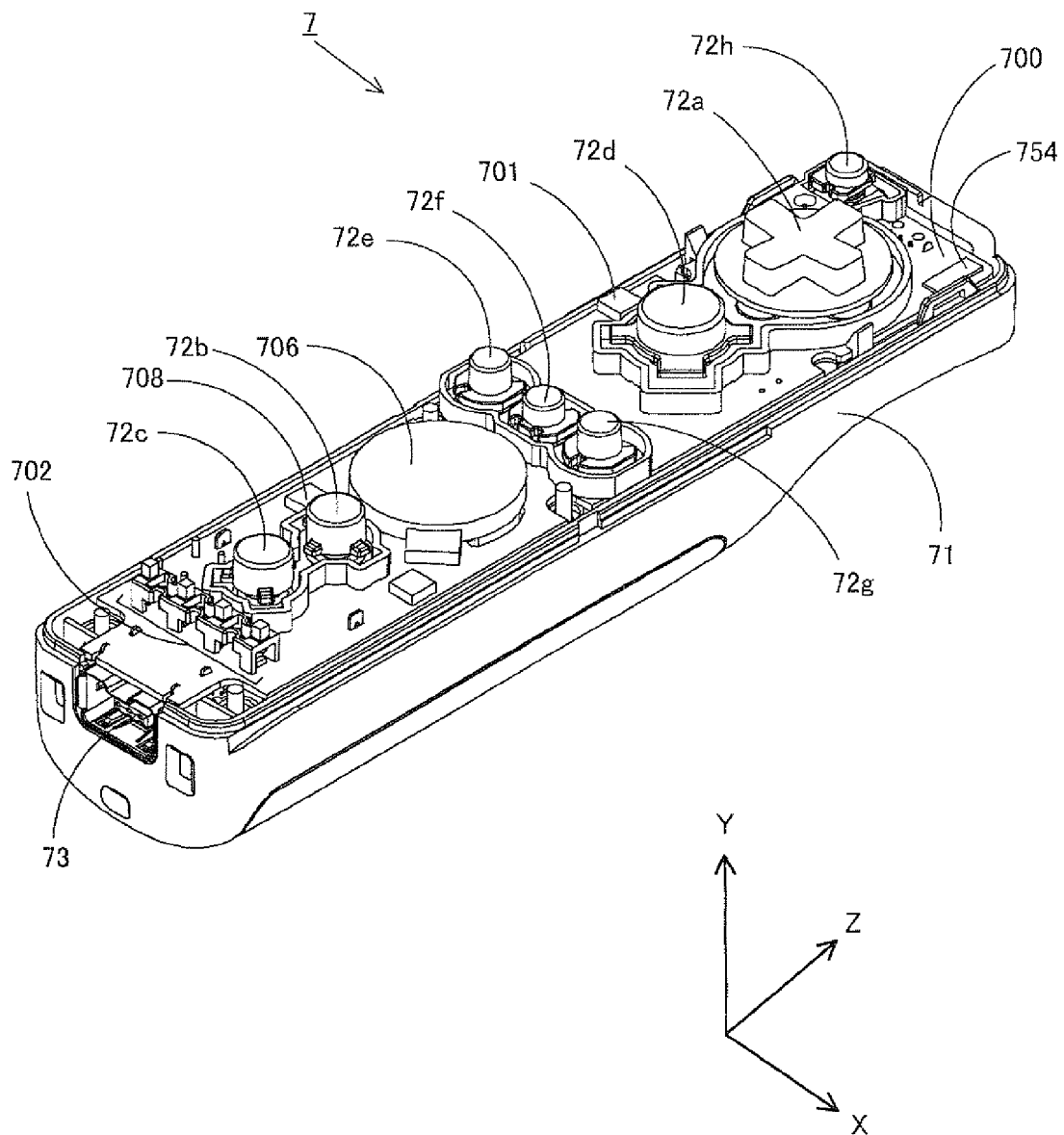
FIG. 5 is a perspective view of the controller 7 of FIG. 3, where an upper housing of the controller 7 is removed.
Figure 6:
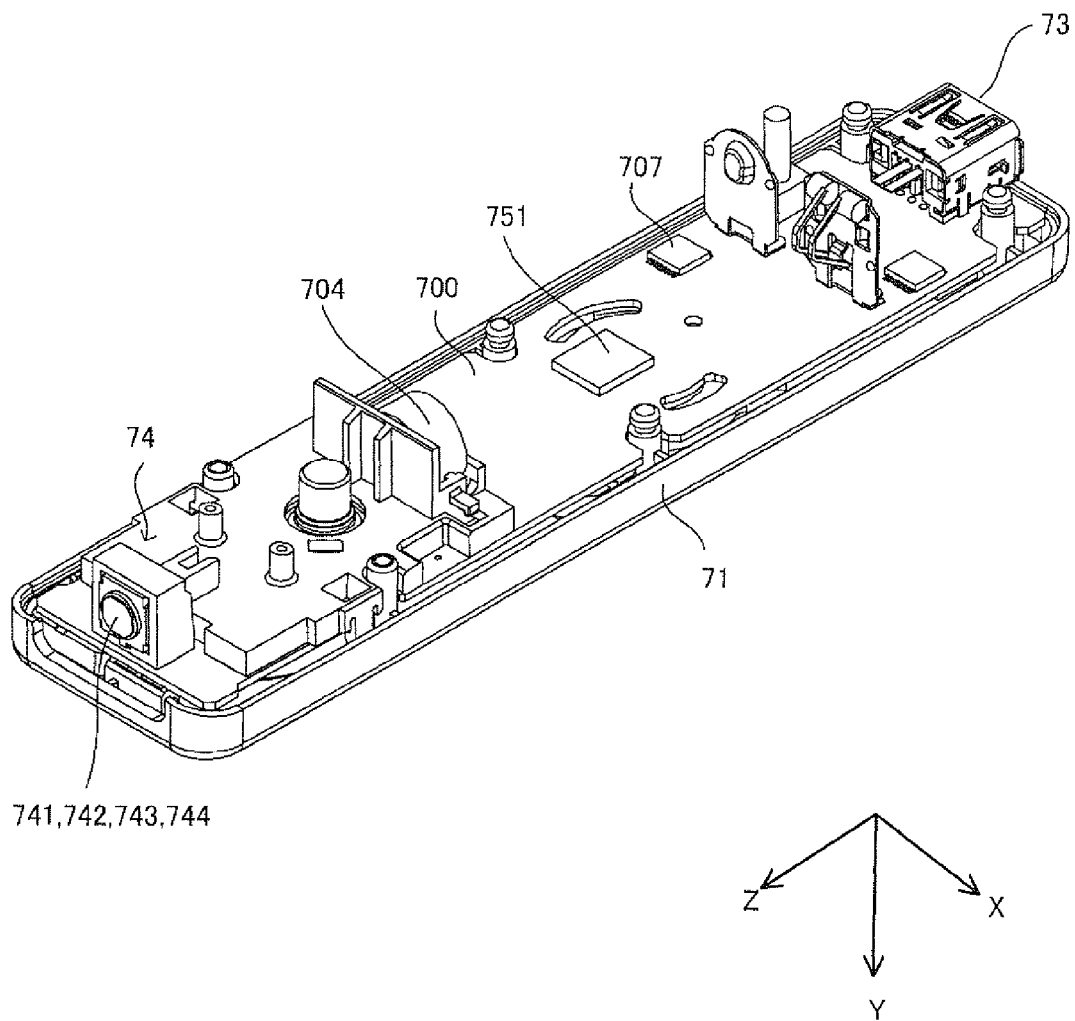
FIG. 6 is a perspective view of the controller 7 of FIG. 4, where a lower housing of the controller 7 is removed.

Next, an internal structure of the controller 7 will be described with reference to FIGS. 5 and 6. Note that FIG. 5 is a perspective view of the controller 7 (as viewed from a rear surface side thereof) where an upper housing (a portion of the housing 71) is cut away. FIG. 6 is a perspective view of the controller 7 (as viewed from a front surface side thereof) where a lower housing (a portion of the housing 71) is cut away. FIG. 6 illustrates a perspective view of a base board 700 of FIG. 5 as viewed from a bottom surface thereof.

In FIG. 5, the base board 700 is fixed inside the housing 71. On an upper major surface of the base board 700, the operation buttons 72*a* to 72*h*, an acceleration sensor 701, the LEDs 702, an antenna 754, and the like are provided. These are connected to a microcomputer 751 (see FIGS. 6 and 7) via a conductor (not shown) formed on the base board 700 and the like. Also, by a radio module 753 (see FIG. 7) and an antenna 754, the controller 7 functions as a wireless controller. Note that a quartz oscillator (not shown) is provided in the housing 71, and generates a basic clock for the microcomputer 751 (described below). Also, the loudspeaker 706 and an amplifier 708 are provided on the upper major surface of the base board 700. Also, the acceleration sensor 701 is provided on a left side of the operation button 72*d* on the base board 700 (i.e., a peripheral portion of the base board 700, but not a center portion thereof). Therefore, the acceleration sensor 701 can detect an acceleration including a component due to a centrifugal force as well as a change in direction of a gravitational acceleration, depending on a rotation of the controller 7 around the longitudinal direction as an axis. Therefore, by predetermined computation, the rotation of the controller 7 can be determined based on the detected acceleration data with satisfactory sensitivity by the game apparatus main body 5 or the like.

On the other hand, in FIG. 6, the image capture information computing section 74 is provided at a front edge on a lower major surface of the base board 700. The image capture information computing section 74 is composed of an infrared filter 741, a lens 742, an image capturing element 743, and an image processing circuit 744, which are arranged in this order from the front of the controller 7, and are attached on the lower major surface of the base board 700. A connector 73 is attached to a rear edge on the lower major surface of the base board 700. Also, a sound IC 707 and the microcomputer 751 are provided on the lower major surface of the base board 700. The sound IC 707 is connected to the microcomputer 751 and the amplifier 708 via conductors formed on the base board 700 and the like, and outputs an audio signal via the amplifier 708 to the loudspeaker 706, depending on sound data transmitted from the game apparatus main body 5.

A vibrator 704 is attached onto the lower major surface of the base board 700. The vibrator 704 may be, for example, a vibration motor or a solenoid. The vibrator 704 is connected to the microcomputer 751 via a conductor formed on the base board 700 and the like, and its activation is switched ON/OFF, depending on vibration data transmitted from the game apparatus main body 5. The activation of the vibrator 704 generates vibration in the controller 7, so that the vibration is transferred to a player's hand holding the controller 7, thereby making it possible to achieve a so-called vibration-feature supporting game. Here, since the vibrator 704 is disposed somehow closer to the front of the housing 71, the housing 71 significantly vibrates while the player is holding the controller 7, so that the player easily feels vibration.

Next, an internal configuration of the input device 6 (the controller 7 and the angular velocity detecting unit 9) will be described with reference to FIG. 7. Note that FIG. 7 is a block diagram illustrating the configuration of the input device 6.

In FIG. 7, the controller 7 includes the communication section 75 in addition to the operation section 72, the image capture information computing section 74, the acceleration sensor 701, the vibrator 704, the loudspeaker 706, the sound IC 707, and the amplifier 708.

The image capture information computing section 74 includes the infrared filter 741, the lens 742, the image capturing element 743, and the image processing circuit 744. The infrared filter 741 passes only infrared light entering from the front of the controller 7. The lens 742 collects infrared light passing through the infrared filter 741 and causes the light to enter the image capturing element 743. The image capturing element 743 may be, for example, a solid-state image capturing element, such as a CMOS sensor or a CCD, and captures infrared light collected by the lens 742. Therefore, the image capturing element 743 captures only infrared light passing through the infrared filter 741 to generate image data. The image data generated by the image capturing element 743 is processed by the image processing circuit 744. Specifically, the image processing circuit 744 processes the image data obtained from the image capturing element 743 to sense a high luminance portion, and outputs process result data indicating a result of detection of position coordinates or an area thereof to the communication section 75. Note that the image capture information computing section 74 is fixed to the housing 71 of the controller 7, so that an image capturing direction thereof can be changed by changing the orientation of the housing 71 itself.

The controller 7 may include the acceleration sensor 701 which senses accelerations along with three axes (X-, Y- and Z-axes). The three-axis acceleration sensor 701 senses linear accelerations in three directions, i.e., a vertical direction (the Y-axis of FIG. 3), a lateral direction (the X-axis of FIG. 3), and a front-to-rear direction (the Z-axis of FIG. 3). Note that the acceleration sensor 701 may also be an acceleration detecting means which senses a linear acceleration along at least single-axis. For example, the acceleration sensors 701 may be of a type which is available from Analog Devices, Inc. or STMicroelectronics N.V. The acceleration sensor 701 is may be of a capacitance type (capacitance coupling type) based on a technique of MEMS (Micro Electro Mechanical Systems) obtained by micromachining silicon. However, any of one- to three-axis acceleration sensors 701 may be provided using a technique of existing acceleration detecting means (e.g., a piezoelectric type or a piezoelectric resistance type) or other appropriate techniques which will be developed in the future.

An acceleration detecting means used as the acceleration sensor 701 can sense only an acceleration (linear acceleration) along a straight line corresponding to each axis of the acceleration sensor 701. In other words, a direct output from the acceleration sensor 701 is a signal indicating a linear acceleration (static or dynamic) along each of the three axes. Therefore, the acceleration sensor 701 cannot directly sense physical properties, such as a motion along a non-linear path (e.g., an arc, etc.), a rotation, a rotational motion, an angular displacement, a tilt, a position, an attitude, and the like.

It would be easily understood by those skilled in the art from the description of the present specification that additional information about the controller 7 can be estimated or calculated (determined) by a computer, such as a processor (e.g., the CPU 10) of the game apparatus 3, a processor (e.g., the microcomputer 751) of the controller 7, or the like, performing a process based on an acceleration signal output from the acceleration sensor 701.

For example, the computer may execute a process, assuming that the controller 7 including the acceleration sensor 701 is in the static state (i.e., the acceleration sensor 701 detects only the acceleration of gravity). In this case, when the controller 7 is actually in the static state, it can be determined whether or not or how much the attitude of the controller 7 is tilted with respect of the direction of gravity based on the detected acceleration. Specifically, with reference to a state in which the detection axis of the acceleration sensor 701 is directed vertically downward, it can be determined whether or not 1 G (acceleration of gravity) is applied to the controller 7. Also, based on the magnitude of the acceleration applied to the detection axis direction, it can be determined how much the controller 7 is tilted with respect to the vertically downward direction. If the acceleration sensor 701 can detect accelerations in multiple axial directions, it can be determined in more detail how much the controller 7 is tilted with respect to the direction of gravity, by processing an acceleration signal detected for each axis. In this case, the processor may calculate a tilt angle of the controller 7 based on an output of the acceleration sensor 701, or without calculating the tilt angle, may approximately calculate how much the controller 7 is tilted based on the output of the acceleration sensor 701. Thus, the tilt, attitude or position of the controller 7 can be determined using a combination of the acceleration sensor 701 and the processor.

On the other hand, when the acceleration sensor 701 is assumed to be in a dynamic state, the acceleration sensor 701 detects an acceleration corresponding to a motion of the acceleration sensor 701 in addition to the acceleration-of-gravity component. Therefore, a direction of the motion of the controller 7 can be determined by removing the acceleration-of-gravity component from the detected acceleration by a predetermined process. Specifically, when the controller including the acceleration sensor 701 is accelerated and moved by a hand of the player, various motions and/or positions of the controller 7 can be calculated by processing an acceleration signal generated by the acceleration sensor 701. Note that even when the controller 7 is assumed to be in the dynamic state, the tilt of the controller 7 with respect to the direction of gravity can be determined by removing an acceleration corresponding to the motion of the acceleration sensor 701 from the detected acceleration by a predetermined process.

In other examples, the acceleration sensor 701 may include an incorporation-type signal processing device or other types of dedicated processing devices for performing a desired process with respect to an acceleration signal output from a built-in acceleration detecting means before outputting a signal to the microcomputer 751. For example, the incorporation-type or dedicated processing device, when used for detection of a static acceleration (e.g., a gravitational acceleration) by the acceleration sensor 701, may be for converting a sensed acceleration signal into a tilt angle corresponding thereto (or other parameters). Data indicating the accelerations sensed by the acceleration sensor 701 is output to the communication section 75.

The communication section 75 includes the microcomputer 751, the memory 752, the radio module 753, and the antenna 754. The microcomputer 751 controls the radio module 753 for wirelessly transmitting transmission data while using the memory 752 as a memory area during a process. Also, the microcomputer 751 controls operations of the sound IC 707 and the vibrator 704, depending on data from the game apparatus main body 3 which is received by the radio module 753 via the antenna 754. The sound IC 707 processes sound data or the like transmitted from the game apparatus main body 3 via the communication section 75. Also, the microcomputer 751 activates the vibrator 704, depending on vibration data (e.g., a signal for switching ON/OFF the vibrator 704) or the like transmitted from the game apparatus main body 3 via the communication section 75. The microcomputer 751 is also connected to the connector 73. Data transmitted from the angular velocity detecting unit 9 is input via the connector 73 to the microcomputer 751. Hereinafter, a configuration of the angular velocity detecting unit 9 will be described.

The angular velocity detecting unit 9 includes a plug 93, a microcomputer 94, a two-axis gyroscopic sensor 95 and a single-axis gyroscopic sensor 96. As described above, the angular velocity detecting unit 9 detects angular velocities about the three axes (the X-, Y- and Z-axes in this embodiment), and transmits data indicating the detected angular velocities (angular velocity data) to the controller 7.

The two-axis gyroscopic sensor 95 detects an angular velocity (per unit time) around the X-axis and an angular velocity (per unit time) around the Y-axis. The single-axis gyroscopic sensor 96 detects an angular velocity (per unit time) around the Z-axis. Note that directions of rotation around the X-, Y- and Z-axes with reference to the image capturing direction (the positive direction of the Z-axis) of the controller 7 are herein referred to as a roll direction, a pitch direction and a yaw direction, respectively. Specifically, the two-axis gyroscopic sensor 95 detects angular velocities in the roll direction (direction of rotation around the X-axis) and the pitch direction (direction of rotation around the Y-axis), and the single-axis gyroscopic sensor 96 detects an angular velocity in the yaw direction (direction of rotation around the Z-axis).

In this embodiment, the two-axis gyroscopic sensor 95 and the single-axis gyroscopic sensor 96 are used to detect angular velocities around the three axes. In other embodiments, any number and any combination of gyroscopic sensors may be used as long as angular velocities around the three axes can be detected. Note that when the two-axis gyroscopic sensor 95 and the single-axis gyroscopic sensor 96 may be collectively referred to as the gyroscopic sensors 95 and 96.

Data indicating angular velocities detected by the gyroscopic sensors 95 and 96 is output to the microcomputer 94. Therefore, the microcomputer 94 receives data indicating angular velocities around the three axes, i.e., the X-, Y- and Z-axes. The microcomputer 94 outputs the data indicating the angular velocities around the three axes as angular velocity data via the plug 93 to the controller 7. Note that the output of the microcomputer 94 to the controller 7 is successively performed at predetermined cycles. In this case, since a game is generally processed in units of 1/60 sec, the cycle may be shorter than 1/60 sec.

Getting back to the description of the controller 7, operation signals (key data) from the operation portions 72 provided in the controller 7, acceleration signals in the three axial directions (X-, Y- and Z-axis direction acceleration data) from the acceleration sensor 701, and process result data from the image capture information computing section 74, are output to the microcomputer 751. The microcomputer 751 temporarily stores the received data (the key data, the X-, Y- and Z-axis direction acceleration data, the process result data, and the angular velocity data about the X-, Y- and Z-axes), as transmission data to be transmitted to the wireless controller module 19, into the memory 752. Here, radio transmission from the communication section 75 to the wireless controller module 19 is performed in predetermined cycles. Since a game is generally processed in units of 1/60 sec, the cycle of the radio transmission needs to be shorter than 1/60 sec. Specifically, the game processing unit is 16.7 ms (1/60 sec), and the transmission interval of the communication section 75 employing Bluetooth® is 5 ms. When timing of transmission to the wireless controller module 19 arrives, the microcomputer 751 outputs transmission data stored in the memory 752, as a series of pieces of operational information, to the radio module 753. Thereafter, the radio module 753 emits a radio signal indicating the operational information from the antenna 754 using a carrier wave having a predetermined frequency by means of, for example, the Bluetooth® technique. Specifically, the key data from the operation portions 72 provided in the controller 7, the X-, Y- and Z-axis direction acceleration data from the acceleration sensor 701, the process result data from the image capture information computing section 74, and angular velocity data about the X-, Y- and Z-axes from the angular velocity detecting unit 9 are transmitted from the controller 7. Thereafter, the wireless controller module 19 of the game apparatus main body 5 receives the radio signal, and the game apparatus main body 5 demodulates or decodes the radio signal, thereby obtaining a series of pieces of operational information (the key data, the X-, Y- and Z-axis direction acceleration data, the process result data, and the angular velocity data about the X-, Y- and Z-axes). Thereafter, the CPU 10 of the game apparatus main body 5 performs a game process based on the obtained operational information and a game program. Note that, when the communication section 75 is configured using the Bluetooth® technique, the communication section 75 can also have a function of receiving transmission data wirelessly transmitted from other devices.

By using the input device 6, the player can perform an operation of tilting the controller 7 at any tilt angle in addition to a conventional general game operation of pressing down each operation button. In addition, the player can perform an operation of pointing any position on a screen using the input device 6 and an operation of moving the input device 6 itself.

Figure 8:
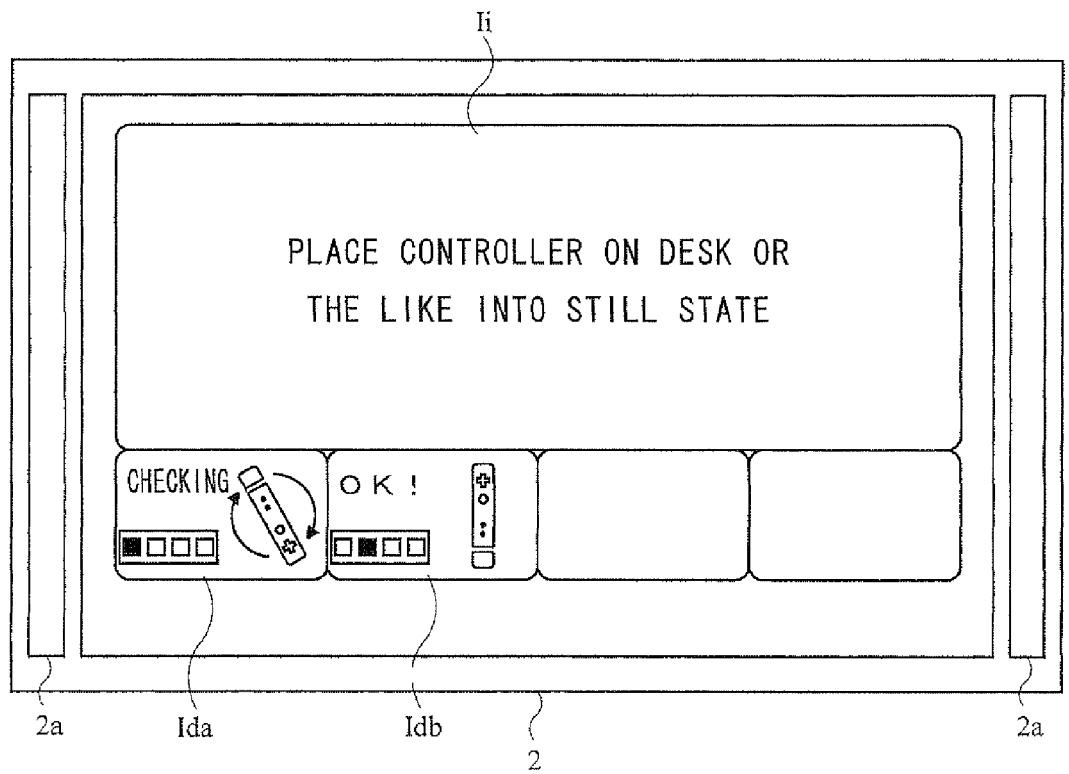
FIG. 8 is a diagram showing an exemplary gyroscopic sensor stability confirmation screen displayed on a monitor 2.
Figure 9:
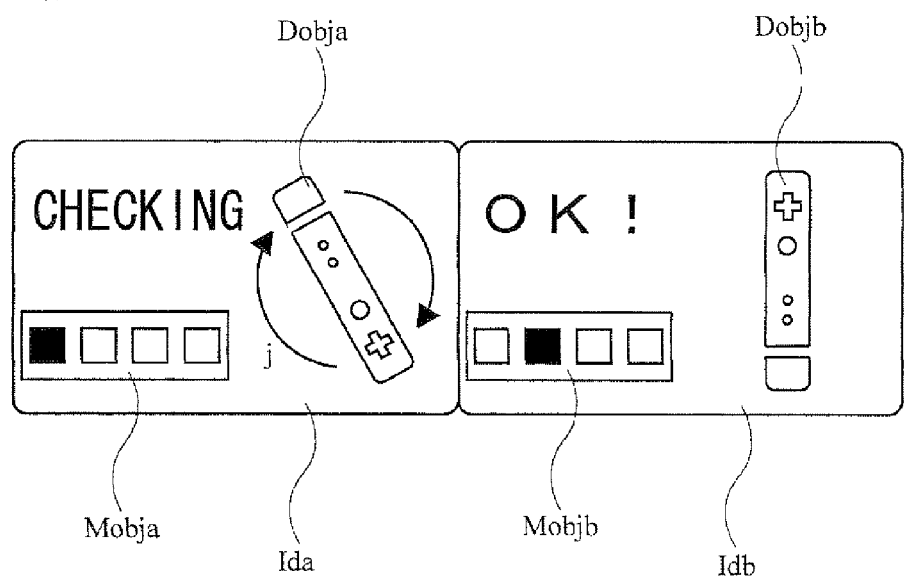
FIG. 9 is an enlarged view of input device stability information screens Ida and Idb included in the gyroscopic sensor stability confirmation screen of FIG. 8.

Next, before describing a specific process executed by the game apparatus main body 5, an outline of the process executed by the game apparatus main body 5 will be described with reference to FIGS. 8 and 9. Note that FIG. 8 is a diagram showing an exemplary gyroscopic sensor stability confirmation screen, which is displayed on the monitor 2. FIG. 9 is an enlarged view of exemplary input device stability information screens Ida and Idb included in the gyroscopic sensor stability confirmation screen of FIG. 8.

In this embodiment, in a specific situation from when the game system 1 is started up to when a game is executed to when the game is ended, a gyroscopic sensor stability confirmation screen is displayed on the monitor 2 when predetermined conditions are satisfied. For example, after booting of the game system 1 and before start of a game, the number of input devices 6 (typically, the number of players) to be used in the game is determined, and then a screen (gyroscopic sensor stability confirmation screen) for confirming the stability of the gyroscopic sensors 95 and 96 for each of the input devices 6. For example, as shown in FIG. 8, the gyroscopic sensor stability confirmation screen includes an asking information screen Ii indicating an operation which a player is asked to perform so as to cause the gyroscopic sensors 95 and 96 to be in the stable state, and an input device stability information screen Id indicating the stability confirmation state of the gyroscopic sensors 95 and 96 of the input device 6.

As used herein, "causing the gyroscopic sensors 95 and 96 to be stable" refers to a process for causing the gyroscopic sensors 95 and 96 to be in the still state and obtaining outputs (still-state outputs) of the gyroscopic sensors 95 and 96 in the still state. For example, the gyroscopic sensors 95 and 96 output angular velocity data around the X-, Y- and Z-axes with reference to the still-state outputs. As an example, the gyroscopic sensors 95 and 96 output voltages proportional to their detected angular velocities. The voltage is higher than the still-state output when the rotational angular velocity is positive, and is lower than the still-state output when the rotational angular velocity is negative. Therefore, if the still-state output that is set includes an error, angular velocities indicated by angular velocity data output from the gyroscopic sensors 95 and 96 also include errors. Therefore, if the correct still-state outputs of the gyroscopic sensors 95 and 96 are obtained while the gyroscopic sensors 95 and 96 are caused to be stable, correct angular velocities can be accordingly obtained. Thus, the player is prompted to cause the gyroscopic sensors 95 and 96 (the input device 6) to be still by displaying the gyroscopic sensor stability confirmation screen on the monitor 2, and is informed of an error which is currently occurs in the gyroscopic sensors 95 and 96 by displaying the current still states of the gyroscopic sensors 95 and 96 (the input device 6).

Here, the gyroscopic sensors 95 and 96 may previously have reference values (zero points) for outputting angular velocity data around the X-, Y- and Z-axes as fixed values, and the fixed values may be deviated from the actual still-state outputs. Also, even once the still-state outputs have been determined, the outputs of the gyroscopic sensors 95 and 96 may fluctuate with time. In this case, the still-state outputs also fluctuate with time (drift phenomenon). In order to reduce such errors in still-state outputs, the gyroscopic sensor stability confirmation screen is displayed on the monitor 2 so as to prompt the player to cause the gyroscopic sensors 95 and 96 to be still so that still-state outputs at that time are obtained.

Specifically, as the asking information screen Ii, information which prompts the player to place the input device 6 into the still state. For example, as the asking information screen Ii, letter information is displayed which provides the player to a message "place the controller on a desk or the like into the still state".

FIGS. 8 and 9 also show the input device stability information screens Ida and Idb indicating whether or not two input devices 6a and 10b are in the stable state, respectively, as an example. In FIG. 9, the input device stability information screen Id displays an input device object Dobj and an input device identification object Mobj, and letter information indicating whether or not the stability of the gyroscopic sensors 95 and 96 is being checked. For example, the input device identification object Mobj has a plurality of indicators for identifying an input device 6 of interest. By turning ON one of the indicators, the input device identification object Mobj can indicate a player corresponding to an input device 6 whose information is being displayed. For example, input device identification object Mobja displayed in the input device stability information screen Ida turns ON the leftmost indicator, which indicates that information displayed in the input device stability information screen Ida relates to an input device 6 (input device 6a) held by a first player. Input device identification object Mobjb displayed in the input device stability information screen Idb turns ON the second indicator from the left end, which indicates that information displayed in the input device stability information screen Idb relates to an input device 6 (input device 6b) held by a second player.

FIG. 9 shows the input device stability information screen Ida, which is an exemplary screen when the gyroscopic sensors 95 and 96 of the input device 6a are not in the stable state. When the gyroscopic sensors 95 and 96 of the input device 6a are not in the stable state, the input device object Dobja which is rotating in a direction j is displayed in the input device stability information screen Ida. The speed at which the input device object Dobja is rotating is set based on the magnitudes of angular velocities applied to the gyroscopic sensors 95 and 96. On the other hand, the input device stability information screen Idb is an exemplary screen when the gyroscopic sensors 95 and 96 of the input device 6b are in the stable state. When the gyroscopic sensors 95 and 96 of the input device 6b are in the stable state, the input device object Dobjb which is vertically oriented in the still state is displayed in the input device stability information screen Idb. Note that the rotational speed of the input device object Dobja which is rotating is slow immediately before the gyroscopic sensors 95 and 96 change from an unstable state to the stable state, and the attitude of the input device object Dobja at that time is not limited to the aforementioned vertical orientation. Therefore, the input device object Dobja is rotated from the attitude at that time into the aforementioned vertical orientation before being caused to be still. Note that even if the player moves the input device 6b after the stable states of the gyroscopic sensors 95 and 96 are once confirmed, the input device object Dobjb which is maintained in the vertical orientation and in the still state is displayed.

Thus, by visually recognizing the input device object Dobj, the player can easily recognize the states of the gyroscopic sensors 95 and 96 of the input device 6 held by themselves. For example, when an error is included in outputs of the gyroscopic sensors 95 and 96, the input device object Dobj is rotating even if the input device 6 is actually caused to be still, so that the error can be recognized by the player. The input device stability information screen Id is displayed on the monitor 2 if predetermined conditions are satisfied in a specific situation from when the game system 1 is started up to when a game is executed to when the game is ended. As clearly described below, the input device stability information screen Id is displayed on the monitor 2 in the following cases: (1) there is an input device 6 whose stability flag Sfrg is OFF after the number of input devices 6 to be used in a game is determined (typically, the number of players is determined); (2) the stability flag Sfrg is set to OFF during a game and the input device 6 thus turned OFF is used in the game at the current time; (3) a player performs an operation of displaying the input device stability information screen Id during a game; and the like. Therefore, the input device stability information screen Id is displayed as required in situations in the course of a game process, i.e., when the gyroscopic sensors 95 and 96 need to be still for the subsequent game processes, when a player wants to check errors occurring in the gyroscopic sensors 95 and 96, and the like.

Next, a game process executed in the game system 1 will be described in detail. Firstly, main data used in the game process will be described with reference to FIG. 10. Note that FIG. 10 is a diagram showing exemplary main data and an exemplary program stored in the external main memory 12 and/or the internal main memory 35 (hereinafter, the two main memories are collectively referred to as main memories) of the game apparatus main body 5.

Figure 10:
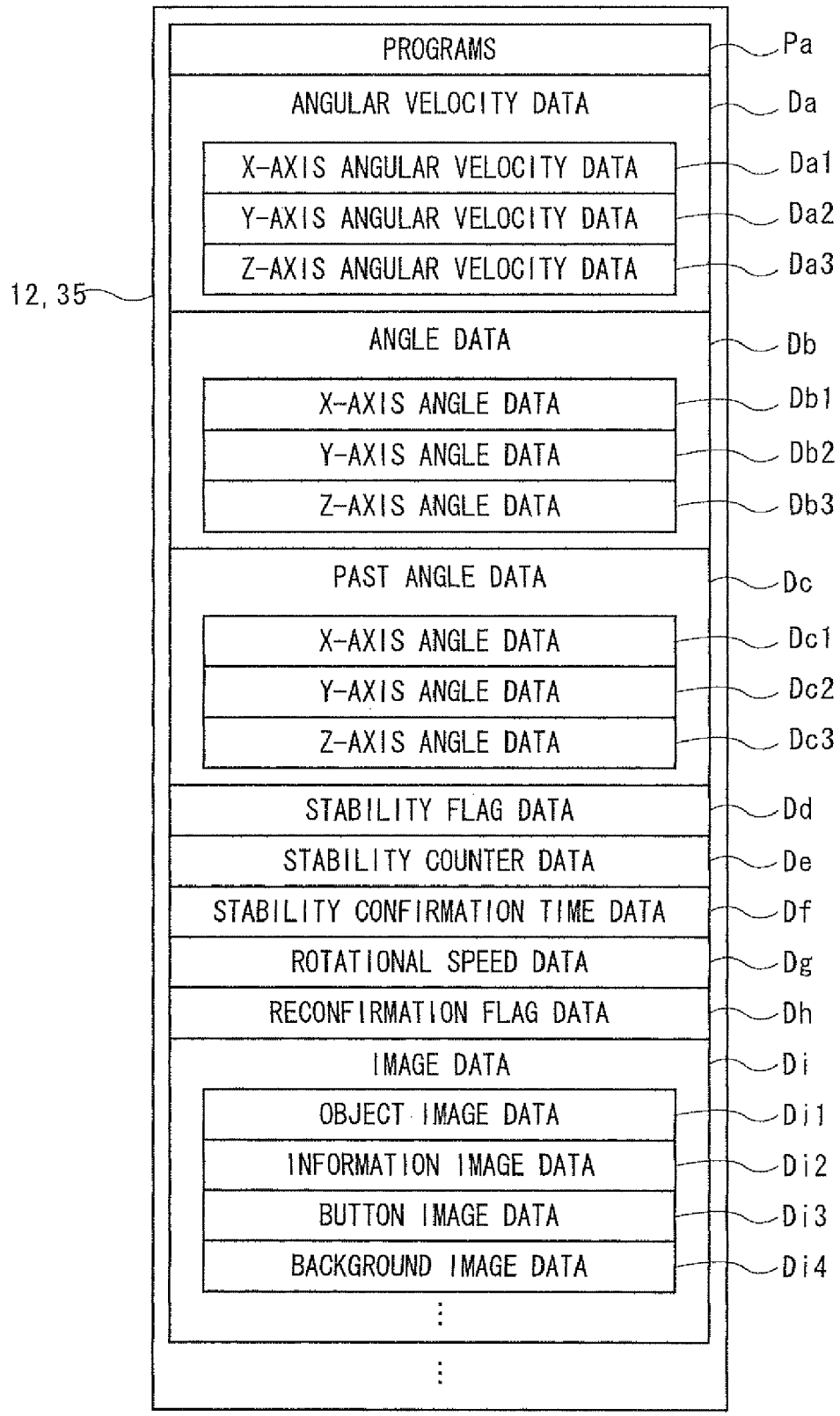
FIG. 10 is a diagram showing exemplary main data and program stored in a main memory of the game apparatus main body 5 of FIG. 1.

As shown in FIG. 10, the main memory has a data storage area for storing angular velocity data Da, angle data Db, past angle data Dc, stability flag data Dd, stability counter data De, stability confirmation time data Df, rotational speed data Dg, reconfirmation flag data Dh, image data Di, and the like. Note that, in addition the data of FIG. 10, the main memory stores data required for a game process, such as image data of various objects appearing in a game, data indicating various parameters of the objects, and the like. The main memory also has a program storage area for storing programs Pa included in a game program. A part of or all the programs Pa are read out from the optical disc 4 or other recording media and are stored into the main memory at an appropriate timing after the game apparatus main body 5 is powered ON.

The angular velocity data Da indicates angular velocities detected by the gyroscopic sensors 95 and 96 of the angular velocity detecting unit 9, and is stored, corresponding to each input device 6 which is used. For example, the angular velocity data Da indicates angular velocities occurring in the input device 6 (the gyroscopic sensors 95 and 96), and is included in a series of pieces of operational information transmitted as transmission data from the input device 6. The angular velocity data Da includes X-axis angular velocity data Da1 indicating an angular velocity v1 around the X-axis, Y-axis angular velocity data Da2 indicating an angular velocity v2 around the Y-axis, and Z-axis angular velocity data Da3 indicating an angular velocity v3 around the Z-axis, which are detected by the gyroscopic sensors 95 and 96. Note that the wireless controller module 19 included in the game apparatus main body 5 receives angular velocity data included in operational information which is transmitted at predetermined cycles (e.g., the cycle is 1/200 sec) from the controller 7, and the angular velocity data is stored in a buffer (not shown) included in the wireless controller module 19. Thereafter, for example, the angular velocity data stored in the buffer is read out every frame (game process cycle (e.g., 1/60 sec)) to update the angular velocity data Da in the main memory.

Note that angular velocity data which is stored into the angular velocity data Da as required has been subjected to predetermined correction before being stored. Hereinafter, exemplary correction of angular velocity data will be described.

For example, an angular velocity v indicated by angular velocity data output from the gyroscopic sensors 95 and 96 is subjected to first correction given by:

$$v \leftarrow v + (\text{sum}/ct - v) \times a$$

where ct represents the number of pieces of data which have been determined as falling within a stability range of a lower limit s1 and an upper limit s2, successively backward in time from the data buffer (not shown) in which the angular velocity v is stored (the number of successive pieces ct), and "sum" represents the sum of values in the data buffer which have been determined as falling within the stability range. Specifically, data buffers are checked in reverse order of time, i.e., backward in time from the data buffer in which the angular velocity v is stored, to obtain successive pieces of data falling within the stability range, and calculate the number of the pieces of data (ct) and the sum of values of the pieces of data (sum) (note that there is a limit of the number of data buffers to be checked). In the expression, "a" represents a level of stillness. The stillness level a takes a value within the range of 0 to 1. The longer the period of time during which the movements of the gyroscopic sensors 95 and 96 are small (stable), the closer the stillness level is to one. The stillness level a is also normalized to a maximum value of one when the number of successive pieces of data ct is equal to the upper limit of the number of data buffers to be checked, i.e., when the values of data buffers the number of which is equal to the upper limit of the number of data buffers to be checked, all fall within the stability range, successively backward in time from the data buffer in which the angular velocity v is stored.

Thereafter, a zero-point offset value (still-state output value) ofs is subtracted from the angular velocity v after the first correction (offset correction). Here, the zero-point offset value ofs is a value of data which is assumed to be obtained when the gyroscopic sensors 95 and 96 are still, and is set to a predetermined device-specific value. The zero-point offset value ofs is sequentially corrected and set again, depending on the angular velocity v after the first correction. Specifically, the zero-point offset value ofs is sequentially corrected and set again by:

$$ofs \leftarrow ofs + (v - ofs) \times a \times C$$

where C represents a constant (e.g., C=0.01). By setting the constant C to a small value, the angular velocity v is prevented from being quickly corrected to an angular velocity (zero point) of the input device 6 in the still state. The drift phenomenon, which causes a deviation of the still-state output value, is not a phenomenon in which the value significantly fluctuates, and therefore, a quick response is not required. Therefore, by setting the constant C to a small value, the zero-point offset value ofs can be highly accurately obtained. Note that the value of the constant C may be changed, depending on the type of a game in which the input device 6 is used. For example, the larger the product of the stillness level a and the constant C, i.e., the longer the period of time during which the movement of the input device 6 is small (i.e., stable), the closer the zero-point offset value ofs is corrected to be to the angular velocity v after the first correction. Therefore, if the input device 6 is in the still state, the zero-point offset value ofs converges to the angular velocity v after the first correction at a larger rate. In other words, if a change in angular velocity is small (e.g., when the gyroscopic sensors 95 and 96 are still), the zero point is corrected in a manner which causes the zero point to approach the average value. In other words, once the input device 6 comes to the still state, an error is removed from subsequent angular velocities by correction. Therefore, in this embodiment, by checking the stability, a game can be performed while errors in the gyroscopic sensors 95 and 96 have been removed.

Thereafter, the angular velocity v after the first correction is subjected to offset correction using the zero-point offset value ofs. For example, the angular velocity v after the first correction is subjected to offset correction given by:

$$v \leftarrow v - ofs$$

As a result, the angular velocity v indicated by angular velocity data output from the gyroscopic sensors 95 and 96 is corrected again, taking a zero point (still-state output value) into consideration. Thereafter, the angular velocity v after the offset correction is used to update the angular velocity data Da as appropriate. Note that angular velocity data which is stored in the angular velocity data Da as required may be one that has been subjected only to the offset correction without the first correction. Also, while the zero-point offset value ofs may be fixed, only the offset correction may be performed. In this case, if an error is included in the zero point, the error is not automatically corrected only by causing the input device 6 to be still. However, it is possible to confirm at least the presence of the error by the following process.

The angle data Db is angle data which is obtained by accumulating angular velocities detected by the gyroscopic sensors 95 and 96 of the angular velocity detecting unit 9, and is stored, corresponding to each input device 6 which is used. Here, the angle data Db indicates an attitude (angle) of the input device 6 (the gyroscopic sensors 95 and 96), and is previously calculated using angular velocity data included in a series of pieces of operational information transmitted as transmission data from the input device 6. When the aforementioned angular velocity v after the correction is used, the attitude (angle) of the input device 6 can be calculated based on the angular velocity v. Any method may be used to calculate the attitude of the input device 6 from the angular velocity v. For example, there is a method of sequentially adding the angular velocity v (per unit time) to an initial attitude. Specifically, the angular velocity v which is sequentially output from the gyroscopic sensors 95 and 96 and is corrected, is integrated, and based on the result of integration, a change amount of the attitude (a change amount of the angle) from its initial state is calculated, thereby making it possible to calculate the current attitude. Note that the angle data Db includes X-axis angle data Db1 indicating an angle r1 around the X-axis which is calculated using the X-axis angular velocity v1, Y-axis angle data Db2 indicating an angle r2 around the Y-axis which is calculated using the Y-axis angular velocity v2, and Z-axis angle data Db3 indicating an angle r3 around the Z-axis which is calculated using the Z-axis angular velocity v3.

The past angle data Dc is data which is used to calculate a change amount of an angle and indicates an attitude (angle) which was calculated in the past, and is stored, corresponding to each input device 6 which is used. The past angle data Dc includes X-axis angle data Dc1 indicating a past angle r1old around the X-axis, Y-axis angle data Dc2 indicating a past angle r2old around the Y-axis, and Z-axis angle data Dc3 indicating a past angle r3old around the Z-axis.

The stability flag data Dd indicates the stability flag Sfrg which indicates whether or not the gyroscopic sensors 95 and are temporarily in the stable state and therefore the still-state outputs are stable, and is stored, corresponding to each input device 6 which is used. The stability counter data De indicates a stability counter C for determining whether or not the gyroscopic sensors 95 and 96 are in the stable state, and is stored, corresponding to each input device 6 which is used. The stability confirmation time data Df indicates a period of time during which the stable states of the gyroscopic sensors 95 and 96 are checked, and is stored, corresponding to each input device 6 which is used.

The rotational speed data Dg indicates a rotational speed V at which the input device object Dobj (see FIG. 9) is rotated in the input device stability information screen Id, and is stored, corresponding to each input device 6 which is used.

The reconfirmation flag data Dh indicates a reconfirmation flag Rfrg indicating whether or not the gyroscopic sensors 95 and 96 got into the stable state in accordance with a player's operation and still-state outputs have been reconfirmed, and is stored, corresponding to each input device 6 which is used.

The image data Di includes object image data Di1, information image data Di2, button image data Di3, background image data Di4 and the like. The object image data Di1 is data for generating an image by placing the input device object Dobj in the input device stability information screen Id. The information image data Di2 is data for generating a letter image indicating information to a player, such as information displayed in the asking information screen Ii or the like. The button image data Di3 is data for generating an operation button image for receiving a player's instruction in the gyroscopic sensor stability confirmation screen. The background image data Di4 is data for generating an image by providing a background in the gyroscopic sensor stability confirmation screen.

Figure 11:
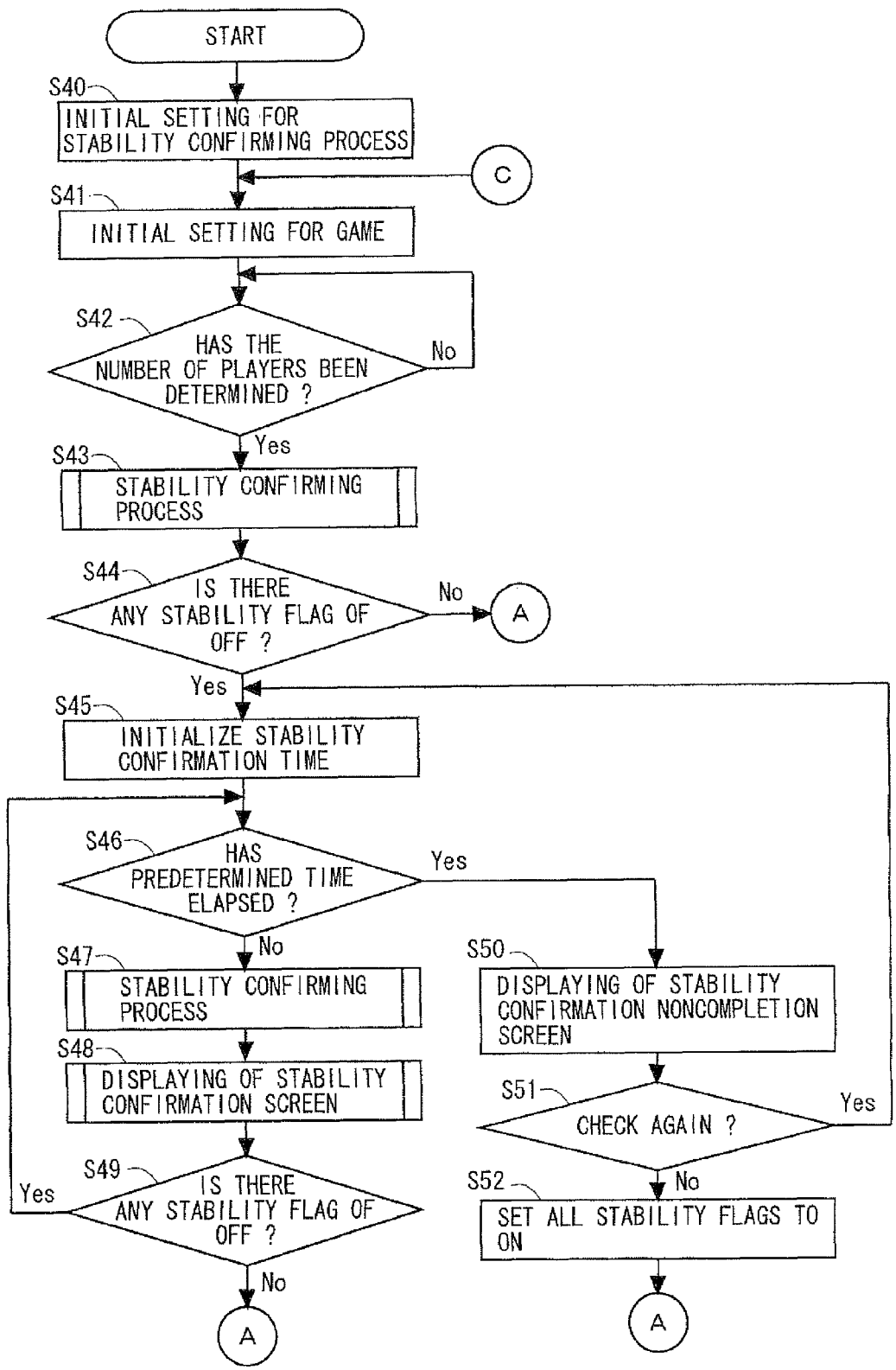
FIG. 11 is a flowchart showing an exemplary game process executed by the game apparatus main body 5 of FIG. 1.
Figure 12:
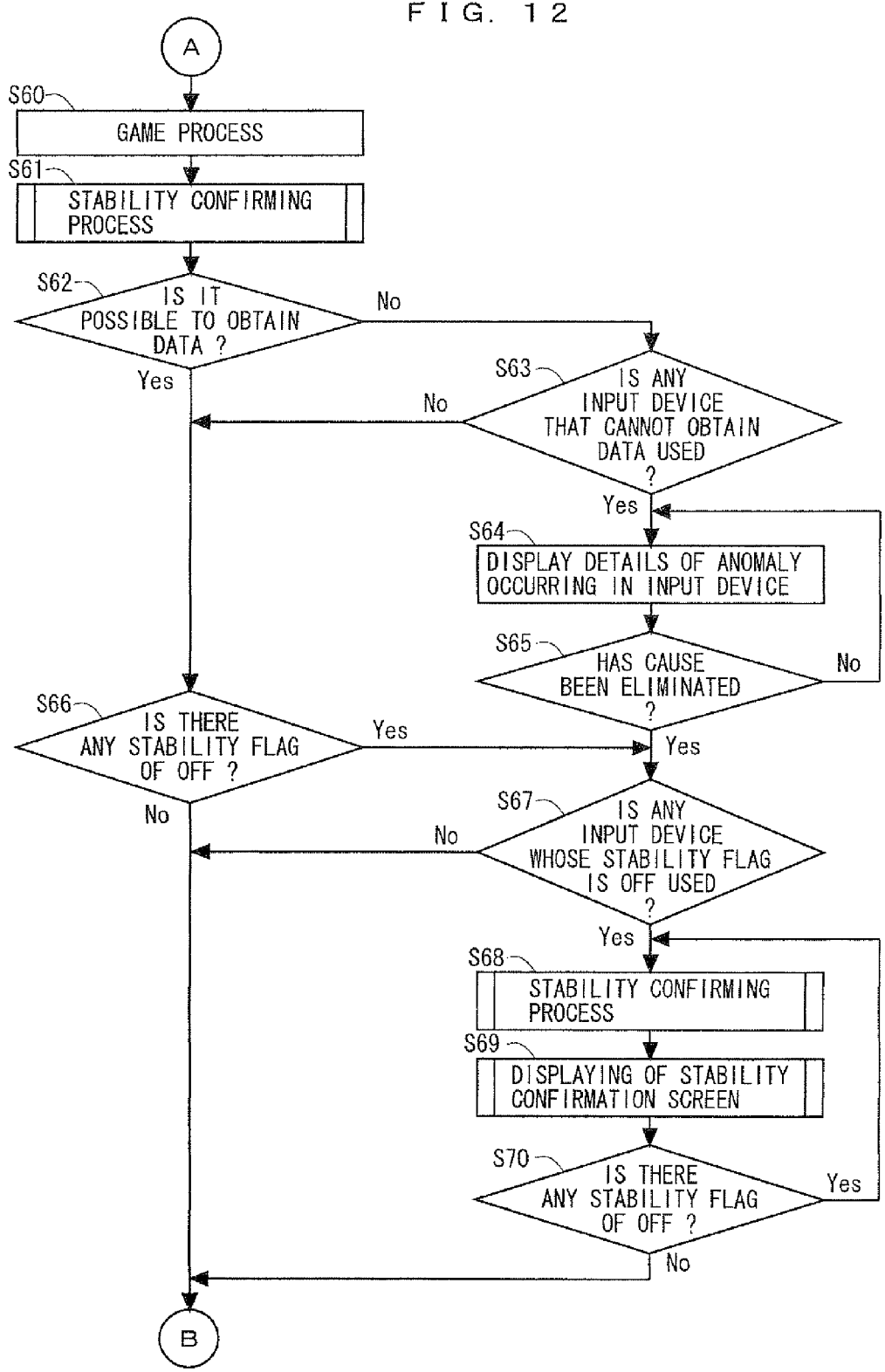
FIG. 12 is a flowchart showing an exemplary game process executed by the game apparatus main body 5 of FIG. 1.
Figure 13:
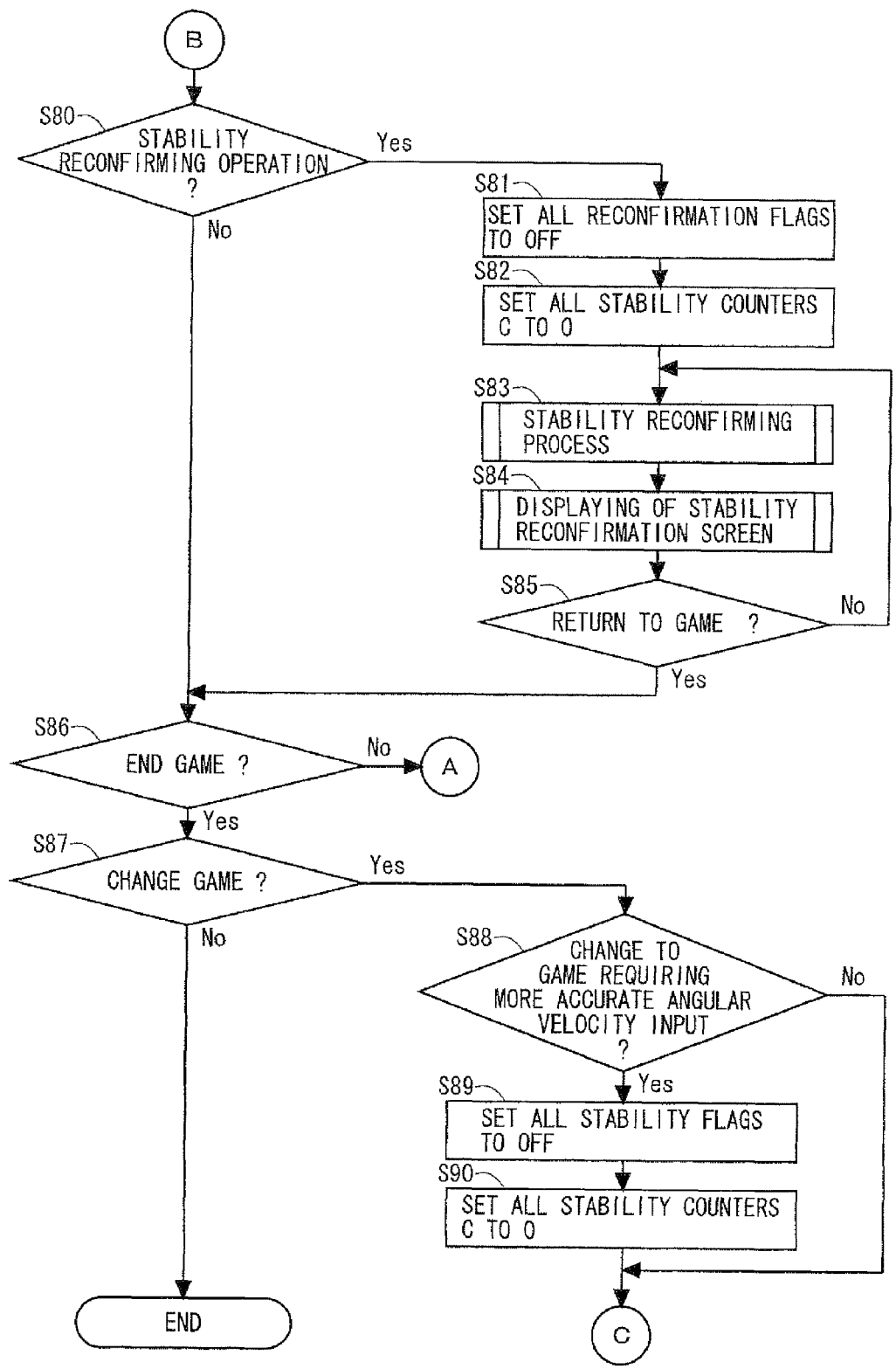
FIG. 13 is a flowchart showing an exemplary game process executed by the game apparatus main body 5 of FIG. 1.
Figure 14:
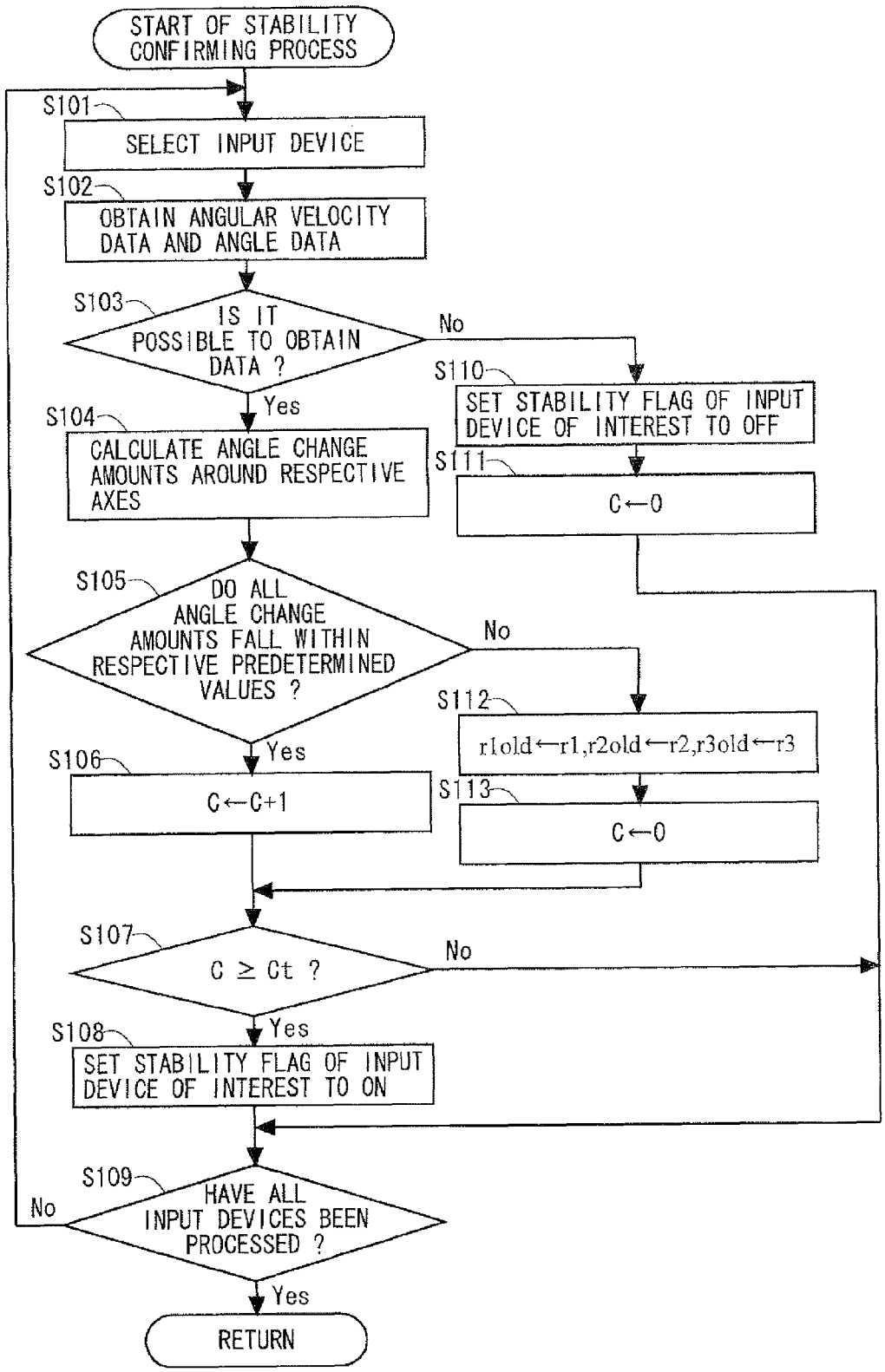
FIG. 14 is a subroutine indicating an exemplary stability confirming process of FIGS. 11 to 13.
Figure 15:
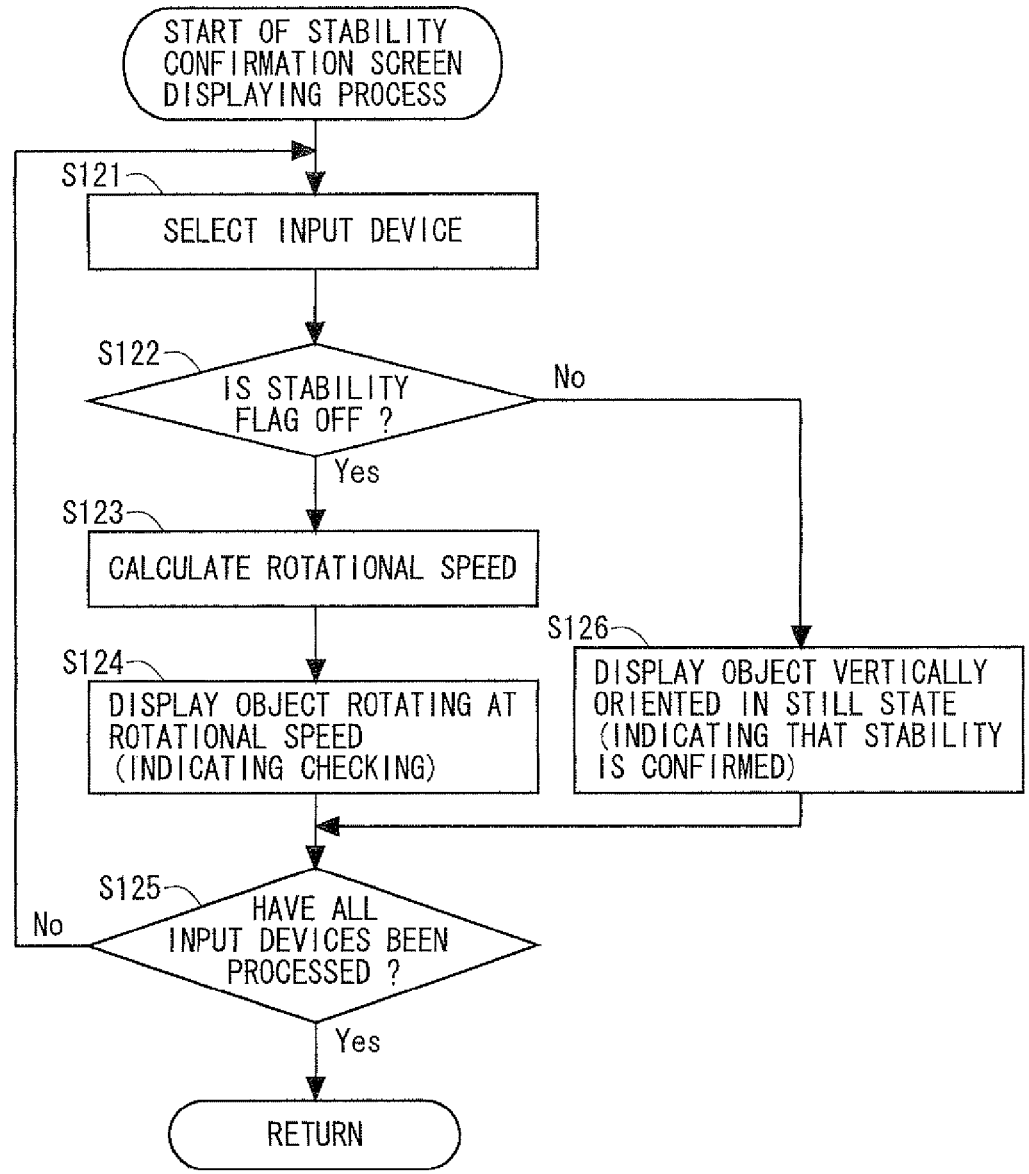
FIG. 15 is a subroutine indicating an exemplary stability confirmation screen display process of FIGS. 11 and 12.
Figure 16:
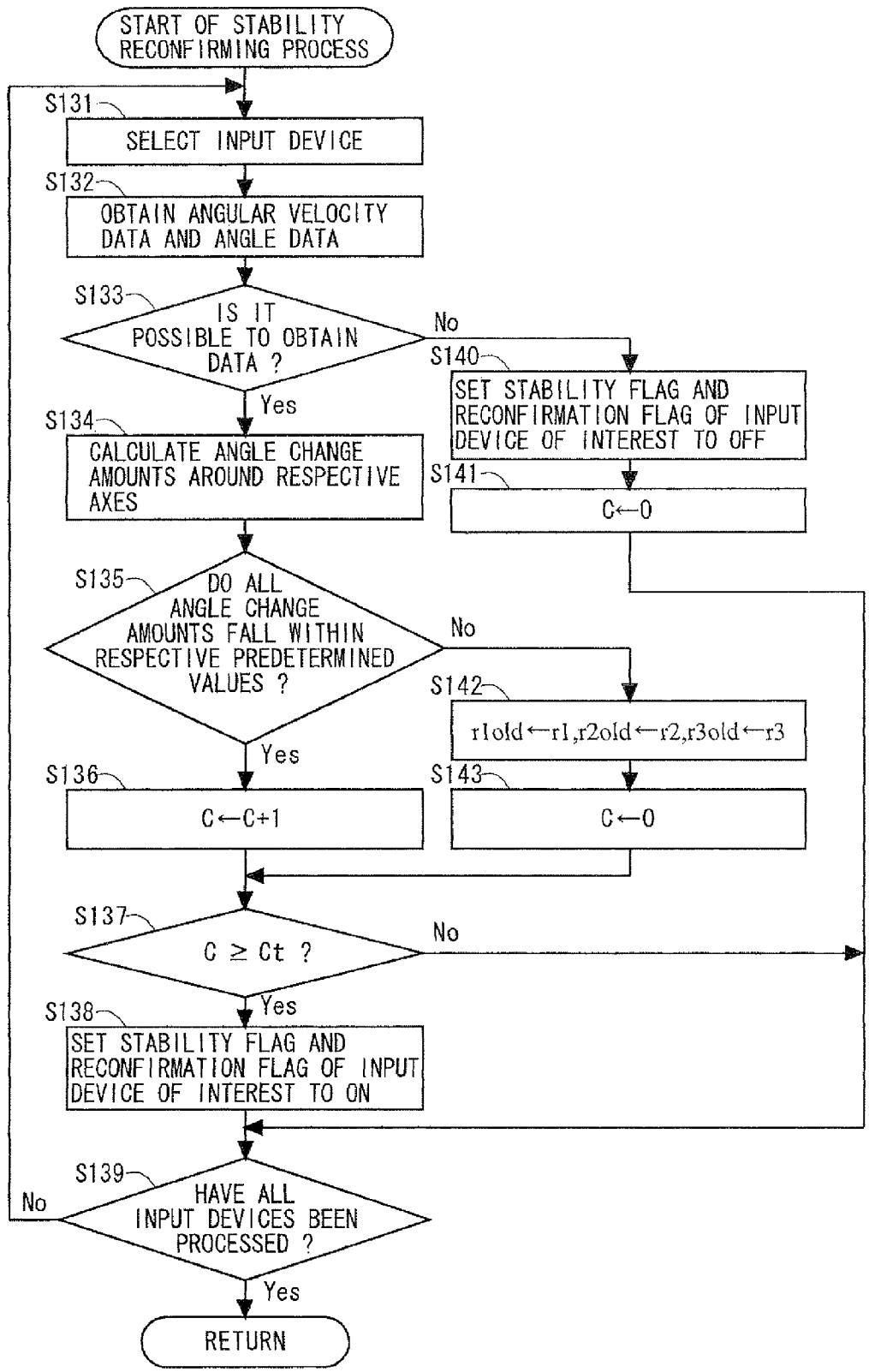
FIG. 16 is a subroutine indicating an exemplary stability reconfirming process in step 83 of FIG. 13.
Figure 17:
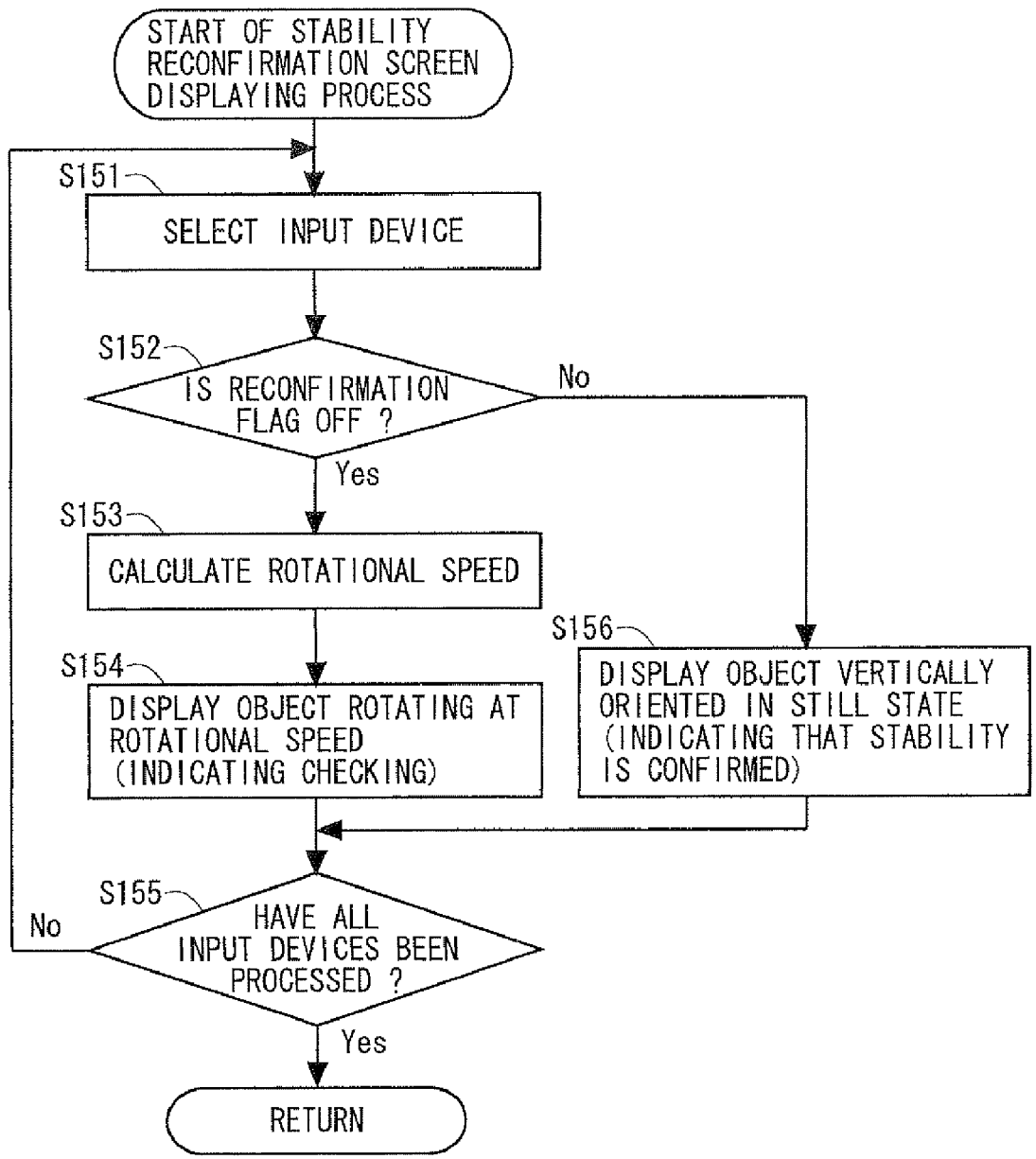
FIG. 17 is a subroutine indicating an exemplary stability reconfirmation screen display process in step 84 of FIG. 13.

Next, a game process executed in the game apparatus main body 5 will be described in detail with reference to FIGS. 11 to 17. Note that FIGS. 11 to 13 are flowcharts of an exemplary game process executed in the game apparatus main body 5. FIG. 14 shows a subroutine indicating an exemplary stability confirming process in FIGS. 11 and 12. FIG. 15 shows a subroutine indicating an exemplary stability confirmation screen display process in FIGS. 11 and 12. FIG. 16 shows a subroutine indicating an exemplary stability reconfirming process in step 83 of FIG. 13. FIG. 17 shows a subroutine indicating an exemplary stability reconfirmation screen display process in step 84 of FIG. 13. Here, in the flowcharts of FIGS. 11 to 17, in a specific situation of the game process from when the game apparatus main body 5 is started up to when a game is executed to when the game is ended, an operation in which a process of obtaining still-state outputs of the gyroscopic sensors 95 and 96 is executed will be mainly described, and other game processes which are not directly involved in example embodiments of the present invention will not be described in detail. In FIGS. 11 to 17, each step executed by the CPU 10 is abbreviated to "S".

When the game apparatus main body 5 is powered ON, the CPU 10 of the game apparatus main body 5 executes the boot program stored in the ROM/RTC 13, thereby initializing units, such as the main memory and the like. Thereafter, a game program stored on the optical disc 4 is read into the main memory, and the CPU 10 starts execution of the game program. FIGS. 11 to 17 are flowcharts showing a game process which is executed after completion of the aforementioned process.

In FIG. 11, the CPU 10 provides initial settings for the stability confirming process (step 40), and goes to the next step. For example, in step 40, the CPU 10 provides initial settings to parameters for executing the stability confirming process with respect to the gyroscopic sensors 95 and 96. Specifically, the CPU 10 sets values indicated by data stored in the angular velocity data Da, the angle data Db, the past angle data Dc, the stability confirmation time data Df, and the rotational speed data Dg to respective initial values (e.g., 0). The CPU 10 also sets the stability flag Sfrg stored in the stability flag data Dd and the reconfirmation flag Rfrg stored in the reconfirmation flag data Dh to OFF.

Next, the CPU 10 provides game initial settings (step 41), and goes to the next step. For example, in step 41, the CPU 10 provides initial settings to a virtual game world of the game and parameters used in the subsequent game processes, depending on the game selected by a player.

Next, the CPU 10 waits until the number of persons who perform the game (the number of players) is determined (step 42). For example, the CPU 10 displays a screen which prompts a player to select the number of players on the monitor 2, and waits until the player performs an operation of inputting a choice of the number of players. When the number of players has been determined (Yes in step 42), the CPU 10 goes to the next step 43.

In step 43, the CPU 10 executes the stability confirming process, and goes to the next step. Hereinafter, a detailed operation of the stability confirming process will be described with reference to FIG. 14.

In FIG. 14, the CPU 10 selects an input device 6 which is to be subjected to the stability confirming process (step 101), and goes to the next step. For example, when a plurality of input devices 6 are used to perform the game, the CPU 10 selects one of the plurality of input devices 6 for which the stability confirming process has not been completed. Note that, in the description which follows, the input device 6 selected in step 101 is referred to as an input device 6 of interest.

Next, the CPU 10 obtains angular velocity data from the input device 6 of interest and angle data which is calculated using the angular velocity data (step 102), and in this case, determines whether or not angular velocity data can be obtained from the input device 6 of interest (step 103). When angular velocity data can be obtained from the input device 6 of interest, the CPU 10 uses the obtained angular velocity data and angle data to update the angular velocity data Da and the angle data Db of the input device 6 of interest, and goes to the next step 104. On the other hand, when angular velocity data cannot be obtained form the input device 6 of interest, the CPU 10 goes to the next step 110.

In step 104, the CPU 10 calculates an angle change amount for each axis using an angle indicated by the angle data obtained in step 102 with reference to the angle data Db, and goes to the next step.

In step 104, for example, the CPU 10 calculates an angle change amount rc1 around the X-axis using a current angle r1 around the X-axis indicated by the X-axis angle data Db1 of the input device 6 of interest, and a past angle r1old around the X-axis indicated by the X-axis angle data Dc1 of the input device 6 of interest using:

$$rc1 = |r1 - r1old|$$

The CPU 10 also calculates an angle change amount rc2 around the Y-axis using a current angle r2 around the Y-axis indicated by the Y-axis angle data Db2 of the input device 6 of interest, and a past angle r2old around the Y-axis indicated by the Y-axis angle data Dc2 of the input device 6 of interest using:

$$rc2 = |r2 - r2old|$$

The CPU 10 also calculates a angle change amount rc3 around the Z-axis using a current angle r3 around the Z-axis indicated by the Z-axis angle data Db3 of the input device 6 of interest, and a past angle r3old around the Z-axis indicated by the Z-axis angle data Dc3 of the input device 6 of interest using:

$$rc3 = |r3 - r3old|$$

Next, the CPU 10 determines whether or not all the angle change amounts rc1, rc2 and rc3 around the respective axes fall within respective predetermined values (step 105). Thereafter, when all the angle change amounts rc1, rc2 and rc3 around the respective axes fall within the respective predetermined values, the CPU 10 goes to the next step 106. On the other hand, when at least one of the angle change amounts rc1, rc2 and rc3 around the respective axes falls within the corresponding predetermined value, the CPU 10 goes to the next step 112.

In step 106, the CPU 10 adds one to the stability counter C stored in the stability counter data De of the input device 6 of interest. Thereafter, the CPU 10 uses the stability counter C with an increment of one to update the stability counter data De of the input device 6 of interest, and goes to the next step 107.

On the other hand, in step 112, the CPU 10 sets the angle r1 used in step 104 into the angle r1old, the angle r2 into the angle r2old, and the angle r3 into the angle r3old. Thereafter, the CPU 10 uses the newly set angles r1old, r2old and r3old to update the past angle data Dc of the input device 6 of interest, and goes to the next step.

Next, the CPU 10 sets the stability counter C stored in the stability counter data De of the input device 6 of interest to 0, and uses the thus-set stability counter C to update the stability counter data De of the input device 6 of interest (step 113), and goes to the next step 107.

In step 107, the CPU 10 determines whether or not the stability counter C of the input device 6 of interest is larger than or equal to a threshold for the number of times of stability determination (hereinafter referred to as stability determination threshold Ct) with reference to the stability counter data De of the input device 6 of interest. Thereafter, when the stability counter C is larger than or equal to the stability determination threshold Ct, the CPU 10 goes to the next step 108. On the other hand, when the stability counter C is smaller than the stability determination threshold Ct, the CPU 10 goes to the next step 109.

In step 108, the CPU 10 sets the stability flag Sfrg indicated by the stability flag data Dd of the input device 6 of interest to ON, and goes to the next step 109. Thus, the stability flag Sfrg is set to ON if angles successively obtained during a predetermined period of time are stable, but not by using only an angle at a moment. Therefore, minute fluctuations (minute vibrations) in angles of the input device 6 are tolerated and do not prevent the stability flag Sfrg from being set to ON. On the other hand, the drift phenomenon that the still-state output itself fluctuates in a fixed direction is not tolerated. In this case, when the stability of the still-state output is confirmed after the fluctuation, the stability flag Sfrg is set to ON.

Note that, in the aforementioned process, by determining whether or not a period of time during which angle change amounts around the respective axes successively fall within the respective predetermined ranges is longer than or equal to a predetermined period of time, it is determined whether or not the attitude of the input device 6 is stable. In other words, in the aforementioned process, the stability flag Sfrg is set to ON if it is confirmed that the angles (attitude) obtained during a predetermined period of time are stable. The stability of the input device 6 may be confirmed by other methods to set the stability flag Sfrg to ON. For example, the stability flag Sfrg may be set to ON if a period of time during which change amounts of angular velocities around the axes successively fall within respective predetermined ranges is longer than or equal to a predetermined time, i.e., it is confirmed that angular velocities obtained during the predetermined period of time are stable. In this case, in step 104, by obtaining the change amounts of the angular velocities around the respective axes using the current angular velocities v1, v2 and v3 around the respective axes of the input device 6 of interest indicated by the angular velocity data Da, and the past angular velocities around the respective axes of the input device 6 of interest, the stability can be similarly checked. Also in this case, minute fluctuations (minute vibrations) in angular velocities of the input device 6 are tolerated and do not prevent the stability flag Sfrg from being set to ON. On the other hand, the drift phenomenon that the still-state output itself fluctuates in a fixed direction is not tolerated. In this case, when the stability of the still-state output is confirmed after the fluctuation, the stability flag Sfrg is set to ON.

On the other hand, in step 103, when it is determined that angular velocity data cannot be obtained from the input device 6 of interest, the CPU 10 sets the stability flag Sfrg indicated by the stability flag data Dd of the input device 6 of interest to OFF (step 110), and goes to the next step. Here, the reason why angular velocity data cannot be obtained from the input device 6 may be, for example, that the angular velocity detecting unit 9 is detached from the controller 7, or that a series of pieces of operational information (key data, acceleration data in the X-, Y- and Z-axial directions, process result data, and angular velocity data around the X-, Y- and Z-axes) cannot be obtained from the input device 6. In such a case, it is necessary to stabilize the gyroscopic sensors 95 and 96 again to set still-state outputs. Therefore, the stability flag Sfrg is set to OFF, which indicates that still-state outputs have not yet been set for the input device 6 of interest.

Next, the CPU 10 sets the stability counter C stored in the stability counter data De of the input device 6 of interest to 0, and uses the thus-set stability counter C to update the stability counter data De of the input device 6 of interest (step 111), and goes to the next step 109.

In step 109, the CPU 10 determines whether or not the stability confirming process has been completed for all input devices 6 used in the game. When the stability confirming process has been completed for all input devices 6 used in the game, the CPU 10 ends the process of the subroutine. On the other hand, when there is any one of the input devices 6 used in the game for which the stability confirming process has not been completed, the CPU 10 returns to step 101 and repeats the process.

Referring back to FIG. 11, after the stability confirming process of step 43, the CPU 10 determines whether or not there is any of the input devices 6 in which the stability flag Sfrg is set to OFF, with reference to the stability flag data Dd of all the input devices 6 used in the game (step 44). Thereafter, when there is any of the input devices 6 in which the stability flag Sfrg is set to OFF, the CPU 10 goes to the next step 45. On the other hand, when there is no input device 6 in which the stability flag Sfrg is set to OFF, the CPU 10 goes to the next step 60 (FIG. 12).

In step 45, the CPU 10 initializes the stability confirmation times of input device (s) 6 whose the stability flags Sfrg are set to OFF, of the input devices 6 used in the game, and goes to the next step. For example, the CPU 10 initializes all the stability confirmation times indicated by the stability confirmation time data Df of input device (s) 6 whose the stability flags Sfrg are set to OFF, to 0 to update the stability confirmation time data Df.

Next, the CPU 10 determines whether or not the stability confirmation time has reached a predetermined time, with reference to the stability confirmation time data Df of the input device 6 in which the stability flag Sfrg is set to OFF (step 46). Here, the predetermined time used in step 46 is a maximum time for which the CPU 10 waits until the gyroscopic sensors 95 and 96 are caused to be stable, and may be set to a time which can be tolerated by a player who waits until the gyroscopic sensors 95 and 96 are caused to be stable. When the stability confirmation time has not reached the predetermined time, the CPU 10 goes to the next step 47. On the other hand, when the stability confirmation time has reached the predetermined time, the CPU 10 goes to the next step 50.

In step 47, the CPU 10 executes a stability confirming process, and goes to the next step. Note that the stability confirming process executed in step 47 is similar to the stability confirming process in step 43 and therefore will not be described in detail.

Next, the CPU 10 displays a stability confirmation screen on the monitor 2 (step 48), and goes to the next step. Hereinafter, a detailed operation of the stability confirmation screen display process will be described with reference to FIG. 15.

In FIG. 15, the CPU 10 selects an input device 6 to be subjected to the stability confirmation screen display process (step 121), and goes to the next step. For example, when a plurality of input devices 6 are used to perform the game, the CPU 10 selects anyone for which the stability confirmation screen display process has not been completed, from the plurality of input devices 6. Note that, in the description which follows, the input device 6 selected in step 121 is referred to as an input device 6 to be displayed.

Next, the CPU 10 determines whether or not the stability flag Sfrg of an input device 6 to be displayed is set to OFF, with reference to the corresponding stability flag data Dd (step 122). Thereafter, when the stability flag Sfrg is OFF, the CPU 10 goes to the next step 123. On the other hand, when the stability flag Sfrg is ON, the CPU 10 goes to the next step 126.

In step 123, the CPU 10 calculates a rotational speed V using angular velocities indicated by the latest angular velocity data with reference to the angular velocity data Da corresponding to the input device 6 to be displayed, and goes to the next step.

In step 123, for example, the CPU 10 calculates the rotational speed V by:

$$V = (|v1| + |v2| + |v3|) \times M \quad (1)$$

where v1 indicates an angular velocity around the X-axis detected by the gyroscopic sensors 95 and 96 of the input device 6 to be displayed indicated by the latest data stored in the X-axis angular velocity data Da1, v2 indicates an angular velocity around the Y-axis detected by the gyroscopic sensors 95 and 96 of the input device 6 to be displayed indicated by the latest data stored in the Y-axis angular velocity data Da2, v3 indicates an angular velocity around the Z-axis detected by the gyroscopic sensors 95 and 96 of the input device 6 to be displayed indicated by the latest data stored in the Z-axis angular velocity data Da3, and M indicates a constant of one or more for increasing and causing the rotational speed V to be visually recognized even if it is a small angular velocity (e.g., M=10/6). Note that when the value of ($|v1|+|v2|+|v3|$) is larger than a predetermined threshold (e.g., 1080°/sec, i.e., three revolutions/sec), the CPU 10 changes the value to a value equal to the threshold. Specifically, the rotational speed V calculated by Expression (1) is calculated to be smaller than or equal to a value of the threshold multiplied by the constant M (1800°/sec or less, i.e., 5 revolutions/sec or less).

Thereafter, the CPU 10 uses the rotational speed V currently stored in the rotational speed data Dg corresponding to the input device 6 to be displayed, as the previous rotational speed Vlast, and causes the rotational speed V calculated using Expression (1) to approach the previous rotational speed Vlast at a predetermined rate, thereby adjusting the rotational speed V. For example, the rotational speed V calculated using Expression (1) and the previous rotational speed Vlast are used to calculate an adjusted rotational speed V by:

$$V \leftarrow 0.5V + 0.5Vlast$$

Thus, the rotational speed V is determined. Thereafter, the CPU 10 uses the thus-determined rotational speed V to update the rotational speed data Dg corresponding to the input device 6 to be displayed. Note that the rate at which the rotational speed V calculated using Expression (1) is caused to approach the previous rotational speed Vlast may have other values. Thereafter, the calculated rotational speed V is used as a previous rotational speed Vlast in the next process.

Next, the CPU 10 displays on the monitor 2 the input device stability information screen Id indicating that the input device object Dobj corresponding to the input device 6 to be displayed is being checked, by rotating the input device object Dobj at the rotational speed V (step 124), and goes to the next step 125.

For example, in step 124, the CPU 10 displays on the monitor 2 a gyroscopic sensor stability confirmation screen, such as that described with reference to FIG. 8. Specifically, the input device stability information screen Id displayed in step 124 (the input device stability information screen Ida shown in FIG. 9) is of an input device 6 whose stability flag Sfrg is OFF, and therefore, the input device object Dobj which is rotating around substantially a middle position of the object as an axis (the input device object Dobja shown in FIG. 9) is displayed. Here, the rotational speed of the input device object Dobj is determined by the rotational speed V stored in the rotational speed data Dg. For example, when the input device stability information screen Ida corresponding to an input device 6*a* whose stability flag Sfrg is OFF is displayed, the input device object Dobja which is rotated by an angle indicated by the value of the rotational speed V stored in the rotational speed data Dg of the input device 6*a*, is displayed.

On the other hand, when it is determined in step 122 that the stability flag Sfrg is ON, the CPU 10 displays on the monitor 2 the input device stability information screen Id in which the input device object Dobj corresponding to the input device 6 to be displayed is caused to be vertically oriented in the still state, indicating that the stability has been confirmed (step 126), and goes to the next step 125.

For example, in step 126, the CPU 10 displays on the monitor 2 a gyroscopic sensor stability confirmation screen, such as that described with reference to FIG. 8. Specifically, the input device stability information screen Id displayed in step 126 (the input device stability information screen Ida shown in FIG. 9) is of an input device 6 whose stability flag Sfrg is ON, and therefore, the input device object Dobj which is vertically oriented in the still state (the input device object Dobjb shown in FIG. 9) is displayed. Note that an angular velocity output from the gyroscopic sensors 95 and 96 of the input device 6 whose the stability flag Sfrg is ON may fluctuate during displaying of the input device stability information screen Id. Even if the angular velocity fluctuates, the input device object Dobj which is vertically oriented in the still state is displayed. In other words, when the stability flag Sfrg has been set to ON, then even if a player moves the input device 6, the input device object Dobj corresponding to the input device 6 is not rotated.

In step 125, the CPU 10 determines whether or not the stability confirmation screen display process has been completed for all the input devices 6 used in the game. When the stability confirmation screen display process has been completed for all the input devices 6 used in the game, the CPU 10 ends the process of the subroutine. On the other hand, when there is any one of the input devices 6 used in the game for which the stability confirmation screen display process has not been completed, the CPU 10 returns to step 121 and repeats the process.

Referring back to FIG. 11, after the stability confirmation screen display process of step 48, the CPU 10 determines whether or not there is any input device 6 whose stability flag Sfrg is OFF, with reference to the stability flag data Dd of all the input devices 6 used in the game (step 49). Thereafter, when there is any input device 6 whose stability flag Sfrg is OFF, the CPU 10 returns to step 46 and repeats the process. On the other hand, when there is no input device 6 whose stability flag Sfrg is OFF, the CPU 10 goes to the next step 60 (FIG. 12).

On the other hand, in step 46, when the stability confirmation time reaches a predetermined time, the CPU 10 displays a stability confirmation noncompletion screen on the monitor 2 (step 50), and goes to the next step. Here, step 50 is a process executed when the stability confirmation time is up while there is any of the input devices 6 used in the game for which the stability has not been confirmed. Therefore, the CPU 10 displays on the monitor 2 a stability confirmation noncompletion screen indicating the course of this process as shown in FIG. 18.

Figure 18:
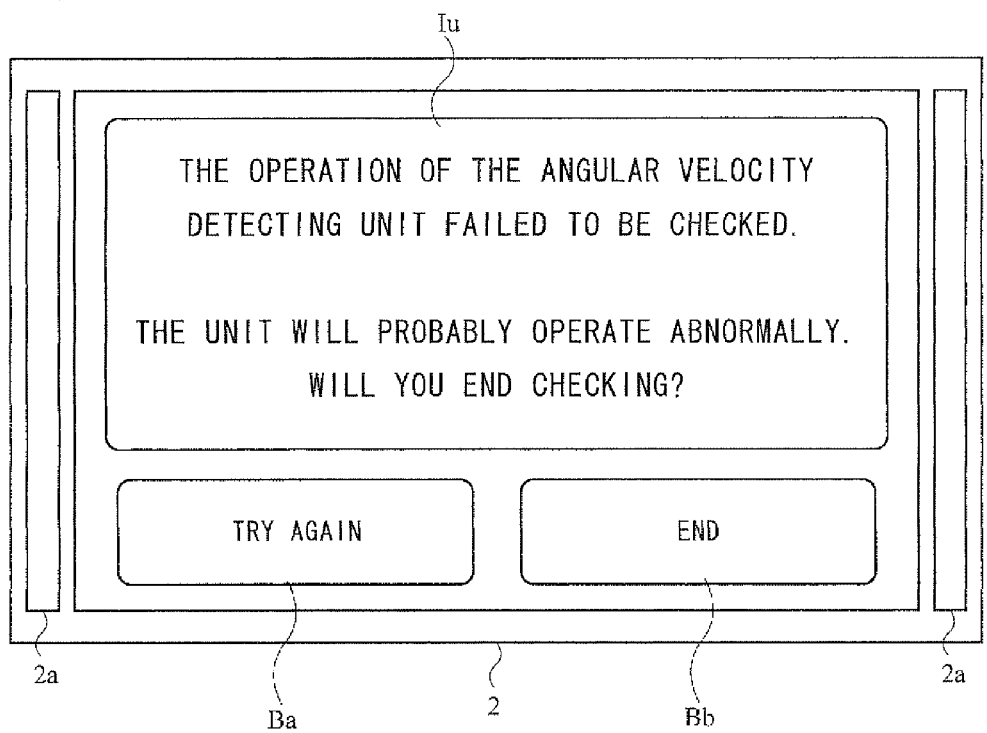
FIG. 18 is a diagram showing an exemplary stability confirmation noncompletion screen displayed on the monitor 2.

In FIG. 18, the stability confirmation noncompletion screen displays an information screen Iu indicating that the stability of the angular velocity detecting unit 9 (the gyroscopic sensors 95 and 96) has not been confirmed, and operation buttons Ba and Bb indicating options as to whether or not to execute the stability confirming process again. For example, as the information screen Iu, letter information is displayed which provides a player a message "The operation of the angular velocity detecting unit failed to be checked. The unit will probably operate abnormally. Will you end checking?" The operation button Ba is an option which is selected when the stability confirming process is to be executed again. For example, as the operation button Ba, an option displaying "Try again" is displayed on the stability confirmation noncompletion screen. The operation button Bb is an option which is selected when the stability confirming process is not to be executed again. For example, as the operation button Bb, an option displaying "End" is displayed on the stability confirmation noncompletion screen.

Referring back to FIG. 11, the CPU 10 waits until a player selects the options while displaying the stability confirmation noncompletion screen on the monitor 2, and determines whether or not to execute the stability confirming process again, depending on the selected option (step 51). Thereafter, when the stability confirming process is to be executed again, the CPU 10 returns to step 45 and repeats the process. On the other hand, when the stability confirming process is not to be executed again, the CPU 10 sets the stability flag data Dd to ON again for all the input devices 6 used in the game (step 52), and goes to the next step 60 (FIG. 12).

Referring to FIG. 12, the CPU 10 executes a process of causing a currently selected game to proceed (step 60), and goes to the next step. For example, the CPU 10 operates and moves various objects appearing in the virtual game world using a series of pieces of operational information obtained form the input devices 6 and calculated angles of the input devices 6 (the attitudes of the input devices 6), thereby causing the game to proceed. As an example, in step 60, based on the calculated attitudes of the input devices 6, the attitudes of various objects appearing in the virtual game world can be changed.

Next, the CPU 10 executes a stability confirming process (step 61), and goes to the next step. Note that the stability confirming process executed in step 61 is similar to that of step 43 and therefore will not be described in detail.

Next, the CPU 10 determines whether or not angular velocity data can be obtained from all the input devices 6 used in the game (step 62). When angular velocity data can be obtained from all the input devices 6 used in the game, the CPU 10 goes to the next step 66. On the other hand, when there is any one of the input devices 6 used in the game from which angular velocity data cannot be obtained, the CPU 10 goes to the next step 63.

In step 63, the CPU 10 determines whether or not the game process of step 60 is being executed, using operational information from an input device 6 from which angular velocity data cannot be obtained. For example, in the case of a process in which a game is caused to proceed by simultaneously using all the input devices 6, the result of determination in step 63 is positive. On the other hand, in the case of a process in which a game is caused to proceed by alternately using a plurality of input devices 6, the result of determination in step 63 is positive during a period of time that operational information from an input device 6 from which angular velocity data cannot be obtained is used, and the result of determination in step 63 is negative during a period of time that operational information from an input device 6 from which angular velocity data can be obtained is used. Thereafter, when the result of determination in step 63 is positive, the CPU 10 goes to the next step 64. On the other hand, when the result of determination in step 63 is negative, the CPU 10 goes to the next step 66.

In step 64, the CPU 10 displays on the monitor 2 a screen indicating details of an anomaly occurring in an input device 6 (communication with the input device 6 is dead, the angular velocity detecting unit 9 is detached from the controller 7, etc.), and goes to the next step. Here, step 64 is executed during the game process when angular velocity data cannot be obtained from the input device 6 and the game is caused to proceed using operational information of the input device 6 from which angular velocity data cannot be obtained. In this embodiment, a cause which prevents angular velocity data from being obtained is considered to be that a series of pieces of operational information are not obtained from the input device 6 during the game process, or that the angular velocity detecting unit 9 is detached from the controller 7 during the game process. Therefore, when a series of pieces of operational information are not obtained from the input device 6, the CPU 10 displays on the monitor 2 a screen, such as that shown in FIG. 19. Also, when only angular velocity data of a series of pieces of operational information is not obtained from the input device 6, the CPU 10 displays on the monitor 2 a screen, such as that shown in FIG. 20.

Figure 19:
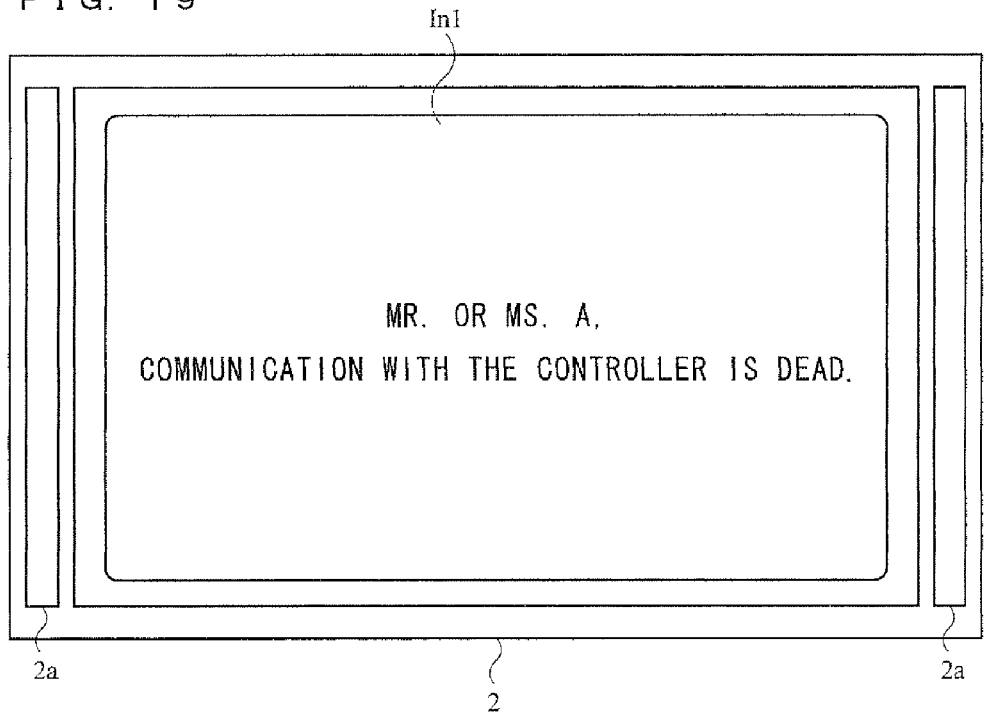
FIG. 19 is a diagram showing an exemplary information screen In1 displayed on the monitor 2.

In FIG. 19, on the screen for showing details of an anomaly occurring in the input device 6, an information screen In1 is displayed which indicates that communication between the input device 6 and the game apparatus main body 5 is dead. For example, the information screen In1 displays letter information which provides a player operating the input device 6 for which angular velocity data cannot be obtained a message indicating details of an anomaly, i.e., "Mr. or Ms. A, communication with the controller is dead," where "A" is the name of the player.

Figure 20:
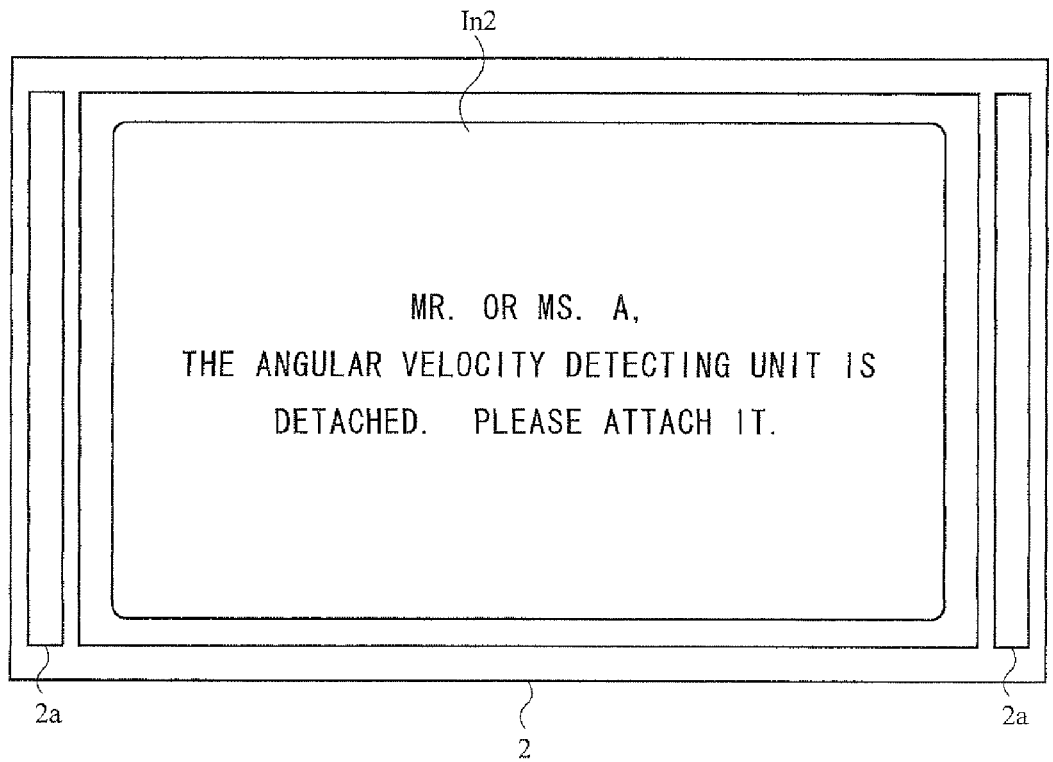
FIG. 20 is a diagram showing an exemplary information screen In2 displayed on the monitor 2.

In FIG. 20, on the screen for showing details of an anomaly occurring in the input device 6, information screen In2 is displayed which indicates that the angular velocity detecting unit 9 is detached from the controller 7. For example, the information screen In2 displays letter information which provides a player operating the input device 6 for which angular velocity data cannot be obtained a message indicating details of an anomaly, i.e., "Mr. or Ms. A, the angular velocity detecting unit is detached. Please attach it," where "A" is the name of the player.

Referring back to FIG. 12, the CPU 10 waits until a cause which prevents angular velocity data from being obtained is eliminated, while displaying the information screen In1 or In2 on the monitor 2 (step 65). For example, when angular velocity data can be obtained from the input device 6 from which angular velocity data was not able to be obtained, the CPU 10 determines that a cause which prevents angular velocity data from being obtained is eliminated (Yes in step 65), and goes to the next step 67.

On the other hand, in step 66, the CPU 10 determines whether or not there is any input device 6 whose stability flag Sfrg is OFF, with reference to the stability flag data Dd of all the input devices 6 used in the game. When there is any input device 6 whose stability flag Sfrg is OFF, the CPU 10 goes to the next step 67. On the other hand, when there is no input device 6 whose stability flag Sfrg is OFF, the CPU 10 goes to the next step 80 (FIG. 13). The case where there is any input device 6 whose stability flag Sfrg is OFF after start of the game is considered to include a case where the stability flag Sfrg is set to OFF when angular velocity data cannot be obtained from the input device 6, because communication with the input device 6 is dead, the angular velocity detecting unit 9 is detached from the controller 7, etc., after start of the game.

In step 67, the CPU 10 determines whether or not the game process of step 60 is being executed, using operational information from an input device(s) 6 whose stability flag Sfrg is OFF. For example, in the case of a process in which the game proceeds while all the input devices 6 are simultaneously used, the result of determination in step 67 is positive. On the other hand, in the case of a process in which the game proceeds while a plurality of input devices 6 are alternately used, the result of determination in step 67 is positive when operational information from an input device(s) 6 whose stability flag Sfrg is OFF is used, and the result of determination in step 67 is negative when operational information from an input device(s) 6 whose stability flag Sfrg is ON is used. Thereafter, when the result of determination in step 67 is positive, the CPU 10 goes to the next step 68. On the other hand, when the result of determination in step 67 is negative, the CPU 10 goes to the next step 80 (FIG. 13).

In step 68, the CPU 10 executes a stability confirming process, and goes to the next step. Note that the stability confirming process executed in step 68 is similar to that of step 43 and therefore will not be described in detail.

Next, the CPU 10 displays a stability confirmation screen on the monitor 2 (step 69), and goes to the next step. Note that a stability confirmation screen display process executed in step 69 is similar to the stability confirmation screen display process of step 48 and therefore will not be described in detail. Here, the stability confirmation screen display process of step 69 is executed during the game process when the stability flag Sfrg goes from the ON state to the OFF state, and the game is caused to proceed using operational information from an input device 6 whose stability flag Sfrg has gone from the ON state to the OFF state. Thus, when the stability flag Sfrg of an input device 6 is set to OFF during the game and the input device 6 whose stability flag Sfrg is OFF is currently used in the game, the stability confirmation screen is displayed on the monitor 2.

Next, the CPU 10 determines whether or not there is any input device 6 whose stability flag Sfrg is OFF, with reference to the stability flag data Dd of all the input devices 6 used in the game (step 70). When there is any input device 6 whose stability flag Sfrg is OFF, the CPU 10 returns to step 68 and repeats the process. On the other hand, when there is no input device 6 whose stability flag Sfrg is OFF, the CPU 10 goes to the next step 80 (FIG. 13).

Referring to FIG. 13, the CPU 10 determines whether or not a player has performed an operation of reconfirming the stability of the gyroscopic sensors 95 and 96 (step 80). For example, when a player presses down an operation portion 72 (e.g., a plus button 72*g*) during the game so as to check the stability of the gyroscopic sensors 95 and 96, the CPU 10 determines that an operation of reconfirming the stability of the gyroscopic sensors 95 and 96 has been performed. Thereafter, when an operation of reconfirming the stability has been performed, the CPU 10 goes to the next step 81. On the other hand, when an operation of reconfirming the stability has not been performed, the CPU 10 goes to the next step 86. In this case, the reconfirming operation itself may not be explicitly defined as an instruction to check the stability, and may be an operation of only designating temporarily stopping.

In step 81, the CPU 10 sets all reconfirmation flags Rfrg stored in the reconfirmation flag data Dh to OFF. The CPU 10 also sets all stability counters C stored in the stability counter data De to 0 (step 82), and goes to the next step.

Next, the CPU 10 executes the stability reconfirming process (step 83), and goes to the next step. Hereinafter, an operation of the stability reconfirming process will be described in detail with reference to FIG. 16.

In FIG. 16, the CPU 10 selects an input device 6 to be subjected to the stability reconfirming process (step 131), and goes to the next step. For example, when a plurality of input devices 6 are used to perform the game, the CPU 10 selects any one of the plurality of the input device 6 for which the stability reconfirming process has not been completed. Note that, in the description which follows, the input device 6 selected in step 131 is referred to as an input device 6 to be reconfirmed.

Next, the CPU 10 obtains angular velocity data from the input device 6 to be reconfirmed and angle data calculated from the angular velocity data (step 132), and in this case, determines whether or not angular velocity data can be obtained from the input device 6 to be reconfirmed (step 133). When angular velocity data can be obtained from the input device 6 to be reconfirmed, the CPU 10 uses the thus-obtained angular velocity data and angle data to update the angular velocity data Da and the angle data Db of the input device 6 to be reconfirmed, and goes to the next step 134. On the other hand, when angular velocity data cannot be obtained from the input device 6 to be reconfirmed, the CPU 10 goes to the next step 140.

In step 134, the CPU 10 calculates angle change amounts around the respective axes using angles indicated by the angle data obtained in step 132, with reference to the angle data Db, and goes to the next step. Note that a method of calculating the angle change amounts in step 134 is similar to that described in step 104 and therefore will not be described in detail.

Next, the CPU 10 determines whether or not all angle change amounts rc1, rc2 and rc3 around the respective axes fall within respective predetermined values (step 135). When all the angle change amounts rc1, rc2 and rc3 around the respective axes fall within the respective predetermined values, the CPU 10 goes to the next step 136. On the other hand, when at least one of the angle change amounts rc1, rc2 and rc3 around the respective axes is larger than the corresponding predetermined value, the CPU 10 goes to the next step 142.

In step 136, the CPU 10 adds one to the stability counter C stored in the stability counter data De of the input device 6 to be reconfirmed. Thereafter, the CPU 10 uses the stability counter C with an increment of one to update the stability counter data De of the input device 6 to be reconfirmed, and goes to the next step 137.

On the other hand, in step 142, the CPU 10 sets the angle r1 used in step 134 into the angle r1old, the angle r2 into the angle r2old, and the angle r3 into the angle r3old. Thereafter, the CPU 10 uses the newly-set angles r1old, r2old and r3old to update the past angle data Dc of the input device 6 to be reconfirmed, and goes to the next step.

Next, the CPU 10 sets the stability counter C stored in the stability counter data De of the input device 6 to be reconfirmed to 0, and uses the thus-set stability counter C to update the stability counter data De of the input device 6 to be reconfirmed (step 143), and goes to the next step 137.

In step 137, the CPU 10 determines whether or not the stability counter C of the input device 6 to be reconfirmed is larger than or equal to the stability determination threshold Ct, with reference to the stability counter data De of the input device 6 to be reconfirmed. When the stability counter C of the input device 6 to be reconfirmed is larger than or equal to the stability determination threshold Ct, the CPU 10 goes to the next step 138. On the other hand, when the stability counter C of the input device 6 to be reconfirmed is smaller than the stability determination threshold Ct, the CPU 10 goes to the next step 139.

In step 138, the CPU 10 sets the stability flag Sfrg stored in the stability flag data Dd and the reconfirmation flag Rfrg stored in the reconfirmation flag data Dh, of the input device 6 to be reconfirmed, to ON, and goes to the next step 139. Thus, the reconfirmation flag Rfrg is set to ON when angles successively obtained during a predetermined period of time are stable, but not by using only an angle at a moment, as with the stability flag Sfrg.

Note that, in the aforementioned process, by determining whether or not a period of time during which the angle change amounts around the respective axes successively fall within respective predetermined ranges is longer than or equal to a predetermined period of time, it is determined whether or not the attitude of the input device 6 is stable. In other words, in the aforementioned process, the reconfirmation flag Rfrg is set to ON if it is confirmed that the angles (attitude) obtained during the predetermined period of time are stable. The stability of the input device 6 may be reconfirmed by other methods to set the reconfirmation flag Rfrg to ON. For example, the reconfirmation flag Rfrg may be set to ON if the period of time during which the change amounts of angular velocities around the respective axes successively fall within respective predetermined ranges is longer than or equal to the predetermined period of time, i.e., it is confirmed that angular velocities obtained during the predetermined period of time are stable. In this case, in step 134, by using the change amounts of the angular velocities around the respective axes using the current angular velocities v1, v2 and v3 around the respective axes indicated by the angular velocity data Da of the input device 6 to be reconfirmed, and the past angular velocities around the respective axes of the input device 6 to be reconfirmed, the stability can be similarly reconfirmed. Also in this case, minute fluctuations (minute vibrations) in angular velocities of the input device 6 are tolerated and do not prevent the reconfirmation flag Rfrg from being set to ON. On the other hand, the drift phenomenon that the still-state output itself fluctuates in a fixed direction is not tolerated. In this case, when the stability of the still-state output is reconfirmed after the fluctuations, the reconfirmation flag Rfrg is set to ON.

On the other hand, in step 133, when it is determined that angular velocity data cannot be obtained from the input device 6 to be reconfirmed, the CPU 10 sets the stability flag Sfrg stored in the stability flag data Dd and the reconfirmation flag Rfrg stored in the reconfirmation flag data Dh, of the input device 6 to be reconfirmed, to OFF (step 140), and goes to the next step. Here, when angular velocity data cannot be obtained from the input device 6, the gyroscopic sensors 95 and 96 need to be caused to be stable again, thereby setting still-state outputs. Therefore, in this case, the stability flag Sfrg as well as the reconfirmation flag Rfrg are set to OFF, thereby indicating that still-state outputs have not yet been set for the input device 6 to be reconfirmed.

Next, the CPU 10 sets the stability counter C stored in the stability counter data De of the input device 6 to be reconfirmed to 0, and uses the thus-set stability counter C to update the stability counter data De of the input device 6 to be reconfirmed (step 141), and goes to the next step 139.

In step 139, the CPU 10 determines whether or not the stability reconfirming process has been completed for all the input devices 6 used in the game. When the stability reconfirming process has been completed for all the input devices 6 used in the game, the CPU 10 ends the process of the subroutine. On the other hand, when there is any input device 6 used in the game that for which the stability reconfirming process has not been completed, the CPU 10 returns to step 131 and repeats the process.

Referring back to FIG. 13, the CPU 10 displays the stability reconfirmation screen on the monitor 2 (step 84), and goes to the next step. Hereinafter, a detailed operation of the stability reconfirmation screen display process will be described with reference to FIG. 17.

In FIG. 17, the CPU 10 selects an input device 6 to be subjected to the stability reconfirmation screen display process (step 151), and goes to the next step. For example, when a plurality of input devices 6 are used to perform the game, the CPU 10 selects any one for which the stability reconfirmation screen display process has not been completed, from the plurality of input devices 6. Note that, in the description which follows, the input device 6 selected in step 151 is referred to as an input device 6 to be displayed for reconfirmation.

Next, the CPU 10 determines whether or not the reconfirmation flag Rfrg is OFF, with reference to the reconfirmation flag data Dh corresponding to the input device 6 to be displayed for reconfirmation (step 152). When the reconfirmation flag Rfrg is OFF, the CPU 10 goes to the next step 153. On the other hand, when the reconfirmation flag Rfrg is ON, the CPU 10 goes to the next step 156.

In step 153, the CPU 10 refers to the angular velocity data Da corresponding to the input device 6 to be displayed for reconfirmation, calculates a rotational speed V using angular velocities indicated by the latest angular velocity data, and goes to the next step. Note that a method of calculating the rotational speed V in step 153 is similar to that of step 123 and therefore will not be described in detail.

Next, the CPU 10 displays on the monitor 2 a gyroscopic sensor stability reconfirmation screen on which the input device object Dobj corresponding to the input device 6 to be displayed for reconfirmation, which is rotating at the rotational speed V, is displayed, indicating that the input device 6 to be displayed for reconfirmation is being checked (step 154), and goes to the next step 155.

For example, in step 154, the CPU 10 displays on the monitor 2 a gyroscopic sensor stability reconfirmation screen, such as that shown in FIG. 8. Specifically, the gyroscopic sensor stability reconfirmation screen displayed in step 154 is similar to the input device stability information screen Ida of FIG. 9, and displays the input device object Dobj which is rotating around substantially a middle position of the object as an axis (the input device object Dobja of FIG. 9), with respect to the input device 6 whose reconfirmation flag Rfrg is OFF.

On the other hand, when it is determined in step 152 that the reconfirmation flag Rfrg is ON, the CPU 10 displays on the monitor 2 the input device stability information screen Id on which the input device object Dobj corresponding to the input device 6 to be displayed for reconfirmation, which is vertically oriented in the still state, is displayed, indicating that the input device 6 to be displayed for reconfirmation has been checked (step 156), and goes to the next step 155.

For example, in step 156, the CPU 10 displays on the monitor 2 a gyroscopic sensor stability reconfirmation screen, such as that shown in FIG. 8. Specifically, the gyroscopic sensor stability reconfirmation screen displayed in step 156 is similar to the input device stability information screen Idb of FIG. 9, and displays the input device object Dobj which is vertically oriented in the still state (the input device object Dobjb of FIG. 9) with respect to an input device 6 whose reconfirmation flag Rfrg is ON. Note that while the gyroscopic sensor stability reconfirmation screen is displayed, angular velocities output from the gyroscopic sensors 95 and 96 of the input device 6 whose reconfirmation flag Rfrg is ON may fluctuate. Even if the angular velocities fluctuate, the input device object Dobj which is vertically oriented in the still state is displayed. In other words, when the reconfirmation flag Rfrg has been set to ON, then even if a player moves the input device 6, the input device object Dobj corresponding to the input device 6 is not rotated.

Note that, as can be clearly seen from the processes of steps 80 to 83, even when an operation of reconfirming the stability of the gyroscopic sensors 95 and 96 is performed during the game process, the stability flag Sfrg is not changed from ON of OFF in response to the operation. In other words, the gyroscopic sensor stability reconfirmation screen may be displayed when the stability flag Sfrg of an input device 6 used in the game is ON. In this case, the stability of the gyroscopic sensors 95 and 96 is rechecked in accordance with a player's intention. Moreover, even if a player does not actively instruct to recheck the stability and simply wants to temporarily the game, the player can visually check whether or not the gyroscopic sensors 95 and 96 are stable when the input device 6 is temporarily stopped, and can detect an anomaly, if any. Therefore, the stability reconfirmation screen displayed in step 154 or 156 may be a subsidiary display.

Figure 21:
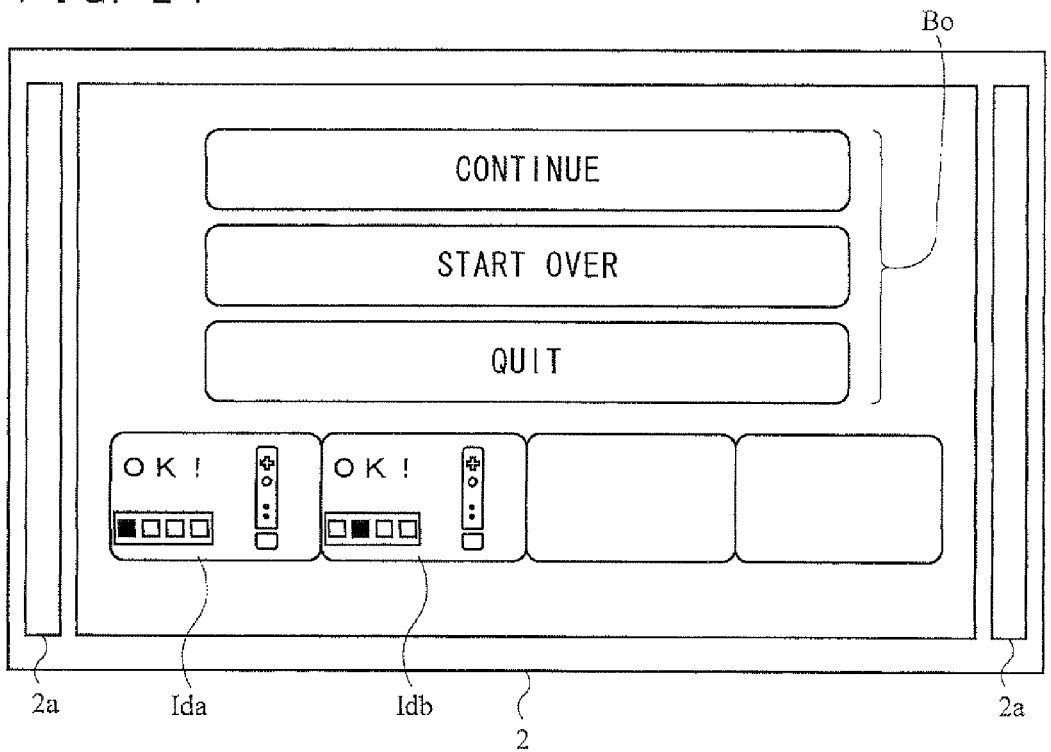
FIG. 21 is a diagram showing an exemplary stability confirmation screen displayed on the monitor 2.

For example, as shown in FIG. 21, the stability reconfirmation screen displayed in step 154 or 156 does not display a message which prompts a player to cause their input device 6 to be stable (the asking information screen Ii of FIG. 8). The stability reconfirmation screen displayed in step 154 or 156 also displays the input device stability information screen Id indicating the stability reconfirmation states of the gyroscopic sensors 95 and 96 for each input device 6 which is used, and operation buttons Bo indicating a plurality of options for the subsequent operations of a player.

In step 155, the CPU 10 determines whether or not the stability reconfirmation screen display process has been completed for all the input devices 6 used in the game. When the stability reconfirmation screen display process has been completed for all the input devices 6 used in the game, the CPU 10 ends the process of the subroutine. On the other hand, when there is any input device 6 used in the game for which the stability reconfirmation screen display process has not been completed, the CPU 10 returns to step 151 and repeats the process.

Referring back to FIG. 13, after the process of step 84, the CPU 10 determines whether or not to return to the game process (step 85). For example, when any of the options of the operation buttons Bo displayed in the stability reconfirmation screen of step 84 is selected, the CPU 10 determines whether or not to return to the game process, depending on the option indicated by the selected operation button Bo. Also, when the plus button 72g is pressed again, the CPU 10 returns to the game. When returning to the game process, the CPU 10 goes to the next step 86. On the other hand, when not returning to the game process, the CPU 10 returns to step 83 and repeats the process so as to continue the current stability confirming process.

In step 86, the CPU 10 determines whether or not to end the game. The game is, for example, ended under conditions that the game processed in step 60 satisfies conditions under which the game is over, that a player performs an operation of ending the game, or the like. When not ending the game, the CPU 10 returns to step 60 (FIG. 12) and repeats the process. When ending the game, the CPU 10 goes to the next step 87.

In step 87, the CPU 10 determines whether or not to change the game ended in step 86 to another different game and play the different game. When playing the different game, the CPU 10 goes to the next step 88. On the other hand, when ending the process without changing the game, the CPU 10 ends the process of the flowchart. For example, a plurality of games may be able to be performed, depending on a game program read in the main memory of the game apparatus main body 5. Specifically, in the case of a game program which provides various sport games, different games for respective sports may be able to be performed. In step 87, it is determined whether or not to change from one game to another different game of a plurality of games which are provided by a game program read in the main memory, and continuously play the game.

In step 88, the CPU 10 determines whether or not the game selected in step 87 requires a more accurate angular velocity input than that of the previous game. When the game selected in step 87 requires a more accurate angular velocity input than that of the previous game, the CPU 10 goes to the next step 89. On the other hand, when the game selected in step 87 does not requires a more accurate angular velocity input than that of the previous game, the CPU 10 returns to step 41 (FIG. 11) and repeats the process.

In step 89, the CPU 10 sets all the stability flags Sfrg stored in the stability flag data Dd to OFF. The CPU 10 also sets all the stability counters C stored in the stability counter data De to 0 (step 90), and returns to step 41 (FIG. 11) and repeats the process.

For example, there is a game which proceeds while an input device 6 is maintained in the still state. Specifically, in a game (e.g., an archery (including Japanese archery) game, etc.) in which aim is determined in the virtual game world, depending on the attitude or orientation of the input device 6, the attitude of the input device 6 maintained in the still state needs to be accurately calculated. In such a game, a slight error in the still-state outputs of the gyroscopic sensors 95 and 96 would significantly affect a game operation. For example, if a slight error occurs in the still-state outputs of the gyroscopic sensors 95 and 96, then even when a player maintains the input device 6 in the still state, it is determined that the input device 6 is moving at a small angular velocity. In this case, an operation corresponding to the determination is also performed in a game process.

In such a case, the still-state outputs (the zero-point offset values ofs) need to be set, depending on the accuracy level of an angular velocity input required by a game to be executed. Therefore, in step 89, by temporarily setting all the stability flags Sfrg to OFF, all the input devices 6 used in a game are subjected to the stability confirming process again. Here, the required accuracy level of an angular velocity input is previously set for each game. In a game requiring a relatively high accuracy of an angular velocity input, correction which substantially prevents a value when an input device 6 is not in the still state from being reflected in the first correction of the angular velocity v and the correction of a zero point offset, is performed by narrowing the stability range of the upper limit s1 to the lower limit s2, increasing the upper limit of the number of successive pieces of data ct, decreasing the constant C, or the like. Thus, when a game requiring a more accurate angular velocity input is executed, a rate at which the zero-point offset values ofs converge to the angular velocities v indicated by angular velocity data output from the gyroscopic sensors 95 and 96 is set to a relatively small value so as to more accurately set the zero-point offset values ofs. Therefore, even when an input device 6 is maintained in the still state, it takes a long time for the value of the angle change amount calculated in step 104 to reach within a predetermined value. As a result, a time which it takes for the stability flag Sfrg to be changed from OFF to ON in the stability confirming process becomes long.

Thus, according to the aforementioned game process, in a situation where the gyroscopic sensors 95 and 96 need to be caused to be still, when the gyroscopic sensors 95 and 96 (an input device 6) are not stable, an input device object Dobj which is rotating is displayed, depending on angular velocity data obtained from the gyroscopic sensors 95 and 96. Therefore, a player can recognize that the gyroscopic sensors 95 and 96 are moving or an error is included in the outputs, by visually recognizing the input device object Dobj which is rotating or its rotational speed. Moreover, the rotational speed V is determined based on a value which is obtained by adding all the magnitudes of angular velocities around the X-, Y- and Z-axes. Therefore, even when the gyroscopic sensors 95 and 96 (the input device 6) are not stable due to the presence of a slight angular velocity, the angular velocity is displayed in an emphasized manner on the screen, thereby allowing the player to more easily recognize that the gyroscopic sensors 95 and 96 (the input device 6) are not stable.

Also, according to the aforementioned game process, when the gyroscopic sensors 95 and 96 (an input device 6) are not temporarily still or stable, it is indicated that the gyroscopic sensors 95 and 96 are not stable in a specific situation in the process. Therefore, a player can be presented the fact that the gyroscopic sensors 95 and 96 are not stable, to recognize that an error occurs in the gyroscopic sensors 95 and 96, and the player should cause the gyroscopic sensors 95 and 96 (the input device 6) to be still and stable so as to eliminate the error. Moreover, the specific situation in which it is indicated that the gyroscopic sensors 95 and 96 are not stable includes cases where: a game is not started; the stability flag Sfrg of an input device 6 is changed from ON to OFF during a game and the input device 6 in the OFF state is used in the game; and the like. The indication is performed with timing appropriate for causing the game to proceed.

It is here assumed that the zero-point offset values (still-state output values) of the gyroscopic sensors 95 and 96 are fixed to respective device-specific values. In this case, if there is a difference between the device-specific values and actual zero-point offset values (still-state output values) of the gyroscopic sensors 95 and 96, the gyroscopic sensors 95 and 96 (an input device 6) may invariably become unstable, so that the input device object Dobj which is invariably rotating is displayed. In the aforementioned embodiment, however, an angular velocities indicated by angular velocity data output from the gyroscopic sensors 95 and 96 are subjected to offset correction based on the zero-point offset values (still-state output values) to obtain the resultant angular velocities, which are then subjected to a process. The zero-point offset values are also corrected to converge to the angular velocities indicated by the angular velocity data output from the gyroscopic sensors 95 and 96. Therefore, even if the zero-point offset values are initially set to the device-specific values when the gyroscopic sensors 95 and 96 are powered ON, the zero-point offset values gradually converge to actual zero-point offset values by maintaining the gyroscopic sensors 95 and 96 in the still state. As the zero-point offset values converge, the offset-corrected angular velocities also converge to the zero-point offset values. As a result, the rotational speed V or the angle change amounts around the respective axes each approach zero. Therefore, when the stability flag Sfrg is ON, it means that the still-state outputs have already been subjected to the correction which causes the still-state outputs to be zero points. Therefore, a game can be performed in an error-corrected state.

Note that the stability confirming process in the aforementioned embodiment is repeated every process cycle before or during a game process as can be seen from the flowcharts of FIGS. 11 to 17. By such a process, the stability flag Sfrg may be already ON before the stability confirmation screen is displayed, so that a game can be more quickly started. However, the stability confirming process in the aforementioned embodiment may be invariably executed in predetermined cycles, separately from the aforementioned flow, in addition to a specific stage.

Note that, in the aforementioned embodiment, the stability confirming process or the stability reconfirming process which are executed based on angles calculated using angular velocities which have been subjected to the offset correction after the first correction or angular velocities which have been subjected only to the offset correction. Alternatively, the stability confirming process or the stability reconfirming process may be executed using angular velocities indicated by angular velocity data before execution of these correction processes or angles calculated from the angular velocities. In this case, the stability confirming process or the stability reconfirming process is executed directly using angular velocities indicated by angular velocity data output from the gyroscopic sensors 95 and 96. Alternatively, the stability confirming process or the stability reconfirming process is executed using angles calculated from the angular velocities. By maintaining the gyroscopic sensors 95 and 96 in the still state, the angular velocities or the angles converge to respective values, so that conditions under which the stability flag Sfrg or the reconfirmation flag Rfrg is ON are satisfied. When the stability flag Sfrg or the reconfirmation flag Rfrg is set to ON, the input device object Dobj which is vertically oriented in the still state is displayed, so that a similar stability confirming process or stability reconfirming process can be executed. If the aforementioned correction process is executed immediately before a game process (i.e., in step 60, the correction process is executed, and a game process is executed using angular velocities after the correction process), a similar game process can be executed. Also, the aforementioned correction process may be executed in the stability confirming process or the stability reconfirming process to calculate the rotational speed V or the angle change amounts around the respective axes.

Moreover, in the aforementioned embodiment, the angles r are calculated using the angular velocities v after correction, and angle data indicating the calculated angles r is obtained. A step of calculating the angles r may be added during the aforementioned game process. For example, a step of sequentially adding (integrating) the obtained angular velocities v to calculate an integral of attitude change amounts (angle change amounts) from an initial attitude of an input device 6, thereby calculating a current attitude (angle) of the input device 6, is added to the game process. As a result, a similar process can be achieved if the angles r have not been calculated.

Moreover, in the aforementioned embodiment, the speed (the rotational speed V) at which the input device object Dobj is rotated is determined based on the sum of all the magnitudes of angular velocities around the X-, Y- and Z-axes. Any of the magnitudes of the angular velocities around the X-, Y- and Z-axes may be excluded from the sum. For example, in a game process using an input device 6, if there is an angular velocity around one of the X-, Y- and Z-axes which is not used the game process, the rotational speed V may be calculated without using the angular velocity around that axis.

Moreover, in the aforementioned embodiment, the acceleration signals in the three axial directions (acceleration data along the X-, Y- and Z-axes) from the acceleration sensor 701 provided in the controller 7 or data resulting from the process of the image capture information computing section 74 is not used. Therefore, example embodiments of the present invention can be implemented without the acceleration sensor 701 or the image capture information computing section 74 being provided in the controller 7. Also, in the aforementioned embodiment, the angular velocity detecting unit 9 including the gyroscopic sensors 95 and 96 is detachably connected to the controller 7. Alternatively, the gyroscopic sensors 95 and 96 may be provided in the controller 7.

Although it has been assumed above that example embodiments of the present invention are applied to a stationary game apparatus, example embodiments of the present invention are applicable to an information processing apparatus, such as a general personal computer which is operated using an input device including a gyroscopic sensor or the like. For example, an information processing apparatus can be used to calculate an attitude or the like of an input device, depending on angular velocity data output from a gyroscopic sensor of an input device. Thus, the information processing apparatus can be used to execute a stability confirming process of a gyroscopic sensor when various game processes are executed based on an angular velocity of an input device.

Moreover, although it has been assumed above that the controller 7 (an input device 6) and the game apparatus main body 5 are connected via wireless communication, the controller 7 and the game apparatus main body 5 may be electrically connected via a cable. In this case, the cable connected to the controller 7 is connected to a connection terminal of the game apparatus main body 5.

Moreover, the aforementioned shapes of the controller 7 and the angular velocity detecting unit 9 and the aforementioned shapes, number, positions and the like of the operation sections 72 are only for illustrative purposes. Even in the case of other shapes, numbers and positions, example embodiments of the present invention can be achieved. The aforementioned coefficients, determination values, expressions, process orders and the like of the processes are also only for illustrative purposes. Even in the case of other values, expressions and process orders, example embodiments of the present invention can be achieved.

Moreover, example embodiments of the game program of the present invention may be supplied to the game apparatus main body 5 not only via an external storage medium, such as the optical disc 4 or the like, but also via a wired or wireless communication line. The game program may be previously stored in a non-volatile storage device in the game apparatus main body 5. Note that examples of an information storage medium storing the game program may include a CD-ROM, a DVD, an optical disc-like storage medium similar thereto, and in addition, a non-volatile semiconductor memory.

The game apparatus and the game program of example embodiments of the present invention facilitate recognition of an error occurring in a gyroscopic sensor in a game process based on an angular velocity obtained from the gyroscopic sensor. Therefore, example embodiments of the present invention are useful as a game apparatus or a game program for executing a game which executes a process using an attitude, an orientation or the like of an input device.

Moreover, the game apparatus and the recording medium recording the game program of example embodiments of the present invention provide efficient checking of an error occurring in a gyroscopic sensor in a game process based on an angular velocity obtained from the gyroscopic sensor. Therefore, example embodiments of the present invention are useful as a game apparatus or a game program for executing a game which executes a process using attitude, an orientation or the like of an input device.

While example embodiments of the invention have been described in detail, the foregoing description is in all aspects illustrative and not restrictive. It is understood that numerous other modifications and variations can be devised without departing from the scope of the invention.

It should be understood throughout the present specification that expression of a singular form includes the concept of their plurality unless otherwise mentioned. Specifically, articles or adjectives for a singular form (e.g., "a", "an", "the", etc. in English) include the concept of their plurality unless otherwise mentioned. It should be also understood that the terms as used herein have definitions typically used in the art unless otherwise mentioned. Thus, unless otherwise defined, all scientific and technical terms have the same meanings as those generally used by those skilled in the art to which example embodiments of the present invention pertain. If there is contradiction, the present specification (including the definitions) precedes.

What is claimed is:

1. A game apparatus for performing a game process by obtaining operation data including at least angular velocity data indicating a plurality of angular velocities around respective axes from an input device including gyroscopic sensors for detecting the respective angular velocities, comprising:
   an angular velocity data obtaining unit configured to obtain the angular velocity data;
   a determination unit configured to determine whether or not an attitude of the input device is stable, based on the angular velocity data;
   a flag storing unit configured to store a stability flag indicating that the attitude of the input device has been at least once stable;
   a first flag control unit configured to set the stability flag of the input device to ON to update the stability flag stored in the flag storing unit when the determination unit determines that the attitude of the input device is stable; and
   a stability confirming unit configured to cause the determination unit to perform the determination and cause a display device to display a screen including a result of the determination, when there is an input device whose stability flag is OFF.

2. The game apparatus according to claim 1, wherein the game apparatus obtains the operation data including the angular velocity data from each of a plurality of input devices,
   the game apparatus further comprising:
      a game processing unit configured to execute a game process for performing a game, based on the obtained angular velocity data; and
      an input device determining unit configured to determine at least one of the input devices which is to be used in the game process before the game processing unit starts the game process, and
   after the input device determining unit determines the at least one input device to be used, when there is an input device whose stability flag is OFF of the at least one input device to be used, the stability confirming unit causes the determination unit to perform the determination and causes the display device to display a screen including a result of the determination.

3. The game apparatus according to claim 2, wherein after the input device determining unit determines the at least one input devices to be used, when the stability flag of the at least one input device to be used is all set to ON, the stability confirming unit causes the game processing unit to start the game process, and
   after the number of the at least one input devices to be used is determined by the input device determining unit, when there is an input device whose stability flag is still OFF after a particular time elapses, the stability confirming unit causes the display device to display a screen which allows a player to determine whether or not to start the game process, and when the player determines to start the game process, the stability confirming unit causes the game processing unit to start the game process.

4. The game apparatus according to claim 1, further comprising:
   a second flag control unit for setting the stability flag of the input device to OFF to update the stability flag stored in the flag storing unit, depending on a connection state of the input device and the game apparatus,
   wherein, when the stability flag stored in the flag storing unit is changed from ON to OFF, the stability confirming unit causes the determination unit to perform the determination and causes the display device to display a screen including a result of the determination.

5. The game apparatus according to claim 4, wherein when connection between the input device and the game apparatus is disconnected, the second flag control unit sets the stability flag of the input device to OFF to update the stability flag stored in the flag storing unit.

6. The game apparatus according to claim 4, wherein the input device includes:
   a first unit including a communication section for transmitting the operation data; and
   a second unit including the gyroscopic sensor, wherein the second unit is electrically connected to the first unit and outputs the angular velocity data to the communication section, and
   when connection between the first and second units in the input device is disconnected, the second flag control unit sets the stability flag of the input device to OFF to update the stability flag stored in the flag storing unit.

7. The game apparatus according to claim 1, further comprising:
   a game processing unit configured to perform the game process based on the obtained angular velocity data;

a game selecting unit configured to select a game to be executed by the game processing unit, from a plurality of games; and a second flag control unit configured to, when the game selecting unit selects a specific one of the plurality of games, set all the stability flag of the at least one input device used in the game to OFF to update the stability flag stored in the flag storing unit, wherein, after the game selecting unit selects the specific game, when there is an input device whose stability flag is OFF, the stability confirming unit causes the determination unit to perform the determination and causes the display device to display a screen including a result of the determination.

8. The game apparatus according to claim 7, wherein when the game selecting unit selects a game requiring a relatively high accuracy level of necessary angular velocity data, the second flag control unit sets all the stability flag of the at least one input device used in the game to OFF to update the stability flag stored in the flag storing unit, and after the game selecting unit selects the game requiring the relatively high accuracy level, when there is an input device whose stability flag is OFF, the stability confirming unit causes the determination unit to perform the determination and causes the display device to display a screen including a result of determination.

9. The game apparatus according to claim 8, further comprising:

an offset value calculating unit configured to calculate zero-point offset values indicating values of the angular velocity data in the still state for the respective axes; and an offset correcting unit configured to correct the plurality of angular velocities around the axes indicated by the angular velocity data using the respective zero-point offset values calculated corresponding to the axes, wherein the determination unit determines whether or not the attitude of the input device is stable, based on the plurality of angular velocities around the axes corrected by the offset correcting unit, and the offset value calculating unit calculates the zero-point offset values in a manner which allows the zero-point offset values to approach the respective values of the angular velocity data which are obtained when the input device is still, where, in the game requiring the relatively high accuracy level, an extent to which the zero-point offset values approach respective angular velocities indicated by the latest angular velocity data is reduced.

10. The game apparatus according to claim 1, further comprising:

a game processing unit configured to execute the game process based on the obtained angular velocity data, and repeatedly causing the determination unit to perform the determination along with the game process.

11. The game apparatus according to claim 10, further comprising:

a connection state checking unit configured to check whether or not there is a problem with connection between the input device and the game apparatus; and a second flag control unit configured to, when there is a problem with the connection state, set the stability flag of the input device to OFF to update the stability flag stored in the flag storing unit, wherein, when there is a problem with the connection state, the stability confirming unit interrupts the game process of the game processing unit, and causes the determination unit to perform the determination and causes the display device to display a screen including a result of the determination.

12. The game apparatus according to claim 11, wherein the game apparatus obtains the operation data including the angular velocity data from each of a plurality of input devices, the connection state checking unit checks the connection state of each of the plurality of input devices, and when the game processing unit executes the game process based on the operation data from an input device having a problem with the connection state, of the plurality of input devices, the stability confirming unit causes the determination unit to execute the determination, causes the game processing unit to stop the game process, and causes the display device to display a screen including a result of the determination.

13. The game apparatus according to claim 12, wherein when the game processing unit executes the game process based on the operation data from one of the plurality of input devices other than the input device having a problem with the connection state, the stability confirming unit causes the determination unit to execute the determination, and causes the game processing unit to continue the game process without causing the display device to display a screen including a result of the determination.

14. The game apparatus according to claim 1, wherein when a period of time that changes in attitude with respect to the respective axes of the input device indicated by the angular velocity data fall within respective particular ranges is longer than or equal to a particular period of time, the determination unit determines that the attitude of the input device is stable.

15. The game apparatus according to claim 14, wherein the determination unit includes:

a change amount calculating unit configured to calculate angles around the respective axes indicated by the angular velocity data with respect to the attitude of the input device, and calculating differences between the angles and respective angles to be compared;

a change amount determining unit configured to determine whether or not all the differences around the respective axes are smaller than or equal to respective thresholds;

a counting unit configured to increase a count when the change amount determining unit determines that all the differences are smaller than or equal to the respective thresholds, and initializing the count when the change amount determining unit determines that at least one of the differences is larger than the corresponding threshold;

a count determining unit configured to, when the count is larger than or equal to a particular value, determine that the period of time that the changes in attitude with respect to the respective axes of the input device fall within the respective particular ranges is longer than or equal to the particular period of time; and an angle-to-be-compared updating unit configured to, when the change amount determining unit determines that one of the differences is larger than the corresponding threshold, update the angles to be compared using currently calculated angles around the respective axes of the input device.

16. The game apparatus according to claim 1, further comparing:
an offset value calculating unit configured to calculate zero-point offset values indicating values of the angular velocity data in the still state for the respective axes; and
an offset correcting unit configured to correct the plurality of angular velocities around the axes indicated by the angular velocity data using the respective zero-point offset values calculated corresponding to the axes,
wherein the offset value calculating unit calculates the zero-point offset values in a manner which allows the zero-point offset values to approach the respective values of the angular velocity data which are obtained when the input device is still, and
the determination unit determines whether or not the attitude of the input device is stable, based on the plurality of angular velocities around the axes corrected by the offset correcting unit.

17. A non-transitory computer-readable recording medium recording a game program executable by a computer included in a game apparatus for performing a game process by obtaining operation data including at least angular velocity data indicating a plurality of angular velocities around respective axes from an input device including gyroscopic sensors for detecting the respective angular velocities, the game program causing the computer to provide functionality comprising:
obtaining the angular velocity data;
determining whether or not an attitude of the input device is stable, based on the angular velocity data;
storing a stability flag indicating that the attitude of the input device has been at least once stable;
setting the stability flag of the input device to ON to update the stored stability flag when the determining determines that the attitude of the input device is stable; and
causing performance of the determining and causing a display device to display a screen including a result of the determining, when there is an input device whose stability flag is OFF.

18. The non-transitory computer-readable recording medium according to claim 17, wherein
the game apparatus obtains the operation data including the angular velocity data from each of a plurality of input devices,
the game program causes the computer to provide further functionality comprising:
executing a game process for performing a game, based on the obtained angular velocity data; and
determining at least one of the input devices which is to be used in the game process before the game process is started, and
after the at least one input device to be used is determined, when there is an input device whose stability flag is OFF of the at least one input device to be used, performance of the determining is caused and the display device is caused to display a screen including a result of the determining.

19. The non-transitory computer-readable recording medium according to claim 18, wherein
after the determining of the at least one input devices to be used, when the stability flag of the at least one input device to be used is all set to ON, start of the game process is caused, and
after the number of the at least one input devices to be used is determined, when there is an input device whose stability flag is still OFF after a particular time elapses, the display device is caused to display a screen which allows a player to determine whether or not to start the game process, and when the player determines to start the game process, start of the game process is caused.

20. The non-transitory computer-readable recording medium according to claim 17, wherein the game program causes the computer to provide further functionality comprising:
setting the stability flag of the input device to OFF to update the stored stability flag, depending on a connection state of the input device and the game apparatus,
wherein, when the stored stability flag is changed from ON to OFF, performance of the determining is caused and the display device is caused to display a screen including a result of the determining.

21. The non-transitory computer-readable recording medium according to claim 20, wherein
when connection between the input device and the game apparatus is disconnected, the stability flag of the input device is set to OFF to update the stored stability flag.

22. The non-transitory computer-readable recording medium according to claim 20, wherein
the input device includes:
a first unit including a communication section for transmitting the operation data; and
a second unit including the gyroscopic sensor, wherein the second unit is electrically connected to the first unit and outputs the angular velocity data to the communication section, and
when connection between the first and second units in the input device is disconnected, the stability flag of the input device is set to OFF to update the stored stability flag.

23. The non-transitory computer-readable recording medium according to claim 17, wherein the game program causes the computer to provide further functionality comprising:
performing the game process based on the obtained angular velocity data;
selecting a game to be executed, from a plurality of games; and
when a specific one of the plurality of games is selected, setting the stability flag of the at least one input device used in the game to OFF to update the stored stability flag,
wherein, after the specific game is selected, when there is an input device whose stability flag is OFF, performance of the determining is caused and the display device is caused to display a screen including a result of the determining.

24. The non-transitory computer-readable recording medium according to claim 23, wherein
when a game is selected requiring a relatively high accuracy level of necessary angular velocity data, stability flag of the at least one input device used in the game is set to OFF to update the stored stability flag, and
after the game is selected requiring the relatively high accuracy level, when there is an input device whose stability flag is OFF, performance of the determining is caused and the display device is caused to display a screen including a result of the determining.

25. The non-transitory computer-readable recording medium according to claim 24, wherein the game program causes the computer to provide further functionality comprising:
calculating zero-point offset values indicating values of the angular velocity data in the still state for the respective axes; and correcting the plurality of angular velocities around the axes indicated by the angular velocity data using the respective zero-point offset values calculated corresponding to the axes, wherein the determining of whether or not the attitude of the input device is stable is based on the corrected plurality of angular velocities around the axes, and the zero-point offset values are calculated in a manner which allows the zero-point offset values to approach the respective values of the angular velocity data which are obtained when the input device is still, where, in the game requiring the relatively high accuracy level, an extent to which the zero-point offset values approach respective angular velocities indicated by the latest angular velocity data is reduced.

26. The non-transitory computer-readable recording medium according to claim 17, wherein the game program causes the computer to further provide functionality comprising:

executing the game process based on the obtained angular velocity data, and repeatedly causing the performance of the determining along with the game process.

27. The non-transitory computer-readable recording medium according to claim 26, wherein the game program causes the computer to provide further functionality comprising:

checking whether or not there is a problem with connection between the input device and the game apparatus; and when there is a problem with the connection state, setting the stability flag of the input device to OFF to update the stored stability flag, wherein, when there is a problem with the connection state, the game process is interrupted, and performance of the determining is caused and the display device is caused to display a screen including a result of the determination.

28. The non-transitory computer-readable recording medium according to claim 27, wherein operation data including the angular velocity data is obtained from each of a plurality of input devices, the connection state of each of the plurality of input devices is checked, and when the game process is executed based on the operation data from an input device having a problem with the connection state, of the plurality of input devices, execution of the determining is caused, stoppage the game process is caused, and the display device is caused to display a screen including a result of the determination.

29. The non-transitory computer-readable recording medium according to claim 28, wherein when the game process is executed based on the operation data from one of the plurality of input devices other than the input device having a problem with the connection state, execution of the determining is caused, and continuance of the game process is caused without causing the display device to display a screen including a result of the determining.

30. The non-transitory computer-readable recording medium according to claim 17, wherein when a period of time that changes in attitude with respect to the respective axes of the input device indicated by the angular velocity data fall within respective particular ranges is longer than or equal to a particular period of time, the attitude of the input device is determined to be stable.

31. The non-transitory computer-readable recording medium according to claim 30, wherein the determining includes:

calculating angles around the respective axes indicated by the angular velocity data with respect to the attitude of the input device, and calculating differences between the angles and respective angles to be compared;

determining whether or not all the differences around the respective axes are smaller than or equal to respective thresholds;

increasing a count when the determining determines that all the differences are smaller than or equal to the respective thresholds, and initializing the count when the determining determines that at least one of the differences is larger than the corresponding threshold;

when the count is larger than or equal to a particular value, determining that the period of time that the changes in attitude with respect to the respective axes of the input device fall within the respective particular ranges is longer than or equal to the particular period of time; and when one of the differences is determined to be larger than the corresponding threshold, updating the angles to be compared using currently calculated angles around the respective axes of the input device.

32. The non-transitory computer-readable recording medium according to claim 17, wherein the game program causes the computer to provide further functionality comprising:

calculating zero-point offset values indicating values of the angular velocity data in the still state for the respective axes; and correcting the plurality of angular velocities around the axes indicated by the angular velocity data using the respective zero-point offset values calculated corresponding to the axes, wherein the zero-point offset values are calculated in a manner which allows the zero-point offset values to approach the respective values of the angular velocity data which are obtained when the input device is still, and whether or not the attitude of the input device is stable is determined based on the corrected plurality of angular velocities.

33. A method of performing a game process, the method comprising:

obtaining operation data including at least angular velocity data indicating a plurality of angular velocities around respective axes from an input device including gyroscopic sensors for detecting the respective angular velocities;

determining whether or not an attitude of the input device is stable, based on the angular velocity data;

storing a stability flag indicating that the attitude of the input device has been at least once stable;

setting, using a processing system having at least one processor, the stability flag of the input device to ON to update the stored stability flag when the determining determines that the attitude of the input device is stable; and causing performance of the determining and causing a display device to display a screen including a result of the determining, when there is an input device whose stability flag is OFF.

34. A system for performing a game process by obtaining operation data including at least angular velocity data indicating a plurality of angular velocities around respective axes from an input device including gyroscopic sensors for detecting the respective angular velocities, the system comprising:

a computer processing system, having at least one computer processor, the computer processing system being configured to:

obtain operation data including at least angular velocity data indicating a plurality of angular velocities around respective axes from an input device including gyroscopic sensors for detecting the respective angular velocities;

determine whether or not an attitude of the input device is stable, based on the angular velocity data;

store a stability flag indicating that the attitude of the input device has been at least once stable;

set the stability flag of the input device to ON to update the stored stability flag when determination is made that the attitude of the input device is stable; and cause performance of the determination and cause a display device to display a screen including a result of the determination, when there is an input device whose stability flag is OFF.

* * * * *